(12) United States Patent
Sandiford et al.

(10) Patent No.: US 10,634,631 B2
(45) Date of Patent: Apr. 28, 2020

(54) METHODS AND SYSTEMS FOR DETECTING DEFECTS IN LAYERED DEVICES AND OTHER MATERIALS

(71) Applicant: ITT MANUFACTURING ENTERPRISES LLC, Wilmington, DE (US)

(72) Inventors: A. David Sandiford, Lake Hughes, CA (US); Tao Jiang, Stevenson Ranch, CA (US)

(73) Assignee: ITT MANUFACTURING ENTERPRISES LLC, Wilmington, DE (US)

(*) Notice: Subject to any disclaimer, the term of this patent is extended or adjusted under 35 U.S.C. 154(b) by 308 days.

(21) Appl. No.: 15/432,538

(22) Filed: Feb. 14, 2017

(65) Prior Publication Data

US 2018/0231479 A1    Aug. 16, 2018

(51) Int. Cl.
| | | |
|---|---|---|
| G01N 25/72 | (2006.01) | |
| H05B 3/20 | (2006.01) | |
| G06T 7/00 | (2017.01) | |
| G01J 5/10 | (2006.01) | |
| G01J 5/00 | (2006.01) | |

(52) U.S. Cl.
CPC ............ G01N 25/72 (2013.01); G01J 5/10 (2013.01); G06T 7/0008 (2013.01); H05B 3/20 (2013.01); *G01J 2005/0077* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 9,004,753 B1* | 4/2015 | Maresca, Jr. | G01J 5/0088 250/559.42 |
| 2003/0219059 A1 | 11/2003 | Scott | |
| 2009/0016402 A1* | 1/2009 | Bunker | G01N 25/72 374/43 |
| 2013/0230072 A1 | 9/2013 | Couse et al. | |

(Continued)

FOREIGN PATENT DOCUMENTS

| | | |
|---|---|---|
| EP | 1262765 | 12/2002 |
| WO | WO 2017/105646 | 6/2017 |

OTHER PUBLICATIONS

International Search Report and Written Opinion in PCT Application No. PCT/US2018/015765 dated May 28, 2018 in 19 pages.

(Continued)

*Primary Examiner* — Christopher Braniff
(74) *Attorney, Agent, or Firm* — Knobbe Martens Olson & Bear, LLP

(57) ABSTRACT

Various methods of diagnosing defects and disbonds in devices and materials are disclosed. In some embodiments, the methods involve cooling a portion of a material or device, heating a portion of the material or device with a heating instrument, terminating the application of heat to the material or device, and imaging the material or device using a thermal imager after heat is removed. In certain variants, disbonds and/or defects can be visualized as hotter areas and spots on the material through the thermal image.

24 Claims, 50 Drawing Sheets

(56) References Cited

U.S. PATENT DOCUMENTS

2014/0062392 A1* 3/2014 Lofy .................. H05K 7/20145
320/108
2015/0153293 A1   6/2015 Nosrati et al.
2016/0169813 A1* 6/2016 Shepherd .............. G01N 25/72
250/330

OTHER PUBLICATIONS

Crompton, M. Imaging Bond Testing, Oct. 2014, in 18 pages.
Escobar, Joe, Non-destructive Testing for Composite; Different Inspection Methods, Apr. 1, 2003, in 2 pages.
Abaris Training, Resources, Inc,: Non Destrictive Inspection (NDI) of Advanced Composites, Dec. 2007, in 28 pages.
Invitation to Pay Additonal Fees and, Where Applicable, Protest Fee for PCT Application No. PCT/US2018/015765 dated Apr. 18, 2018, in 11 pages.

* cited by examiner

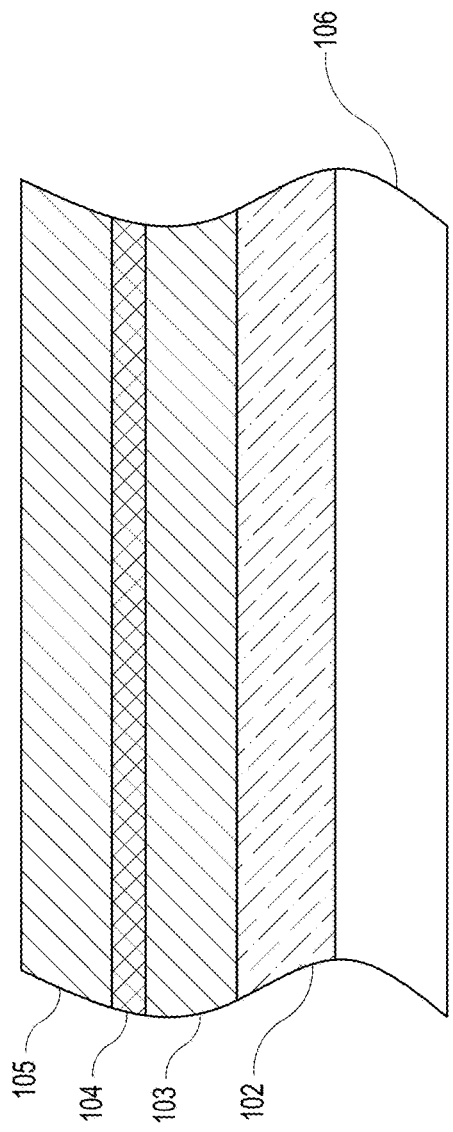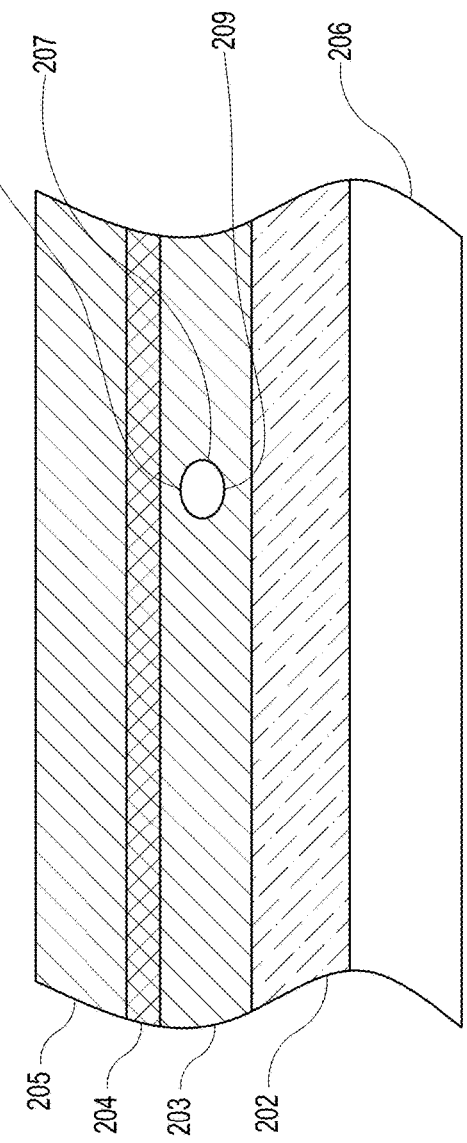

310

```
┌─────────────────┐
│  Prepare Test   │  311
│    Specimen     │
└────────┬────────┘
         │
         ▼
┌─────────────────┐
│    Cool Test    │  314
│    Specimen     │
└────────┬────────┘
         │
         ▼
┌─────────────────┐
│ Activate Heating│
│Component in Thermal│  312
│Communication with│
│ the Test Specimen│
└────────┬────────┘
         │
         ▼
┌─────────────────┐
│Deactivate Heating│  313
│    Component    │
└────────┬────────┘
         │
         ▼
┌─────────────────┐
│   Image Test    │  315
│    Specimen     │
└─────────────────┘
```

*FIG. 3B*

METHODS AND SYSTEMS FOR DETECTING DEFECTS IN LAYERED DEVICES AND OTHER MATERIALS

BACKGROUND

Field

This disclosure generally relates to methods and systems for the non-destructive detection of defects, such as for the detection of disbonds in layered materials and/or devices.

Description of Certain Related Art

Defects may occur during manufacture of a device. For example, a defect may occur during manufacture of the materials that are used to form the parts that make up the device, during manufacture of the parts themselves, or during assembly of the parts to form the device.

SUMMARY OF CERTAIN FEATURES

Defects in devices are typically undesirable, since the defects can cause the device to perform improperly and/or less efficiently, or even to fail prematurely. Thus it is advantageous to be able to identify defects in devices. Some methods to identify defects are destructive, which impairs and/or destroys the item being tested. In contrast, some inspection methods are non-destructive, which can evaluate the properties of the item being tested without causing impairment and/or damage. However, using non-destructive inspection (NDI) techniques to identify certain types of defects, such as disbonds, can be difficult. A disbond is a localized separation or gap between layers of a material or layers of a device.

One form of NDI testing is ultrasonic scanning. Ultrasonic scanning typically works better with uniform density distribution (e.g., a single thickness of a particular material, metal for example, without multi-component and/or layered materials). While ultrasonics can sometimes be used with hard composites to determine disbond areas, their resolution is low and does not discern between the elastomeric layers, metallic layers, and disbond areas unless the disbond itself is very large. More generally, ultrasonic resolution may be too low to be useful to detect disbonds. Furthermore, ultrasonic scanning may have difficulty in differentiating between materials. For example, certain elastomeric and/or composite heaters may comprise soft, resilient inner and outer layers with a metallic heat producing layer bonded between them. This composition of materials can present a resolution problem for ultrasonic scanning NDI methods.

Some other NDI methods include X-Ray, computed tomography scanning ("catscanning"), and/or the like. Such methods can typically discern fairly small disbond areas. However, the item being tested typically must be extensively scanned in perpendicular layers, which can require long exposure to X-Rays and/or sophisticated and expensive equipment. This exposure can cause premature wear on the device and shorten its lifetime. Thus, if a device has been thoroughly characterized and no disbonds have been found, there is a risk that the analysis itself caused damage, prematurely aging the device. Moreover, these techniques typically cannot be used on installed devices (e.g., installed in an airplane).

A further NDI method is thermal imaging of active heating devices. This can be generally inadequate because the imagery is blocked by the operating resistive circuit (heating element, heat source, etc.) which washes-out any disbond areas below the heater. Further, once the thermal image has passed through a heat sink layer, the image becomes smudged with little definition beyond a distorted image of the circuit traces. Additionally, to be useful, this technique typically requires expensive equipment for active inspection, and can only be performed with commercial thermal imaging equipment.

The methods and systems disclosed herein solve several problems with other detection methods. In some embodiments, the methods and systems disclosed herein provide a NDI technique that is highly adaptable (e.g., it can be used during fabrication of devices or in devices that are already installed). It can be fast, simple, accurate, and/or have abundant resolution for diagnostic purposes. Variants can be used with inexpensive imaging, heating, and cooling devices. In some embodiments, forced cooling of the heated test specimen allows a defect-free (or substantially defect-free) portion of the test specimen to cool and the defect to remain hotter. This can enable the defect to contrast with (e.g., stand-out from) the background and/or defect-free portions of the device. Because the insulating effect of the disbond keeps the disbond hotter than the surrounding area after heating and during cooling, the disbond can be resolved. Rapid cooling aids in providing a temperature differential between the disbond and the surrounding material causing resolution levels that previously could not be obtained. The test specimen can be of various forms. For example, in certain embodiments, the test specimen comprises a hollow member, such as a pipe. In some variants, the test specimen comprises a generally flat member, such as sheet of material. Certain embodiments can be used irrespective of the size and/or shape of the test specimen.

A typical elastomeric and/or composite heater build-up will include base dielectric layers to electrically insulate a current carrying circuit layer from the item being heated or the heatsink. The heatsink can be comprised of any material suitable for transferring heat energy and/or that is heat conductive. In some embodiments, the heatsink is a metal (e.g., aluminum, copper, titanium, silver, etc.). In certain variants, the heatsink is a liquid being heated for use (e.g., water, etc.). One or both of the dielectric layers can be any suitable insulating material, including one or more of glass/epoxy composite, silicone rubber, epoxies, polyamides, ethylene propylene diene rubber, ethylene propylene rubber, neoprene, polyacrylate rubber, fluorosilicone rubber, fluoroelastomers, polyethylene, polypropylene, other polymer plastics, composites, teflon, etc. Elastomeric and/or composite heaters are example devices that can be probed with the disclosed methods. Where the heatsink comprises a heat conductive material (e.g., a metal), the elastomeric and heatsink layers may be primarily or secondarily bonded (using glues, adhesives, etc.), vulcanized or otherwise adhered to each other. Because dielectrics are thermal insulators, the normal design strategy is to make them thick enough to maintain grounding and to avoid leakage of current or shorting from, for instance, a resistive heater, while thin enough to have effective heat transfer to the heatsink.

Disbonds may be present at various of the junctures (e.g., interfaces) between or within the layers of the heater. One such juncture is the heatsink-base dielectric interface. In some variants, the methods of thermal imaging described herein are suitable for visualizing disbonds and defects at or below the heatsink-base dielectric interface. In certain implementations, the techniques disclosed herein can be used to visualize defects in materials that are greater than or equal to about 0.003 inches, about 0.12 inches values between the aforementioned values, ranges spanning those values, or otherwise. In certain implementations, the methods described herein can be used to visualize defects that are greater than or equal to about 0.08 mm, about 0.5 mm, about 1 mm, about 3.05 mm values between the aforementioned values, ranges spanning those values, or otherwise. In some embodiments, the methods described herein can be used to visualize defects that are less than about 0.08 mm, about 0.5 mm, about 1 mm, about 3.05 mm values between the aforementioned values, ranges spanning those values, or otherwise. In certain implementations, the methods described herein can be used to visualize defects in materials that comprise a dielectric (or dielectric layers).

Another juncture is between the base dielectric and the heating element. In certain variants, the methods of thermal imaging described herein are suitable for visualizing disbonds and defects at or below the base dielectric and the heating element. As shown in FIGS. 1, 2, and 4, at the side opposite of the heatsink and base dielectric (first dielectric) interface is the base dielectric-resistive heater (e.g., resistive circuit) interface. The resistive circuit heater layer may be any material suitable for use as a heating element. In variants, the heating element (or resistive heater) comprises one or more of a wire (e.g., a metallic wire), a ribbon foil (e.g., a metallic sheet), an etched PC circuit foil, silk screen material (or other metallic screening), "Spray On" or even 3D printed deposited resistive materials. As at the other layer interfaces, voids (disbonds or defects) at the dielectric/heater interface can result in very rapid degradation of the assembly due to overheating of the electrical load carrying layer.

Another juncture is between the resistive circuit and the cover dielectric (e.g., the second dielectric layer). In certain variants, the methods of thermal imaging described herein are suitable for visualizing disbonds and defects at or below the resistive circuit and the cover dielectric interface. In some implementations, the methods of thermal imaging described herein are suitable for visualizing disbonds and defects at or within the cover dielectric interface. In some embodiments, the second dielectric layer, can be any suitable insulating material (independently selected from the material of the first dielectric layer), including one or more of glass/epoxy composite, silicone rubber, epoxies, polyamides, ethylene propylene diene rubber, ethylene propylene rubber, neoprene, polyacrylate rubber, fluorosilicone rubber, fluoroelastomers, polyethylene, polypropylene, other polymer plastics, composites, teflon, etc.

In some cases, disbonds (e.g., in the cover dielectric layer) are visible as localized raised areas (e.g., "blisters"). This can be because the disbond area is not obscured behind the heater layer (e.g., a metallic layer). In some embodiments, it has been found that thermal imaging without the use of a cooling source can be performed on defects at the cover dielectric layer. The cover dielectric may discolor in disbond areas due to overheating, making visual detection possible. Certain of the detection methods disclosed herein advantageously allow detection of a disbond before visual detection is possible and before installation of the device. Whether or not the base dielectric and resistive circuit juncture has a disbond typically cannot be determined visually with the naked eye until device failure. This early detection makes a large difference in whether the area can be reworked, or if the entire unit has to be scrapped. After a device fails, normally the entire system must be discarded.

In some implementations, as the watt density of a heater increases, maintaining a void-free bond between the heatsink and dielectric layers (or other layers) becomes even more important. Device failure may occur in heating devices with watt densities of at least about 5 watts/s$^2$. In certain embodiments, resistive heaters in airplanes (or spacecraft, etc.) operate at watt densities of equal to or at least about 5 watts/s$^2$, about 7 watts/s$^2$, about 10 watts/s$^2$, about 25 watts/s$^2$, about 30 watts/s$^2$, values between the aforementioned values, ranges spanning those values, or otherwise. In some implementations, the methods disclosed herein are capable of diagnosing disbonds in such heaters (or defects in the materials comprising those heaters).

BRIEF DESCRIPTION OF THE DRAWINGS

FIG. 1 is a cross-sectional view of an elastomeric heater without disbonds.

FIG. 2 is a cross-sectional view of an elastomeric heater having a disbond.

FIGS. 3A and 3B are flow charts showing embodiments of processes and methods that may be used to detect defects in devices or materials.

FIGS. 7A-R were captured taken using the testing set-up shown in FIG. 6B.

FIGS. 8A-R were captured taken using the testing set-up shown in FIG. 6B.

DETAILED DESCRIPTION OF CERTAIN EMBODIMENTS

Figure 3A:
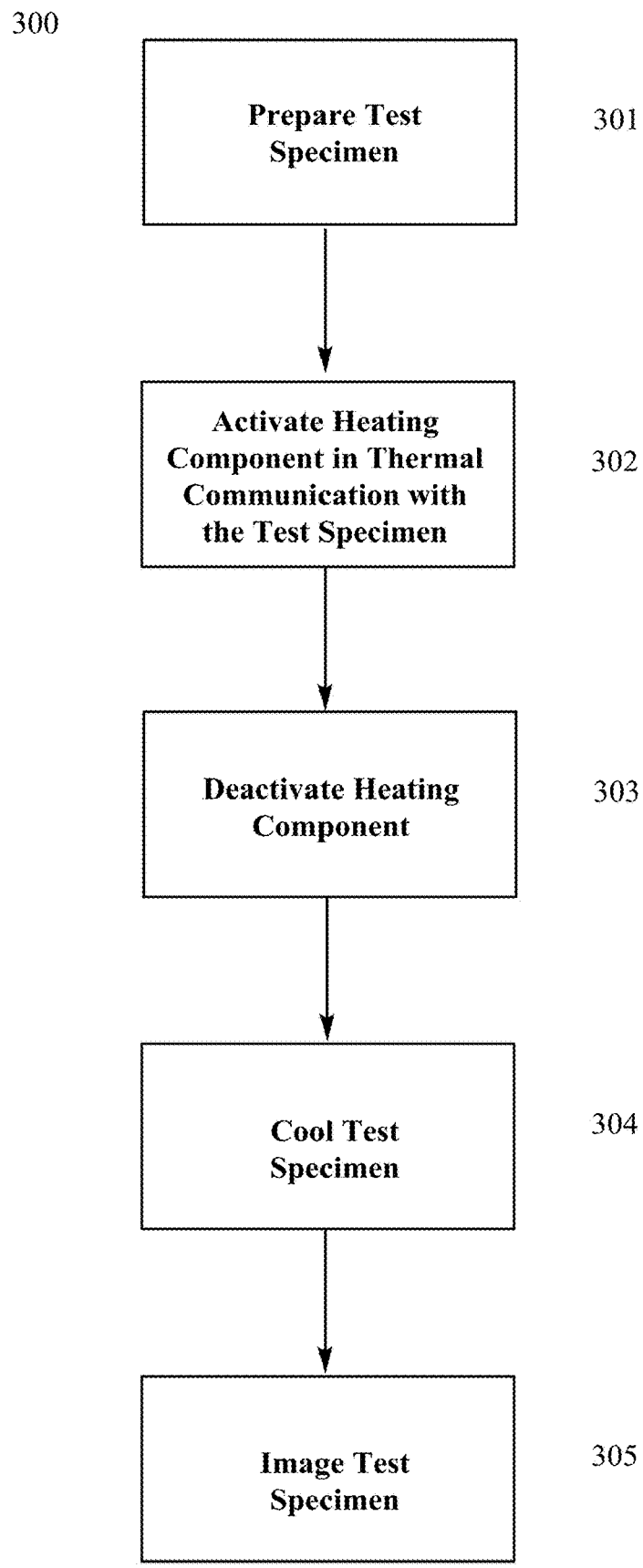

A variety of methods and systems for detecting defects in devices are described herein. These methods and systems may be employed to achieve one or more desired improvements. The methods and systems described are examples only and are not intended to restrict the general inventions presented and the various aspects and features of these inventions. Furthermore, the phraseology and terminology used herein is for the purpose of description and should not be regarded as limiting. For example, although various embodiments are described in connection with the term "disbond," that term is illustrative only and is intended to be just one type of defect that is detectable by the methods disclosed herein. The methods and systems described herein can be applied more generally to a number of types of defects (e.g., cracks, fractures, pits, bubbles, density variations in a material, porous regions in a material, or the like). Thus, in places where the term disbond is used in the disclosure herein, that term is intended to encompass other types of device defects. No features, structure, or step disclosed herein is essential or indispensable.

In several implementations, the methods and systems described herein are suitable for detecting defects in composite devices (e.g., made of multiple different types of materials, multiple layers of the same material, etc.) or within a unitary material (e.g., a defect in a sheet of metal, elastomer, etc.). In some embodiments, the methods and systems disclosed herein allow detection of defects in layered devices, such as, devices fabricated using multiple layers of a material or materials. In several implementations, the methods and systems disclosed herein allow detection of defects in non-layered materials (e.g., an imperfection embedded in a single material).

Example Heating Device

FIG. 1 illustrates a cross-sectional view of an embodiment of a layered heating device 101 (e.g., an elastomeric heater). As shown, the layered heating device 101 can comprise and/or be coupled with a heat sink 102 (e.g., an area that is to be heated) that absorbs and/or transfers heat. In some embodiments, the heat sink 102 comprises and/or is coupled to a wall of a pipe. The heat sink 102 can be metallic. A first dielectric layer 103 can be layered over the heat sink 102. A heating component 104 (e.g., a resistive circuit configured to emit heat) can be layered over the first dielectric layer 103. A second dielectric layer 105 can be layered over the heating component 104. In some embodiments, one or more of these layers could be excluded or additional layers (e.g., one or more dielectric layers) could be added.

As shown in FIG. 1, in some implementations, the heatsink 102 of the heating device 101 is in communication (e.g., fluidic communication) with a passage 106. In certain variants, the passage 106 is configured to hold and/or convey a fluid (e.g., water, ethylene glycol, alcohol, etc.). For example, the heating device 101 shown in FIG. 1 can be representative of a section of tubing. In some embodiments, fluid can be transferred through the passage 106 (e.g., the lumen of a tube). The fluid can be heated by heat from the heating component 104.

In some instances, the heating device 101 is configured for use in a potable water system, such as on an airplane or spacecraft. In some embodiments, as water passes through the tubing via the passage 106, the layered heating device 101 heats the potable water. This heating can inhibit or prevent the water from freezing, even when exposed to the low temperatures, such as those encountered at typically cruising altitude during air travel (e.g., about −40° C.).

Example Heating Device with a Disbond

FIG. 2 illustrates another embodiment of a heating device 201. The heating device 201 can comprise a heatsink 202, a first dielectric layer 203, a heating component 204, and a second dielectric layer 205. In some embodiments, the heatsink 202 is configured to transfer heat to and/or from a passage 206, such as a water channel. As shown, the heating device 201 of FIG. 2 has a disbond 207 embedded within a layer (e.g., the first dielectric layer 203) and/or encapsulated within the device. In many cases, the disbond 207 is not detectable by visual inspection. A disbond can occur in many locations within a heater stack-up and cause failures. For instance, in some circumstances, a disbond at the outer-most dielectric-to-dielectric layer will cause a surface bubble, resulting in a dielectrically weak spot as well as a potential hot spot. A disbond between the heat sink (the item being heated) and the remainder of the heater will cause a gas pocket to form between the heatsink and the heater. This leads to a general delamination over time and a failure typically over a wide area. The most severe disbond is between the resistive layer and the heat sink side. This allows the resistive circuit to operate without attenuation, resulting in a very quick overheat condition and potential catastrophic failure.

Defects, such as the disbond 207, may occur between or within the layers of the device 201. Disbonds can result from, for example, an air bubble being trapped between layers prior to bonding, an adhesive being incompletely applied to a surface during manufacture, from adhesives incompletely or incorrectly curing between layers, from incomplete fusing of layers, or other problems. In some embodiments, the disbond occurs where bonding is insufficient or incomplete during manufacturing.

In some cases, a disbond is a gaseous pocket (e.g., air, etc.). Such gases can act as insulators and not conduct heat as readily as a bonded (e.g., solid) material. Thus, the gaseous pocket areas can inhibit or block the conductive transmission of heat from the "hot" side 208 (e.g., near the heating element 204) to the "cold" side 209 of the assembly (e.g., the heat sink 202 or the area outside of the heater). Conversely, disbonds can inhibit or block the conductive transmission of cold from the cold side 209 (e.g., the heatsink 202) to the hot side 208 of the assembly (e.g., the cover dielectric 205). Thus, disbonds can inhibit and/or reduce the effectiveness of the heating device.

Disbonds can increase in size over time and can eventually cause device failure. For example, as the heating element cycles on and off, the disbond area slowly can expand and grow due to the expansion of the gas in the disbond. This expansion eventually results in a peeling back of the edge of the disbond area (much as ice expansion forms cracks in solid rock). Eventually the disbond area grows large enough and allows enough of the heater circuit (e.g., the heating element) to operate without heat sink conduction (e.g., heat cannot be dissipated) that uncontrolled heating and/or burn failure occurs, such as either by electrical grounding (e.g., through carbonization of the base dielectric material) or by exceeding the destructive temperature of the resistive element and burning the circuit open.

Typically, assemblies with disbonds represent quality and performance concerns, which can require such assemblies to be replaced or reworked. Moreover, as mentioned elsewhere herein, resistive and/or elastomeric heaters can be used in aircraft and spacecraft to heat a liquid (e.g., potable water, antifreeze, coolant, etc.) and/or to prevent it from freezing. Device failure can be costly and can have serious detrimental consequences (e.g., lack of potable water availability, or lack of proper cooling of engine parts where coolant tubing fails).

Example Methods and Systems of Detecting Disbonds

Various embodiments described herein provide non-destructive inspection (NDI) techniques that can be applied to devices and materials without loss of integrity of the test specimen. In some variants, the methods and systems disclosed herein are advantageously rapid, accurate, and inexpensive. Further these techniques can be used to inspect the quality of materials (e.g., whether disbonds are present) prior to installation or after the devices (and/or materials) are installed. This can allow diagnostic and preemptive repairs non-destructively and/or can reduce the risk of device failure while in use.

In some variants, the disclosed diagnostic methods and systems involve heating at least the portion of the device, cooling the portion of the device (or allowing it to cool), and imaging the device (e.g., using a thermal imager) after heat is removed. An embodiment of a diagnostic method 300 is demonstrated in FIG. 3A. As shown, in some implementations, the method 300 involves a step of preparing a test specimen 301, activating a heating component that is in thermal communication with the test specimen 302, deactivating the heating component 303, cooling the test specimen 304, and imaging the test specimen 305. In some embodiments, imaging the test specimen 305 is performed at a time when the disbond or defect is at a temperature that is higher than the fully bonded (e.g., defect-free) portions of the test specimen.

Without being bound to any specific mechanism, it is believed that because a disbond reduces the conductive transmission rate of heat from a hot portion of the device, the disbond area (e.g., the gasses inside the disbond and/or the area of the hot side of the dielectric layer that is blocked by the disbond) remains hotter than the rest of the device for a period of time after heating is removed (and/or when cooling is applied). In some implementations, by capturing a thermal image of the device (e.g., by real-time imagine, taking a thermal photograph or video, etc.) after the heating element is turned-off (e.g., deactivated or lowered) and/or when cooling is applied, disbonds and defects are detectable as hotter portions of the device than the cooler properly bonded (e.g., solid and/or portions without air pockets) portions of the heating device.

In some embodiments, by using the NDI techniques disclosed herein, because disbonds or defects appear to be hotter relative to the properly bonded or solid portions of the devices, the location of a disbond can be determined. The specimen with the disbond can then be identified, repaired, removed, and/or discarded. This technique is advantageous because, for example, many other techniques either cannot be applied to devices conveniently without damaging or cannot be implemented on devices in the field (e.g., installed in an aircraft).

As mentioned above, the method can include preparing a test specimen 301. In some embodiments, preparing the specimen 301 includes fabricating a specimen (e.g., a layered heater, a device, etc.). In some embodiments, when the test specimen 301 is a layered heater, the preparation of the test specimen 301 includes layering a first dielectric onto a heatsink. In some embodiments, the preparation of the test specimen 301 includes a step for layering a resistive heater over the first dielectric layer. In certain implementations, the preparation of the test specimen 301 includes a step for layering a second dielectric layer (a cover) over the resistive heater. In some variants, preparing the specimen 301 includes a step of securing (e.g., clamping, etc.) the test specimen in a position that allows imaging of the test specimen. In some embodiments, the test specimen comprises a hollow member, such as a pipe. In some embodiments, the test specimen comprises a generally flat member, such as sheet of material.

In some embodiments, the method includes activating a heating component in thermal communication with the test specimen. In some implementations, this step can comprise activating a resistive heater within the test specimen. In some variants, this method can involve heating the test specimen with an external heat source (e.g., a resistive heater, a heat gun, a space heater, a blow dryer, a torch, a steam bath, etc.).

As previously stated, the method can include deactivating the heating component. In some embodiments, deactivating the heating component includes turning the heating component off or decreasing the amount of heat generated by the heating component, such as by reducing the power applied to the heating component.

In some implementations, the method includes cooling the test specimen. In certain variations, the test specimen is cooled using flowing water that is in thermal contact with the test specimen (e.g., through a tube of a tube heater). In certain implementations, the test specimen is cooled by directing low temperature air or liquid from, for example, a swamp cooler, a cooling mist, cooled air, dry ice, liquid nitrogen, an air conditioner, etc., onto or near the test specimen.

In some variants, the method includes imaging the specimen. In some implementations, the imaging step is performed by taking thermal photographs of the test specimen as it is cooled. In some variants, the imaging step is performed by taking a thermal video of the test specimen as it is cooled. In certain embodiments, the thermal images and/or videos can then be analyzed to determine whether the test specimen has disbonds or defects. In some variants, the imaging step is performed in real time by monitoring a thermal image of the test specimen as it cools.

Another diagnostic method 310 is demonstrated in FIG. 3B. As shown, the methods can involve preparing a test specimen 311, cooling the test specimen 314, activating a heat component 312, deactivating the heating component 313, and/or imaging the test specimen 315. By virtue of the insulating feature of disbonds within the test specimen, the disbond remains hotter than fully bonded (or defect-free) portions of the test specimen. In some embodiments, the imaging step 315 is performed at a time when the disbond or defect is at a temperature that is higher than the material of the test specimen. In some embodiments, disbonds and defects are present as repeatable images. In certain implementations, the disbond or defect spot(s) appear as a warmer area.

In certain embodiments, the method 310 can involve steps that are similar to, the same as, or different from those performed in schematic 300. In some embodiments, the methods of schematic 310 and schematic 300 are in a different order. In some embodiments, the method 310 includes preparing the specimen. In some implementations, the method 310 includes cooling the test specimen. In some embodiments, the method 310 includes activating a heating component in thermal communication with the test specimen. In some embodiments, the method 310 includes deactivating the heating component. In some variants, the method 310 includes imaging the specimen.

Figure 4:
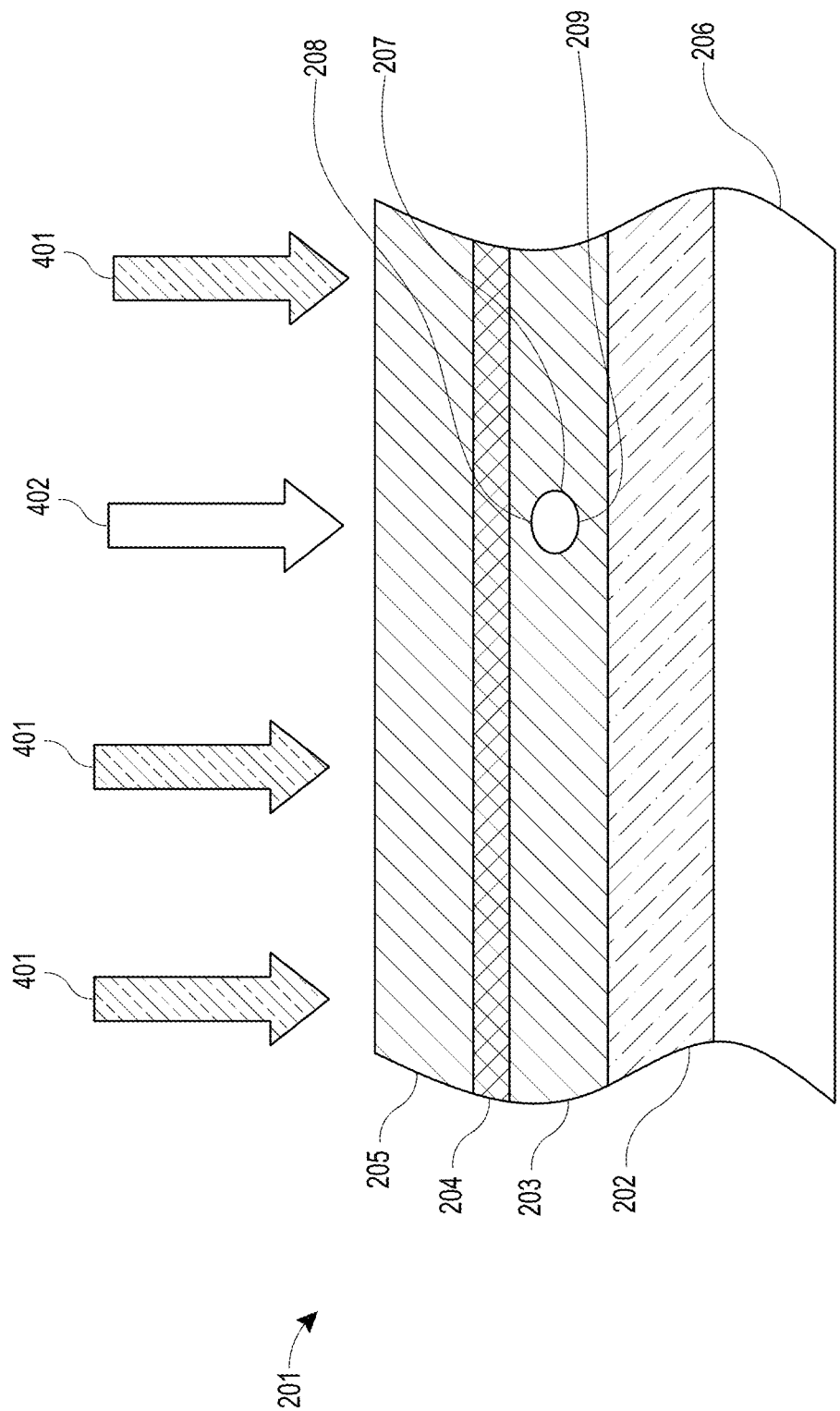
FIG. 4 is a cross-sectional view of the elastomeric heater of FIG. 2 undergoing thermal analysis.

FIG. 4 is a cross-sectional area of a portion of the elastomeric heater 201 undergoing NDI analysis using an embodiment of the disclosed methods. In some embodiments, a thermal load is applied to the heatsink 202 (e.g., by flowing a fluid through the passage 206). The heating element 204 can be activated to provide a heating of the device layers 202, 203, 204, 205 and the disbond 207. In some embodiments, the heating element 204 warms the device 201 to a temperature above or substantially above the temperature of the thermal load. In some embodiments, the heater achieves a device temperature that is greater than or equal to about 35° C., about 50° C., about 75° C., about 100° C., about 110° C., values between the aforementioned values, or ranges spanning those values.

The heating element 204 can be deactivated. Once the heating element 204 is deactivated, thermal load (e.g., the fluid flowing through the passage 206) rapidly cools the device 201. The thermal load can increase the resolution of the disbond. A thermal imaging device can be activated. In some embodiments, a substantially uniform thermal transmission rate can be detected in successfully bonded portions of the elastomeric heater 201. Since the disbond 207 reduces the thermal (e.g., conductive) transmission rate of heat from the hot side 208 (e.g., the heating component 204) to the cold side 209 of the assembly (e.g., the heat sink 202), the cold side 209 of the assembly is exposed to enhanced cooling by the fluid flowing through the tube passage 206 and/or exposed to a reduced amount of heating. This results in a region of increased temperature (corresponding to the location of the disbond) that is discernable through thermal imaging.

In some embodiments, the heating component 204 is configured to cool the test specimen. This can result in areas of the device with proper bonding appearing as darker portions on the thermal image 401. In contrast, the disbond 207 area can stand out as a hotter (e.g., brighter) portion of the thermal image.

In some embodiments, as discussed elsewhere herein, cooling is applied as a thermal load to the heat sink. In certain variants, as discussed elsewhere herein, maintaining continual thermal loading of the cold side of the assembly can facilitate and/or improve the resolution of disbonds. In some embodiments, a uniform negative thermal load (e.g., cooling) on the heatsink side of the assembly is provided. In certain variants, increasing the negative thermal load (by using a cooling medium with a higher specific heat, or by increasing the temperature delta from front to rear by using a Cryogenic gas), the contrast (e.g., resolution) between the disbond and bonded areas is increased. In various implementations, increased contrast can increase the resolution of the methods allowing decreased sizes of defects to be detected. In some embodiments, for tubes, hoses, valves, and/or other closed or fluid (including gases) carrying instruments, circulating chilled water (with a heat capacity of 1.0) through the interior will produce a satisfactory thermal load. In some embodiments, using a thermal load, a relative temperature differential between the disbond area and the bonded area can be acquired. In some embodiments, the difference in temperature between the bonded areas of the test specimen and the disbond is at least about 5° C., about 10° C., about 20° C., or about 30° C., values between the aforementioned values, ranges spanning those values, or otherwise. In certain variants, a thermal imager can resolve a defect/non-defect area temperature difference of equal to or less than about 5° C., about 10° C., about 20° C., or about 30° C., values between the aforementioned values, or ranges spanning those values.

In some embodiments, the thermal loading of the cold side (e.g., via the heat sink 202) increases the visualization time for imaging and recording the phenomenon and increases resolution. In certain implementations, heat from the disbond area can be inhibited from transferring into the surrounding bonded area. In certain implementations, the image is captured during the period of time in which a temperature differential exists between the disbond and the remainder of the material surrounding the disbond.

As discussed elsewhere herein, a thermal load is provided at a temperature below that achieved by the heater. In certain variations, the cooling thermal load is provided at a temperature that is equal to or less than about −0° C., about 0° C., about 20° C., about 30° C., values between the aforementioned values, or ranges spanning those values. In certain variations, the temperature of the cooling thermal load is equal to or less than about room temperature (e.g., 21-22° C.).

In some variants, after initiating the cooling of the test specimen (as shown in, for example, FIG. 3B), the heater assembly is powered at a low level for a short period of time to provide rapid heating of the device layers 202, 203, 204, 205 and the disbond 207, and a thermal camera (not shown) is used to image the heater assembly. In some embodiments, for thermal imaging, the heating element is powered to generate equal or less than about 1 watt/in$^2$, about 5 watt/in$^2$, about 10 watt/in$^2$, about 20 watt/in$^2$, about 30 watt/in$^2$, values between the aforementioned values, or ranges spanning those values. In some embodiments, for thermal imaging, the heating element is powered to generate equal or greater than about 1 watt/in$^2$, about 5 watt/in$^2$, about 10 watt/in$^2$, about 20 watt/in$^2$, about 30 watt/in$^2$, values between the aforementioned values, or ranges spanning those values. In some embodiments, for thermal imaging, the heating element is powered to between about 1 watt/in$^2$ and about 30 watt/in$^2$, values between the aforementioned values, ranges spanning those values, or otherwise. In some embodiments, the heating element is powered to generate equal or greater than about 30 watt/in$^2$, a value that typically is used in aircraft anti-ice components. In some embodiments, the heating element is activated for a period of less than or equal to: about 30 seconds, about 5 seconds, about 2 seconds, about 1 second, about 0.5 seconds, values between the aforementioned values, ranges spanning those values, or otherwise. In some embodiments, the heating element is activated for a period of less than or equal to about 1 second. In certain implementations, the heating element is activated for a short period of time to allow fast visualization of disbonds. In some embodiments, the shorter the operation of the heating element, the more rapid the visualization of disbonds. In certain embodiments, the heating element is operated only long enough to provide a substantially uniform heating of the area being tested and is then deactivated.

In some embodiments, the disbond is visualized by capturing a thermal image of the test specimen at a time after the heating element is deactivated. In some variants, the time allowed to pass between the deactivation of the heating and capturing the image of the test specimen is less than or equal to: about 1 minute, about 30 seconds, about 20 seconds, about 10 seconds, about 5 seconds, values between the aforementioned values, ranges spanning those values, or otherwise. In some embodiments, the heat decay time (e.g., the time between imaging and heater shutdown) is between about 10 seconds and about 20 seconds.

In some implementations, activating the heating element for longer periods (e.g., about 1 minute or more) will still allow visualization of disbonds, but may require longer periods of cooling times before sufficient resolution during thermal imaging can be accomplished (e.g., greater than or equal to about 1 minute or about 2 minutes). In some embodiments, depending on the thermal load being applied, the preferred image time may be as long as 1 minute or more.

In some embodiments, the thermal images can be captured using off-the-shelf, commercially available thermal cameras. In certain implementations, higher resolution thermal cameras allow resolution of smaller defects. In some variants, the number of pixels available and the size of the defects that can be detected. In some embodiments, disbonds and defects can be visualized using cameras having an array that is no more than about 48×48 (2,304 pixels), about 140×140 arrays (19,600 pixels), values between the aforementioned values, ranges spanning those values, or otherwise.

In some embodiments, the thermal imager is positioned at a distance from the test specimen. In certain variants, the thermal imager and the test specimen spaced apart equal to less than: about 6 inches, about 1 foot, about 2 feet, about 3 feet, values between the aforementioned values, or ranges spanning those values.

In some embodiments, where the test specimen is a tube, the test specimen has a length measured in the direction of the lumen. In certain embodiments, when acquiring data, the thermal imager is positioned so that the lens of the imager is substantially parallel to the length of the test specimen. In some embodiments, the thermal imager is positioned so that the lens of the imager makes only small deviations from parallel to the length of the test specimen (e.g., is at a slight angle to the test specimen, such as less than or equal to about 10°). In some implementations, this arrangement allows improved resolution relative to when the test specimen and thermal imagers positioned at larger angles with respect to one another.

The resolution achieved using the disclosed methods can allow visualization of small disbonds and defects in thick devices or materials. In some embodiments, it is possible to image disbonds and defects that are less than or equal to about: $\frac{1}{10}^{th}$ of an inch in diameter, $\frac{1}{100}^{th}$ of an inch in diameter, $\frac{1}{1000}^{th}$ of an inch in diameter, values between the aforementioned values, ranges spanning those values. In some embodiments, the disclosed methods allow visualization of disbonds and defects in materials having a thickness of equal to or at least about: 0.005 inches, 0.01 inches, 0.05 inches, 0.125 inches, 0.25 inches, values between the aforementioned values, ranges spanning those values, or otherwise. In some embodiments, the disclosed methods allow visualization of disbonds and defects in materials having a thickness of less than about: 0.005 inches, 0.01 inches, 0.05 inches, 0.125 inches, 0.25 inches, values between the aforementioned values, ranges spanning those values, or otherwise. In some embodiments, the disclosed methods allow visualization of disbonds and defects in materials having a thickness of between about 0.005 inches and about 0.125 inches.

In some variants, the disclosed methods can be used on devices other than elastomeric and/or resistive heaters (and heating tubes). For instance, defects in a flat material (not shown), layered or non-layered, could be detected by cooling a side of the plate (e.g., by flooding the cold side with localized $CO_2$; spraying the cold side with a liquid, then evaporating the surface to reduce the temperature; applying dry ice; misting water on a side and evaporating by exposing the surface to a fan; etc.). In some implementations, heat can be applied using a resistive circuit (as in the heating component 204 of FIG. 2) or by using an external heating source (e.g., a heat gun, space heater, etc.) applied to an opposite side of the sheet. Defects could then be resolved using a thermal imaging device. Generally, the methods described herein could be applied to any material on which access to the front and back of the material is possible. For instance, heat could be applied on one side of the material and/or cold to the opposite side to prepare a temperature gradient that allows visualization of defects in the material (using an imager on a side opposite where cooling is performed). In some embodiments, the opposite configuration could be used. In some embodiments, for example, heat could be applied on one side of the material and/or cold to the opposite side to prepare a temperature gradient that allows visualization of defects in the material (using an imager on a side where heating is performed). In some applications the heater is bonded to a heatsink and the heatsink is generally of a dense material of some thickness (as described elsewhere herein). In some embodiments, the test specimen is so thick that it is thermally opaque to some extent, such as being substantially or completely thermally opaque within the time period of the inspection process (e.g., less than or equal to about 5 minutes). In some embodiments, those thermally opaque materials can be imaged from the heater side (since that is the area that is of greater interest in some circumstance) and that is the hot side. In some embodiments, when imaging for example a pure composite sheet (e.g., layers of fiberglass), the tester can analyze the material from either the hot or cold side. In some embodiments, the imaging, the heating, or both are applied to a side of a test material that is more accessible.

In some embodiments, defects in non-layered tubing could be detected using external heat sources instead of embedded heating components (e.g., a resistive heater). For example, in certain variations, a heat gun (or other heating device) could be used to heat the outside of the tubing while cool water (e.g., cool relative to the temperature of the heated tubing surface) is drawn through the tubing. By removing the heat source and imaging the tubing, defects in the tubing could be resolved, as described elsewhere herein. In some embodiments, thermal images of disbonds and/or defects are captured by imaging the cold side (e.g., the unheated or cooled side) of the test specimen (e.g., device and/or material being analyzed). In some variants, the thermal images of disbonds and/or defects are captured by imaging the hot side (e.g., the heated side) of the test specimen (e.g., device and/or material being analyzed).

Certain embodiments of the disclosed methods allow relatively large areas of devices or materials to be quickly triaged, assessed, and/or analyzed. In some embodiments, areas equal to or at least about 1.5 in$^2$, about 6 in$^2$, about 1 ft$^2$, about 2 ft$^2$, values between the aforementioned values, or ranges spanning those values can be analyzed with a single thermal image and/or at a single time. In certain embodiments, a section of tubing having a length of equal to or at least about 1.5 in, 3 in, about 6 in, about 1 ft, values between the aforementioned values, or ranges spanning those values can be analyzed with a single thermal image and/or at a single time. In some embodiments, the amount of area that can be imaged is dependent on the resolution of the imager. For instance, if the imager has a higher resolution and/or pixel count, a larger image can be captured than when using an imager with lower resolution. In certain embodiments, the size of the image captured is a function of the size of the image captured by the thermal imager.

In some embodiments, two different thermal images (e.g., a first and a second image) can be captured in less than or equal to: about 2 minutes, about 1 minute, about 30 seconds, about 15 seconds, about 1 second, values between the aforementioned values, or ranges spanning those values. In some embodiments, a time to resolve a disbond can be determined for a test specimen and then, during analysis, an image can be captured times where the disbond is estimated to be resolved. In some embodiments, image capture (and/or analysis of a test specimen) can be performed at the rate at which a thermal imager is able to cycle (e.g., the rate at which different images can be captured). For example, in some embodiments, analysis is a function of how quickly the thermal imager (e.g., camera) cycles through different images. In some embodiments, about 6 inches length (or about 6 in$^2$ area) of a test specimen can be imaged about every 20 seconds. In some embodiments, about a 6 in length (or 6 in$^2$ area) of a test specimen can be imaged about every 10 seconds. In some embodiments, about 6 inches (or about 6 in$^2$ area) length of a test specimen can be imaged about every second. In some embodiments, different images can be captured with an imager (e.g., a thermal camera) at a rate of equal to less than about 10 seconds, about 20 seconds, values between the aforementioned values, or ranges spanning those values. In some embodiments, an imager can capture 1 shot/second and analysis of images can be performed at that rate. For instance, different areas of a test specimen can be heated and imaged as they cool allowing analysis of that area. In other embodiments, for imagers that capture video (e.g., full motion video), real-time analysis of the test specimens can be performed.

Some embodiments of the disclosed methods are broadly applicable to any device for which there is access to both a heated and heat sink (cooled) side of the assembly. This non-destructive testing can take place anytime during the life cycle of a structure to be tested to analyze breakdown of the structure. In some variants, the process can be used to determine disbonds in non-heated elastomeric and composite structures, such as by applying a generally continuous (e.g., cooling) thermal load to the backside of a test area, applying a generally uniform heat application to the front side of an assembly, and imaging the front side, such as with a thermal camera.

In some implementations, the insulating effect of the disbond or defect can be imaged as a portion of an image that is colder than a properly bonded portion of the device. For example, a thermal image can be captured at a time when the device is warming and when the disbond has not reached the temperature of the properly bonded device. In some embodiments, the thermal images and/or video of the device can be captured while the test specimen is cold (e.g., ambient temperature, or the temperature of the thermal load, etc.). In some implementations, the heater can be activated during imaging and during heating of the heater. In some embodiments, the disbond or defect will remain cooler than the bonded (or solid) portions of the test specimen for a period short at which time it can be visualized. In some embodiments, real-time imaging of the heating and cooling process can image the disbond or defect. In some embodiments, the disbond or defect can initially appear as a cooler portion (e.g., dimmer, dim, etc.) of the test specimen (when the heater is first activated and the disbond heating lags behind the bonded/solid heating rate) and the disbond or defect can appear as a hotter portion (e.g., brighter) of the test specimen (when the heater is deactivated).

Some embodiments pertain to a system for diagnosing disbonds. In some embodiments, the system comprises a test specimen (e.g., a material, device, elastomeric heater, etc. to be analyzed). In some embodiments, the system comprises a heat source, such as a resistive heater, a heat gun, a space heater, a blow dryer, a torch, a steam bath, etc. In some embodiments, the system comprises a cooling source, such as a fluid (e.g., water) flowing through a tube, a swamp cooler, a cooling mist, cooled air, dry ice, liquid $CO_2$, liquid nitrogen, an air conditioner, etc. In certain implementations, the system comprises a thermal imager (e.g., a thermal camera or video imager). In some variants, the system comprises a stand to hold the thermal imager in place during imaging. In various embodiments, the system comprises a stand to hold the test specimen in place during imaging.

SUMMARY

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Any portion of any of the steps, processes, structures, and/or devices disclosed or illustrated in one embodiment, flowchart, or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

Some embodiments have been described in connection with the accompanying drawings. Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Also, the separation of various components in the implementations described above should not be understood as requiring such separation in all implementations, and it should be understood that the described components and systems can generally be integrated together in a single product or packaged into multiple products. Additionally, other implementations are within the scope of this disclosure.

Conditional language used herein, such as, among others, "can," "could," "might," "may," "e.g.," and the like, unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

In summary, various embodiments and examples of testing methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

EXAMPLES

Example 1

Several experiments were performed to detect disbonds in various materials. For this experimental example, a tube with a heater bonded to the exterior (similar to what is used in commercial aircraft for potable water distribution) was used. The test specimen in this test was a layered elastomeric heater. Between the heating layer and the tube (where water is conveyed) was added several teflon discs having diameters of about 0.25 in., about 0.125 inches or about 0.063 inches and thicknesses of about 0.001 inches. These discs were added to imitate disbond portions of a layered heater. Both ends of the tube were connected to a water pump/reservoir and water was circulated at a rate sufficient to generate a minimum of about 2× cubic capacity of the hose per minute. Ambient water (at about 21° C.) was pumped through the tube heater.

Figure 5A:
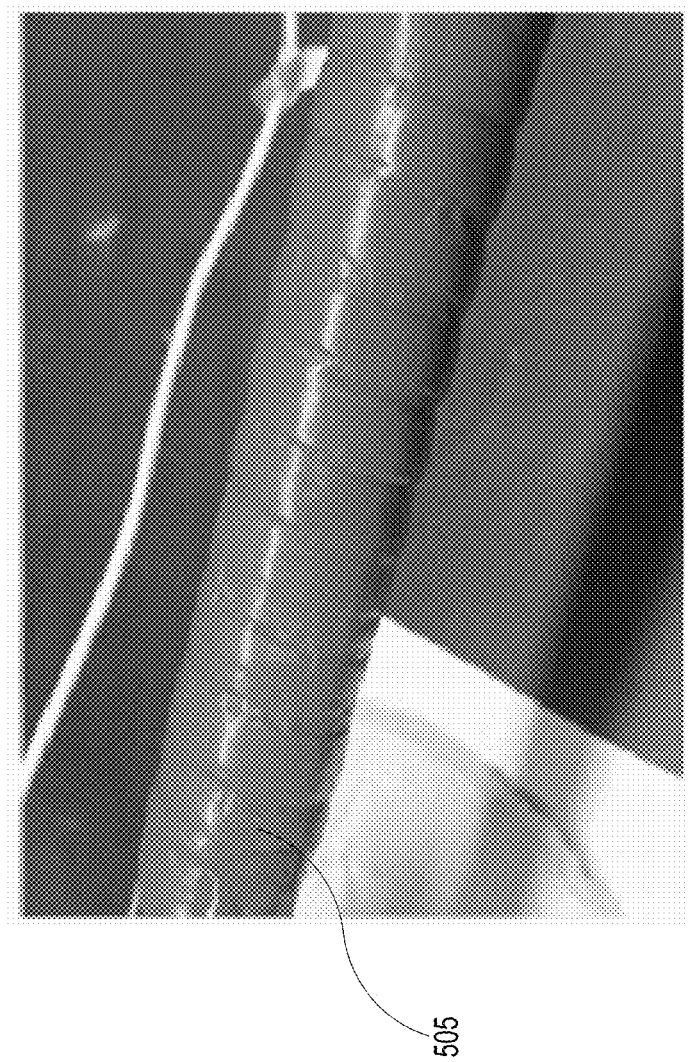
FIGS. 5A-5C are photographs of a heating device taken with a normal camera (FIG. 5A), with a thermal imaging camera during heating (FIG. 5B), and with a thermal imaging camera during cooling (FIG. 5C).

During the test set-up, the thermal imager was initialized and aimed and/or focused on the test specimen. A picture of the outside of the elastomeric heater 505 is shown in FIG. 5A. For testing recording, a support structure (e.g., a tripod, clamp and stand, etc.) was used to position the imager. The support structure (and/or the imager attached thereto) was maintained at a distance of between about 18 inches and about 24 inches (depending on the focal length of the images and the level of detail desired) and thermal imager was maintained approximately parallel to the test specimen (so the length of the test specimen was along the width of the image being captured by the imager).

At that time, the heater was connected to a switchable power source. For high powered heaters, either a transformer (DC power) or a Variac (AC power) could be used to reduce the watt density of the heater assembly. The heater was operated only to energize it for a period of time long enough to produce a suitable temperature delta for imaging of the conductive differentiation. The heater was not left on as it would be in normal use (e.g., for a prolonged period). The temperature delta was achieved by powering the heater for approximately 1 second.

Figure 5B:
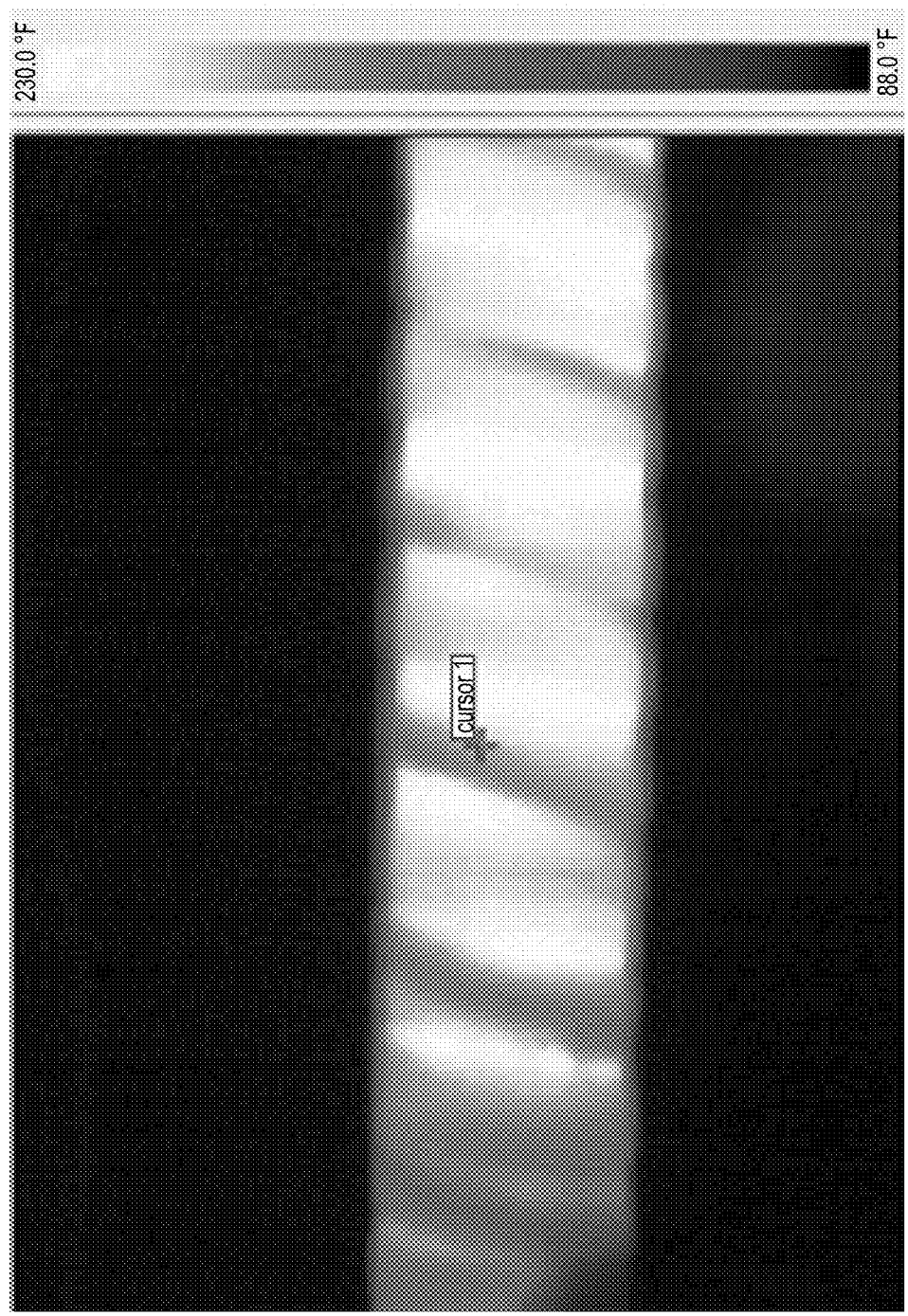

The thermal imager was used to capture an image of the test specimen at about the time that the heater was de-energized (FIG. 5B). In this implementation, when the heater was activated (even for only a short time of 1 second), a temperature of about 113° C. was achieved in the test specimen. In some embodiments, it is advantageous to conduct the thermal monitoring in real time as the contrast between hotter and cooler portions of the test specimen image increase.

Figure 5C:
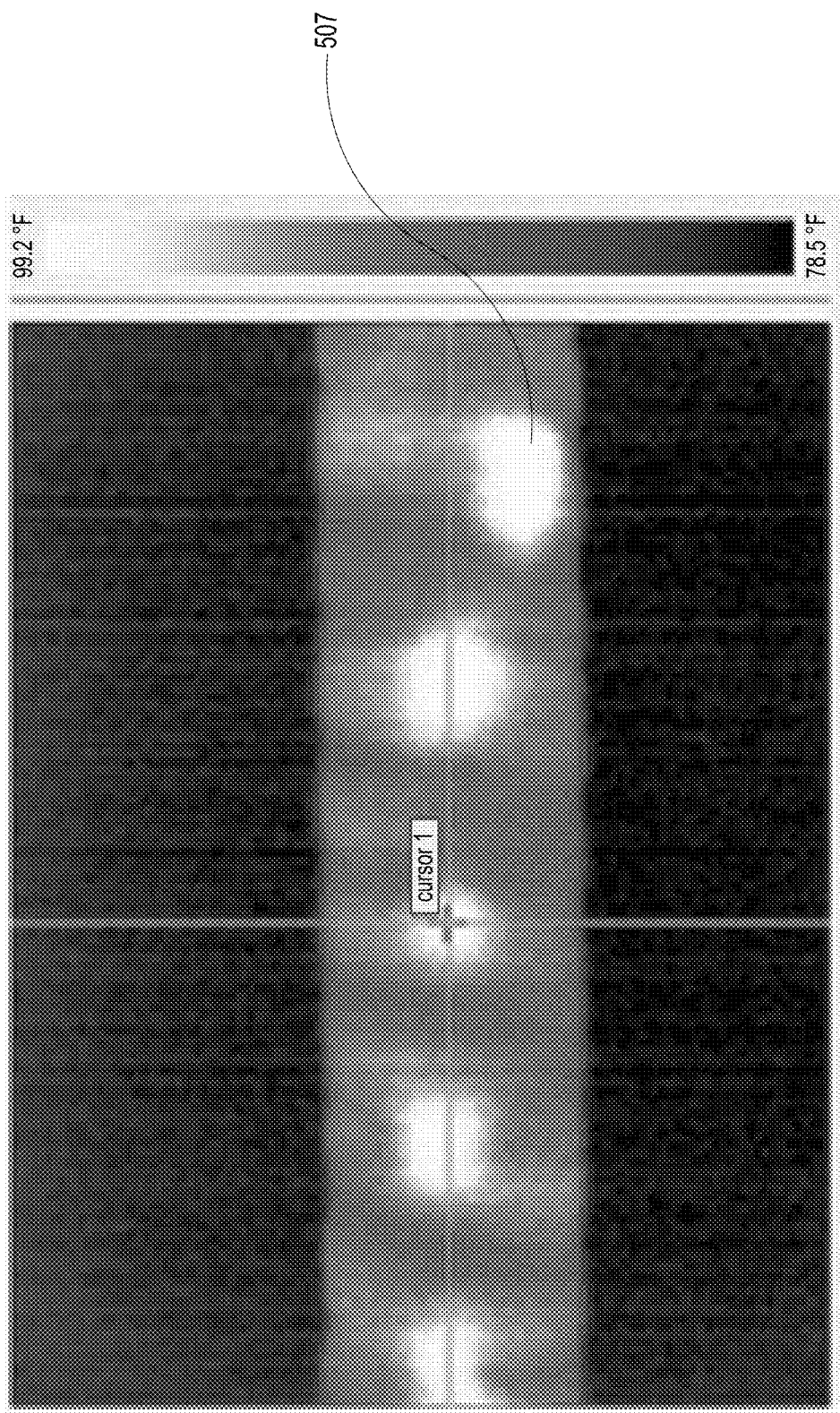

Thirty seconds after the heating was terminated, the thermal imager was used to capture another image of the test specimen (FIG. 5C). Depending on the thermal load being applied, the image time may be as long as 1 minute or more to resolve. As shown in FIG. 5C, the test disbond/defect spots 506, 507 clearly appeared as a contrasting (e.g., warmer in the thermal image) area. In some instances, as shown, the disbond areas appeared to have faded edges 507. A thin spot in the cover dielectric appears with a sharper cutoff line at the edge of the disturbance because it is closer to the outside surface (see the vertical white band in FIG. 5C. In some embodiments, where higher resolution of the exact dimensions of a defect in a three-dimensional device (such as a tube heater), are necessary, that device can be manipulated in three dimensional space to focus the disbond so that it is closest to the thermal imager. For example, where a disbond is visualized at the top of a heater tube during image capture, the heater tube can be twisted in three dimensional space so that the disbond directly faces the thermal imager during image capture. By virtue of the non-destructive nature of image capture using this method, the testing can be performed several times and the disbonds can be repeatably imaged.

Example 2

Figure 6A:
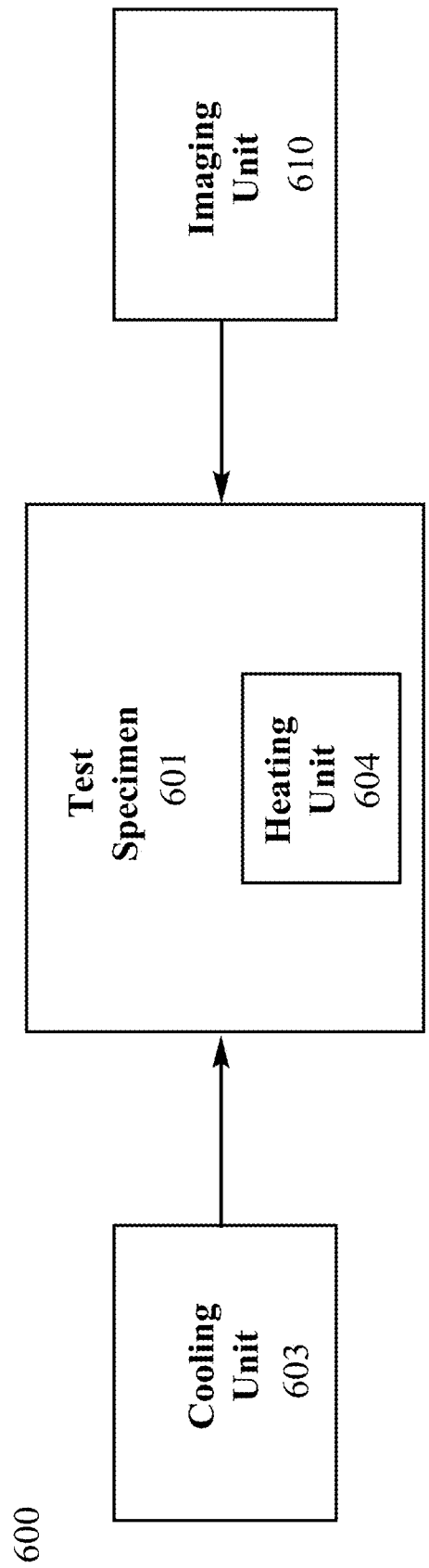
FIG. 6A schematically illustrates an embodiment of a system for imaging a test specimen.
Figure 6B:
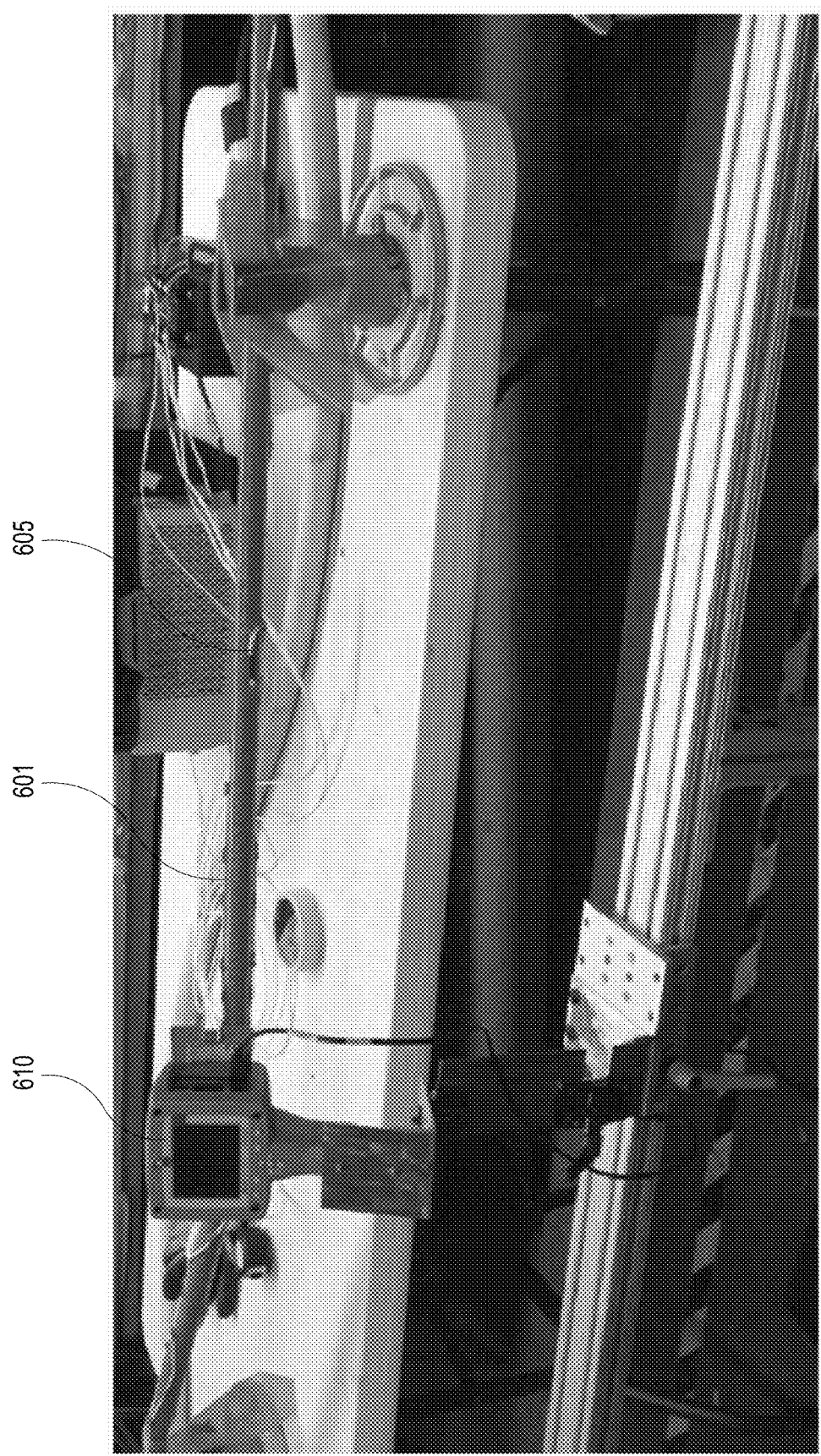
FIG. 6B is a photograph of an example of the system of FIG. 6A.

For this experimental example, the set-up shown as a schematic diagram 600 in FIG. 6A and as a photograph in FIG. 6B was used. For this experiment, the test specimen 601 was a tube heater having an internal heating unit 604 (e.g., a layered heater, similar to what is used in commercial aircraft for potable water distribution). The exterior surface 605 of the tube heater is shown in FIG. 6B. Both ends of the tube heater 601 were connected to a water pump and/or reservoir and water was circulated at a rate of 23 gallons per minute (not shown). The water was at ambient temperature (at about 21° C.). This circulating water acted as a thermal load for cooling the tube heater and is represented schematically in FIG. 6A as the cooling unit 603. In some embodiments, the test specimen comprises the heating unit. In some embodiments, the heating unit is separate from the test specimen.

During the test set-up, as shown in FIG. 6B, the thermal imager 610 (shown schematically as the Imaging Unit 610 in FIG. 6A) was initialized and aimed and/or focused on the test specimen. A track support structure 615 was used to position the imager. During testing, the imager was slid on a track 620 running parallel to the test specimen and images were captured as the heating was cycled on and off. The support structure (and/or the imager attached thereto) was maintained at a distance of between about 18 inches and about 24 inches from the test specimen. As can be seen in FIG. 6B, the thermal imager was maintained approximately parallel to the test specimen (so the length of the test specimen was along the width of the image being captured by the imager).

Figure 7A:
FIGS. 7A-7R are thermal images of a resistively heated fluid tube.
Figure 7B:
Figure 7C:
Figure 7D:
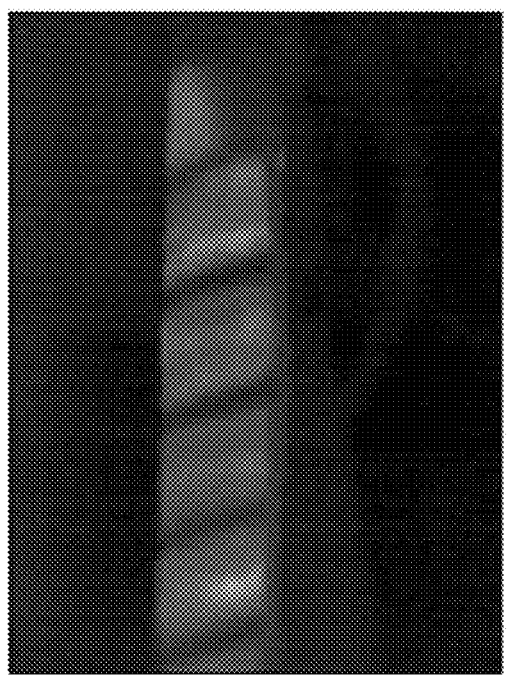
Figure 7F:
Figure 7H:
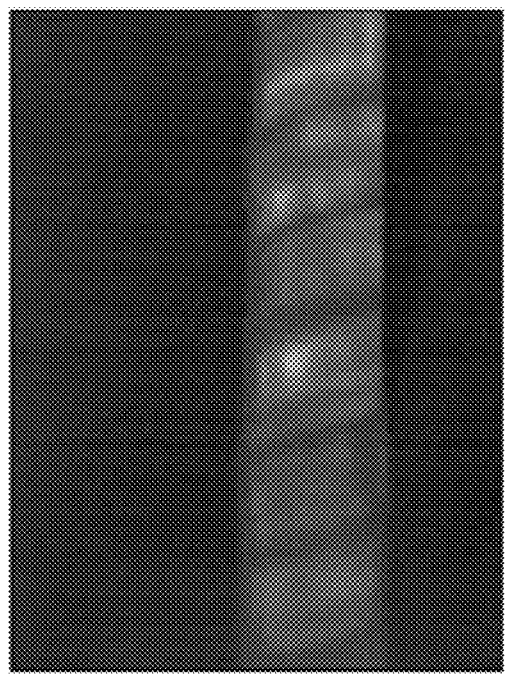
Figure 7E:
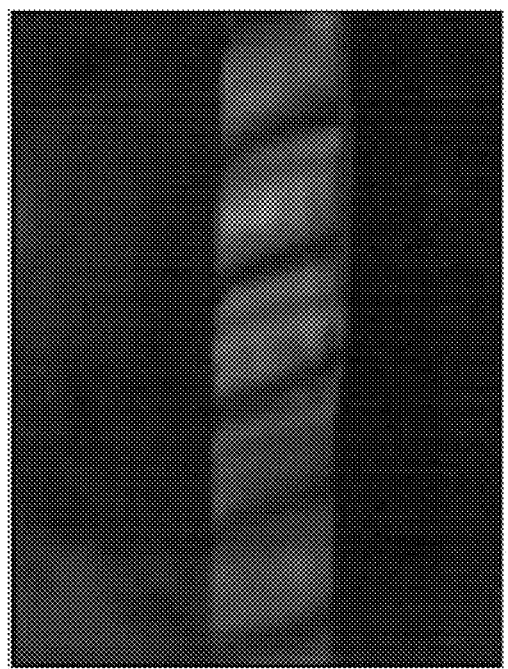
Figure 7G:
Figure 7J:
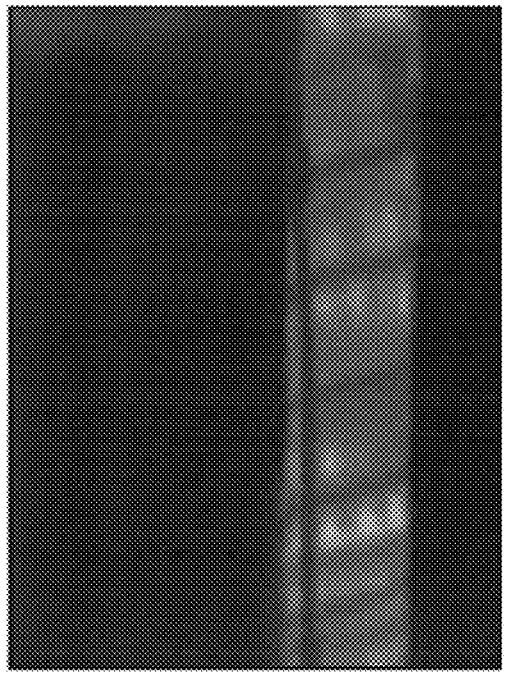
Figure 7L:
Figure 7I:
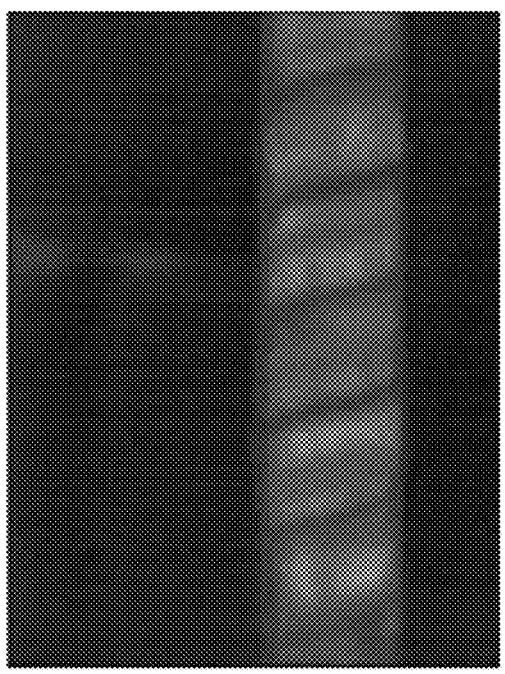
Figure 7K:
Figure 7N:
Figure 7P:
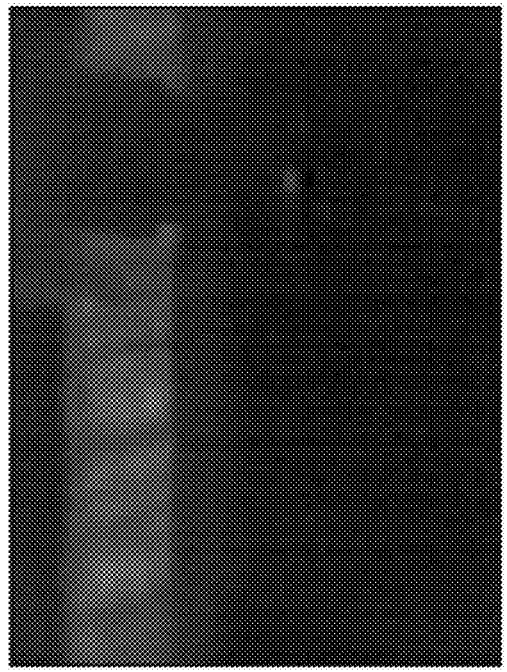
Figure 7M:
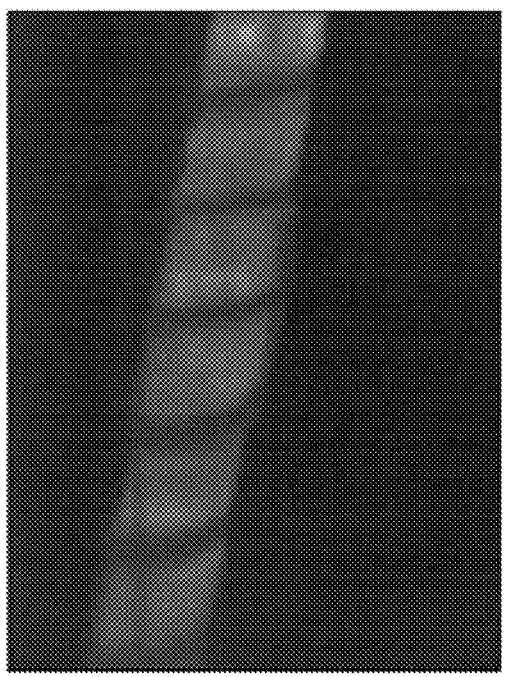
Figure 7O:
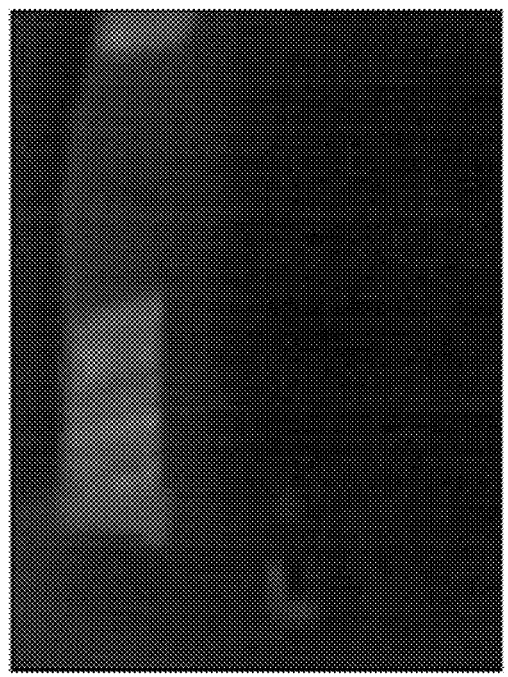
Figure 7R:
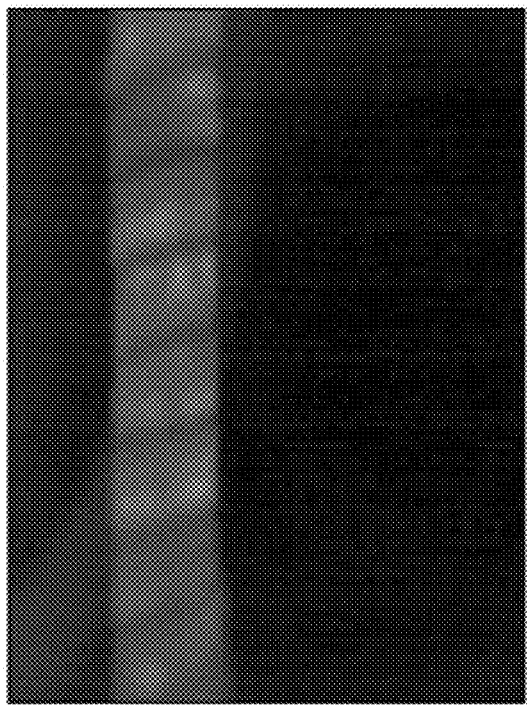
Figure 7Q:
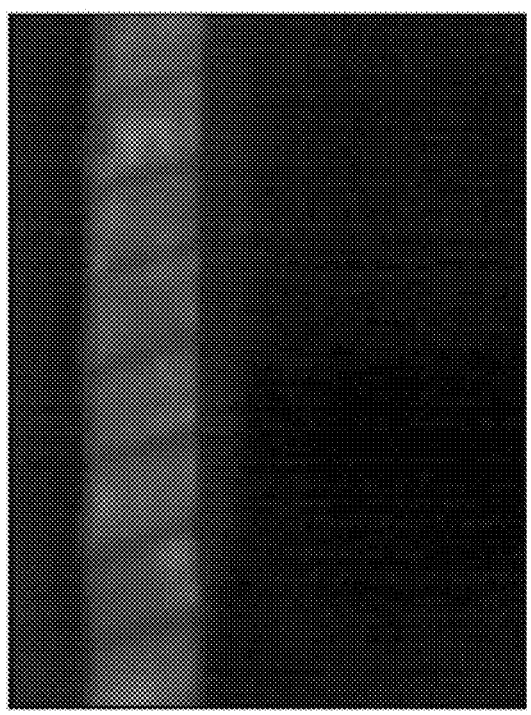
Figure 8A:
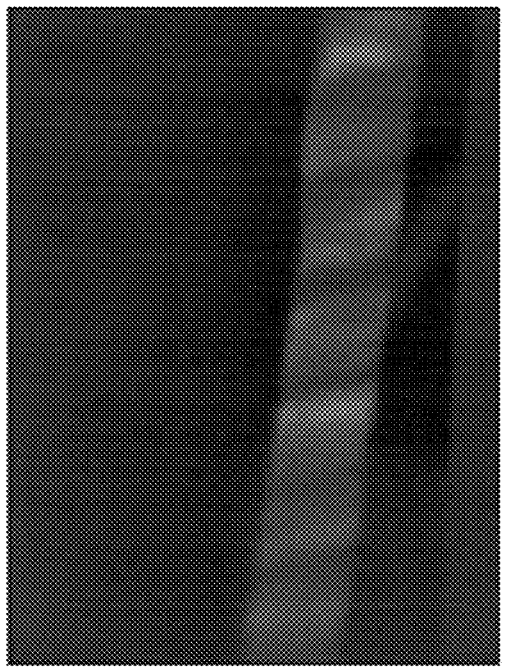
FIGS. 8A-8R are thermal images of another resistively heated fluid tube.
Figure 8B:
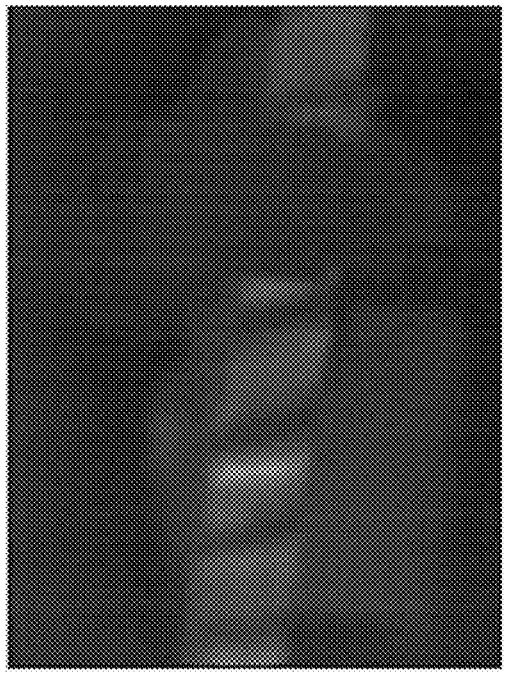
Figure 8C:
Figure 8D:
Figure 8F:
Figure 8H:
Figure 8E:
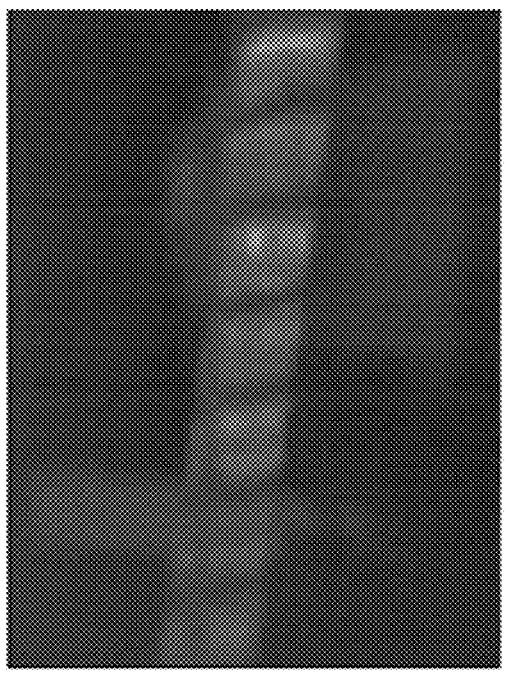
Figure 8G:
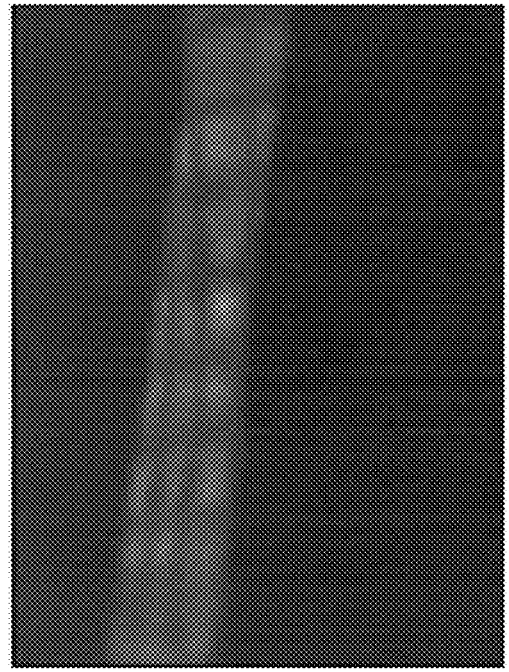
Figure 8J:
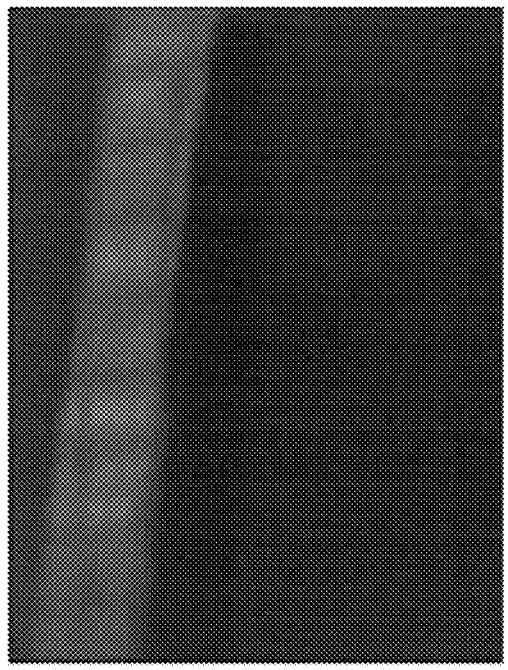
Figure 8L:
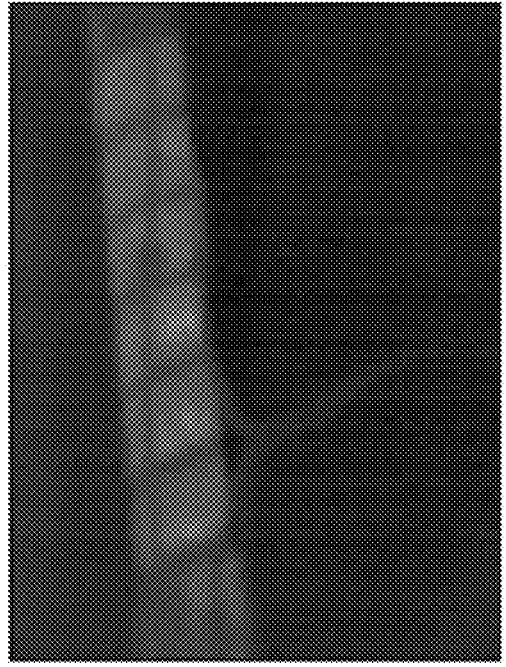
Figure 8I:
Figure 8K:
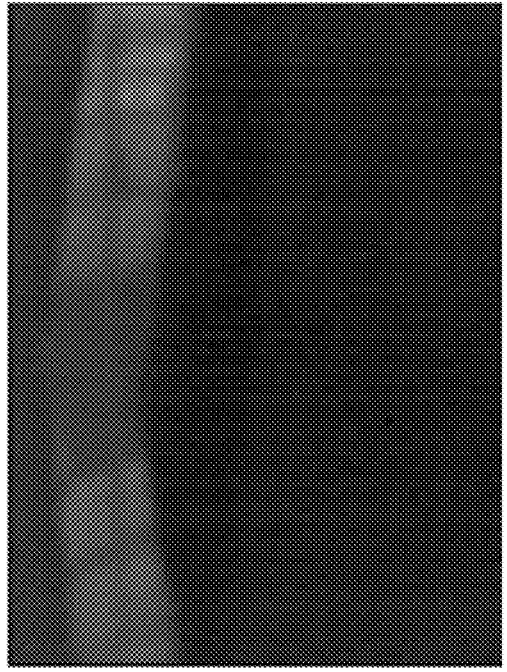
Figure 8M:
Figure 8N:
Figure 8O:
Figure 8P:
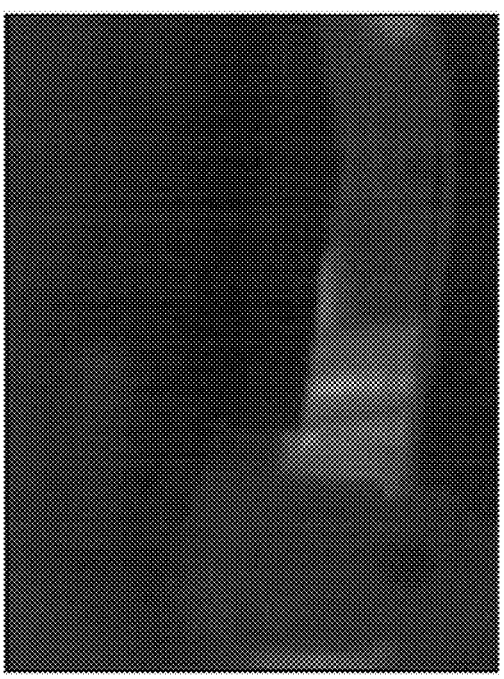
Figure 8R:
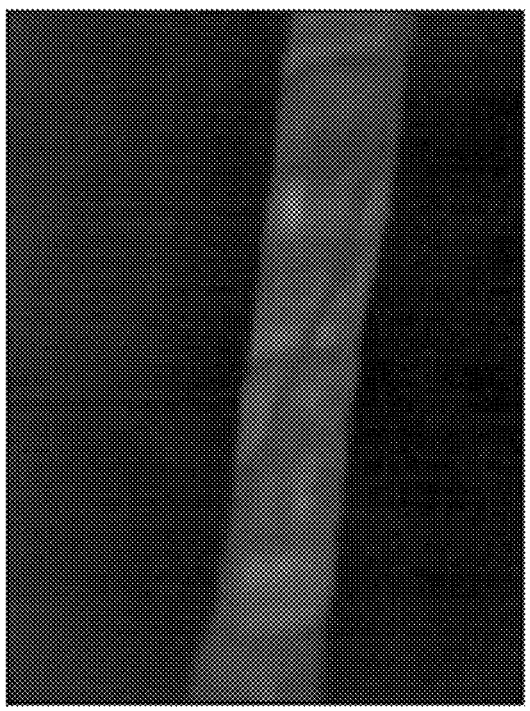
Figure 8Q:

The heater was connected to a 115/220 VAC 3 phase variac. The heater was powered for approximately 1 second, at which time, the thermal imager shown in FIG. 6B was used to capture an image of the test specimen (e.g., after the power was removed from the variac). Thirty seconds after the variac was powered down (e.g., 30 seconds after the heater was turned-off) and terminated, the thermal imager was used to capture an image of the test specimen (as shown in FIG. 7A). Two different sets of scans were performed. Set #1 is shown as FIGS. 7A-R and Set #2 is shown as FIGS. 8A-R. During each of the acquisition of each data set, a first image of a first 5.5 inch length of the tube heater was captured (as shown in, for example, FIG. 7A). After the image was acquired, the heater was allowed to cool to ambient temperature. The thermal imager was moved down the track support so that the thermal imager was positioned to capture an image of the tube heater that was directly adjacent to the first length of the tube heater. At that time, the test conditions were repeated (e.g., activating the heat source and then deactivating the heat source) and a second image was taken of a second 5.5 inch length of the tube heater adjacent to the first (FIG. 7B). This process was continued several more times to capture the images shown in FIGS. 7C-7R.

The second set of images was acquired with the same steps performed during acquisition of the first set of images. In other words, the section of FIG. 7A tubing was the same as that in the image of FIG. 8A. Repeating the steps used to capture the Set #1 images, the Set #2 images were captured (see FIGS. 8A-8R).

As shown in FIGS. 7A-7R and 8A-8R, both lengths of tubing are disbond free. The acquisition of Set #1 and Set #2 demonstrate the reproducibility of this testing method. Each image was captured without any damage to the test heating tube. This testing can be performed numerous times to assess the integrity of a device in a non-destructive manner.

Example 3

Figure 9A:
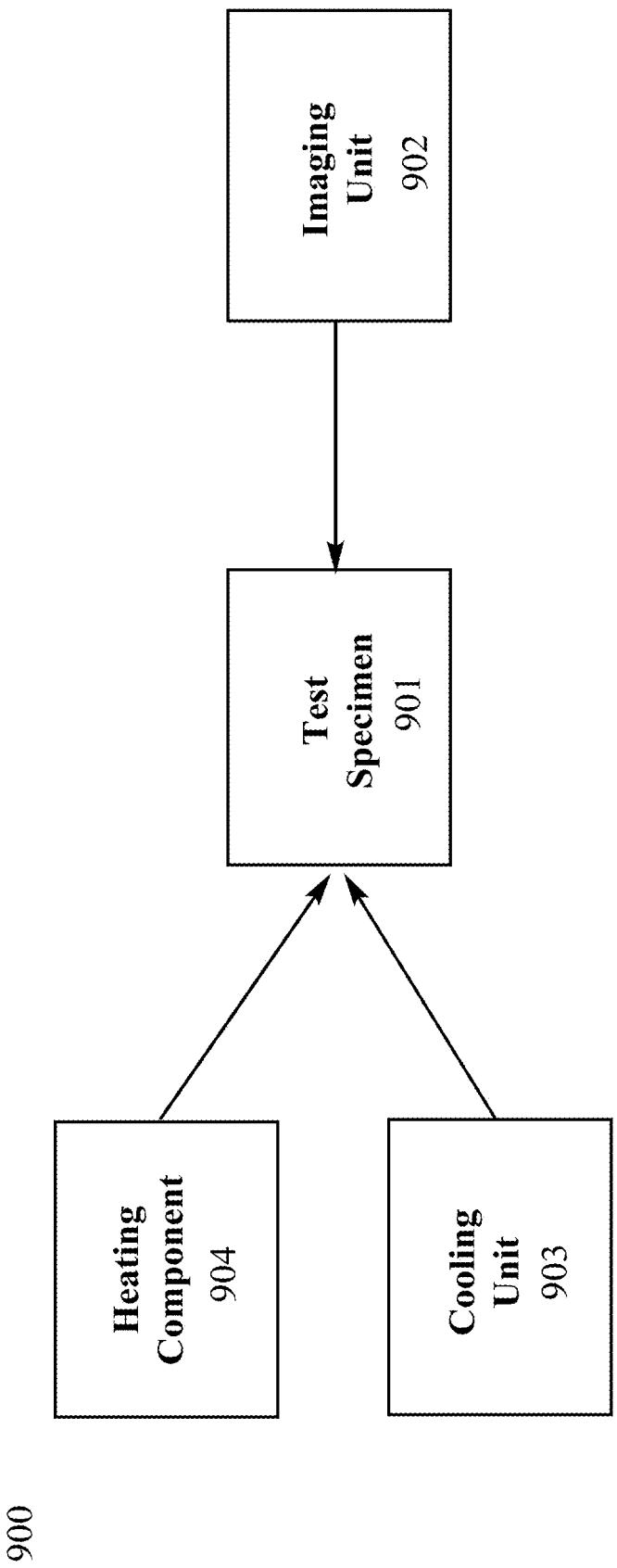
FIG. 9A schematically illustrates an embodiment of a system of imaging a test specimen not having an internal heater.
Figure 9B:
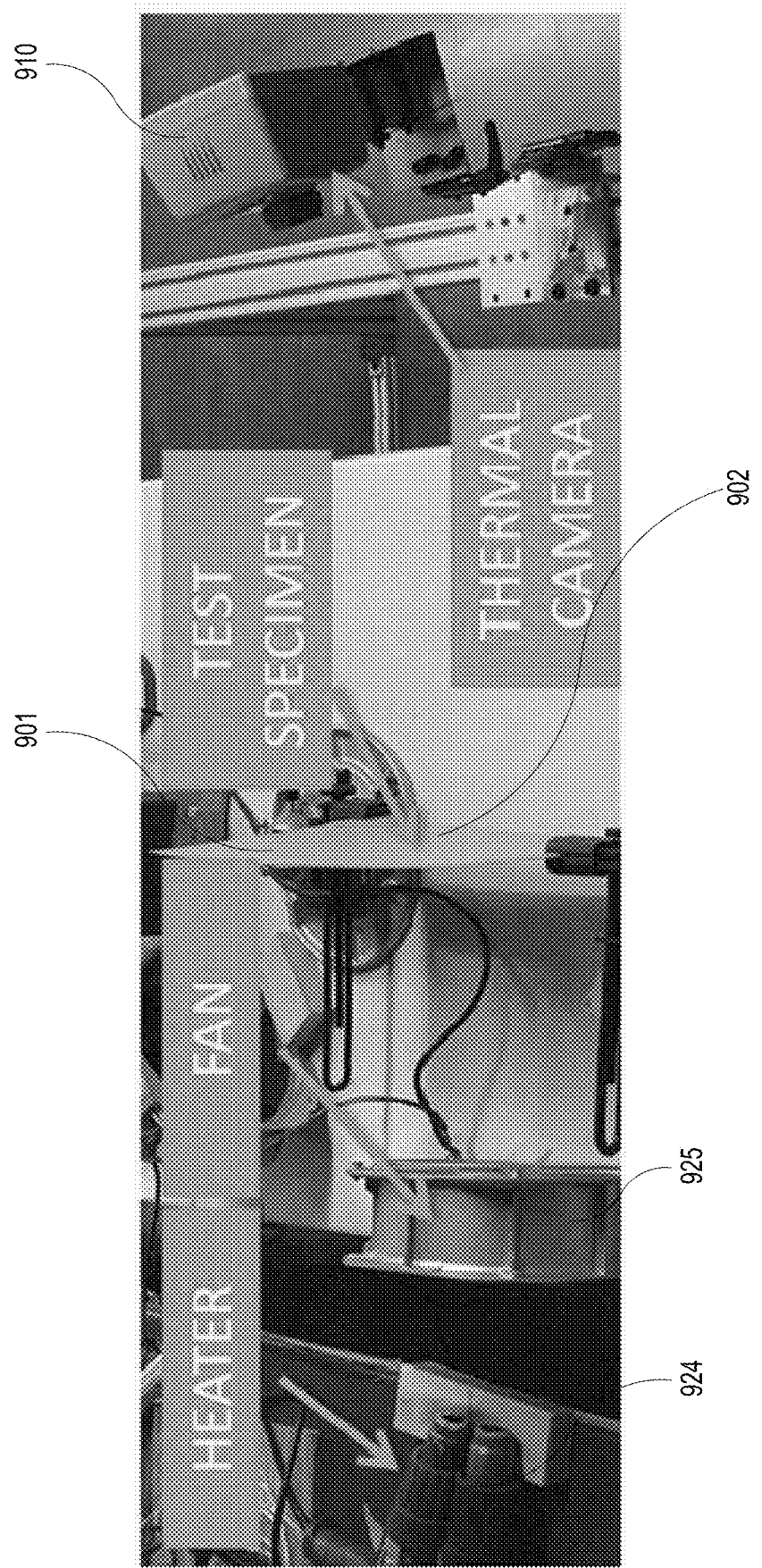
FIG. 9B is a photograph of an example of the system of FIG. 9A.
Figure 10A:
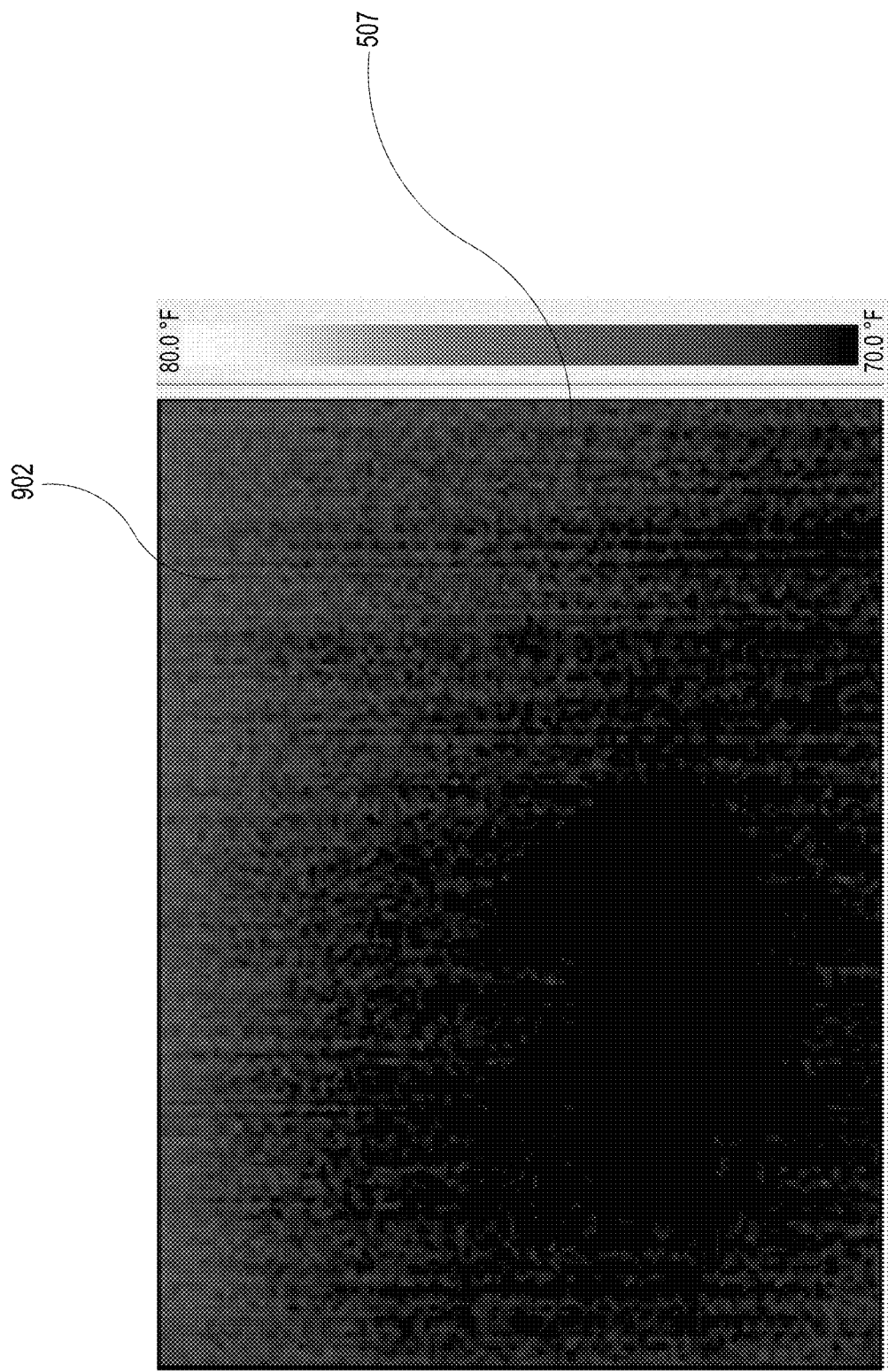
FIGS. 10A-10C are photographs of a test specimen sheet taken with a thermal camera before heating (FIG. 10A), during heating (FIG. 10B), and after heating is removed (FIG. 10C).

For this experimental example, the experimental set-up is shown schematically in FIG. 9A and as a photograph in FIG. 9B. In this case, a layered sheet 901 was used as the test specimen. Between two layers of bonded epoxy resin (e.g., fiberglass) sheets was added, several Teflon discs of about an ⅛ inch or about a ¼ inch in diameter. These discs were meant to approximate disbonds in a layered assembly. After fabrication, a heat gun 924 (e.g., the heating component 924 in FIG. 9A) was aimed at the backside (e.g., the non-imaging side) of the sheet 901. A fan 925 was directed at the backside of the test specimen 901 to distribute the heat from the heat gun 924 evenly over the backside of the test specimen 901. In some implementations, the fan 925 can serve as the cooling unit 903 (represented in FIG. 9A) by blowing cool (e.g., air that is colder than that from the heat gun, ambient temperature air, chilled air, etc.) or mist onto the test specimen 901. An imaging unit 910 (shown as the thermal camera 910 of FIG. 9B) was directed towards the frontside 902 of the test specimen 901. An image of the test specimen 901 was captured using the thermal imager 910 prior to heating and is shown as FIG. 10A. As can be seen in FIG. 10A, the test specimen frontside surface 902 directed toward the imaging unit 910 was substantially entirely at ambient temperature (about 21° C.).

Figure 10B:
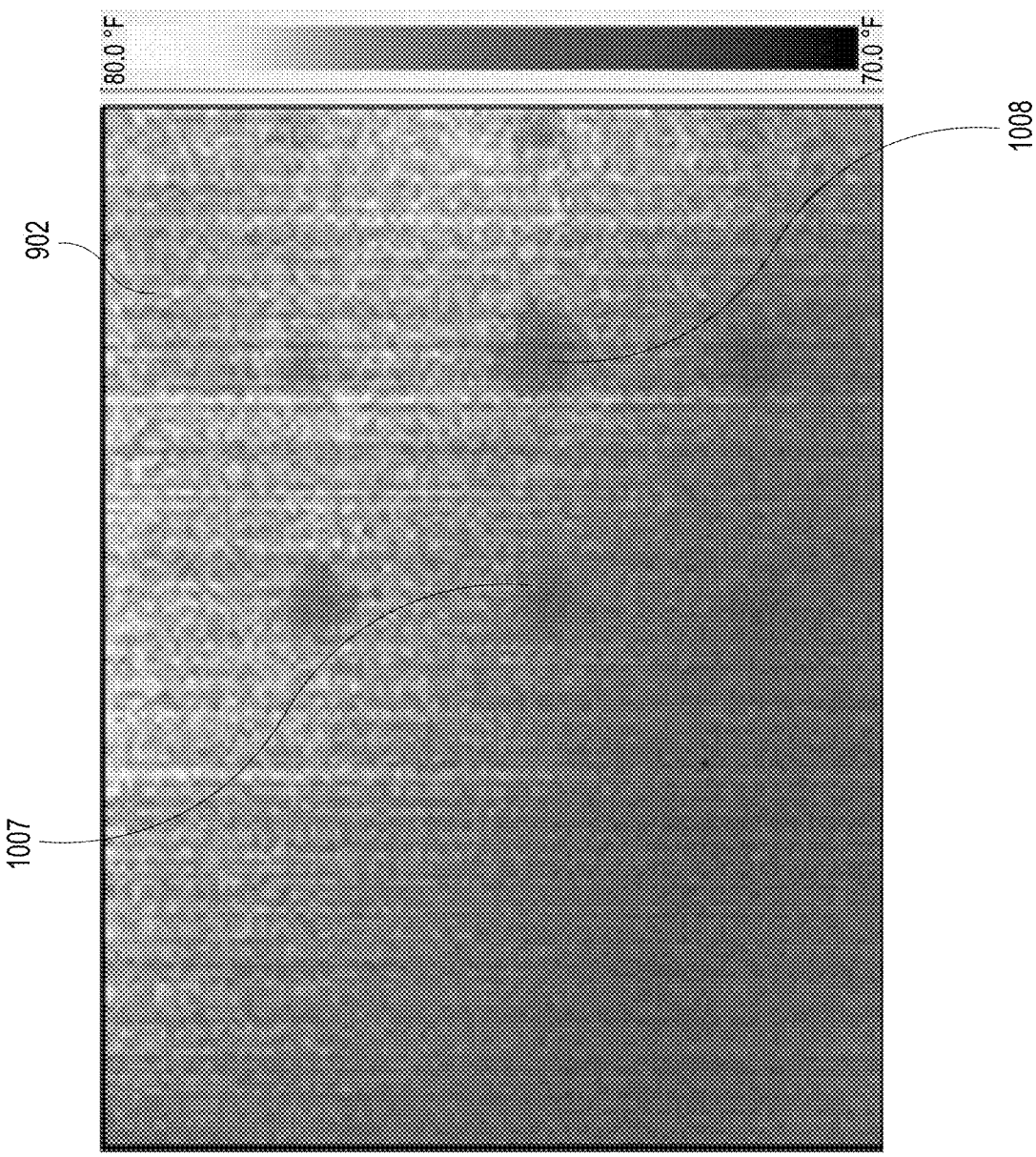

The heat gun 924 was activated to heat the test specimen 901. The fan 925 was activated to generally evenly distribute the heat flow from the heat gun 924. A second image of the test specimen 901 was captured and is shown as FIG. 10B. As shown in FIG. 10B, during the heating, both the ⅛ inch Teflon discs 1007 and ¼ inch Teflon discs 1008 began to become visible against the frontside surface 902 of the sheet 901 that was properly bonded. As can be seen in FIG. 10B, during heating, the properly bonded sheet area 902 heated faster than the disbond areas 1007, 1008. This resolution of disbonds occurred with a temperature delta of about 3° C. to about 4° C. As shown in FIG. 10B, during heating, the fully bonded frontside sheet area 902 heated faster than the disbond areas 1007, 1008.

Figure 10C:
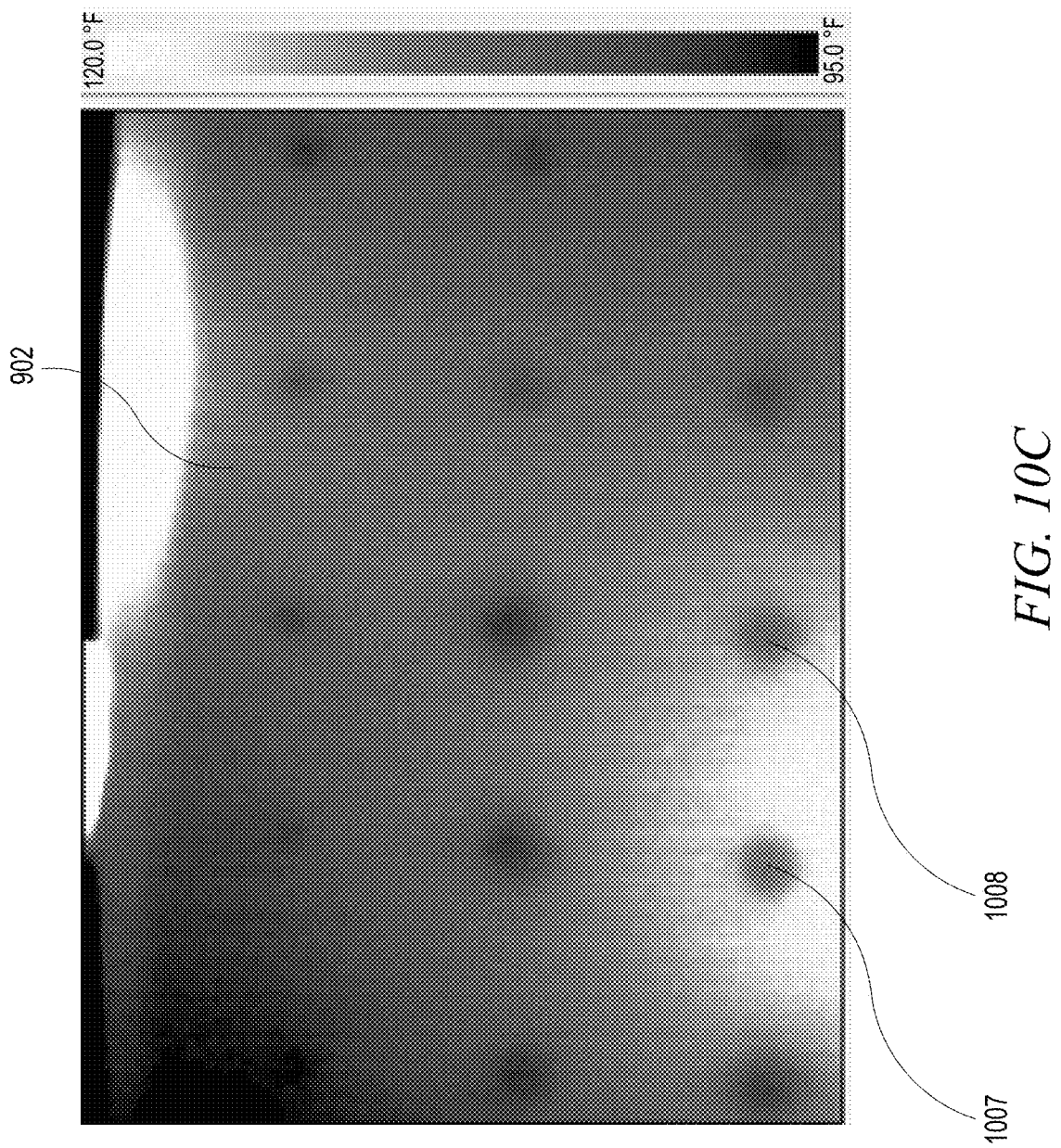

FIG. 10C shows a thermal image of the test specimen after additional heating and after the heat source 924 was removed and the fan 925 was left on. In this experiment, the fan 925 also functions as the cooling unit 903 shown schematically in FIG. 9A. As shown in FIG. 10C, both the ⅛ inch Teflon discs 1007 and ¼ inch Teflon discs 1008 are visible. As can be seen in FIG. 10C, during heating, the properly bonded sheet area 902 heated to a temperature of about 49° C. and heated faster than the disbond areas 1007, 1008 which reached a temperature of around 35° C. This allowed resolution of disbonds 1007, 1008 with a temperature delta of about 13° C. to about 14° C.

This example shows that the methods of detecting disbonds disclosed herein can be performed using external heat and cooling sources. Further, this example demonstrates that the temperature differential between disbonds (or defects) can be detected during the heating phase (where the defect-free areas heat faster than the cooler disbond areas) or during the cooling phase (see also, e.g., Examples 1 and 2).

Example 4

Figure 11:
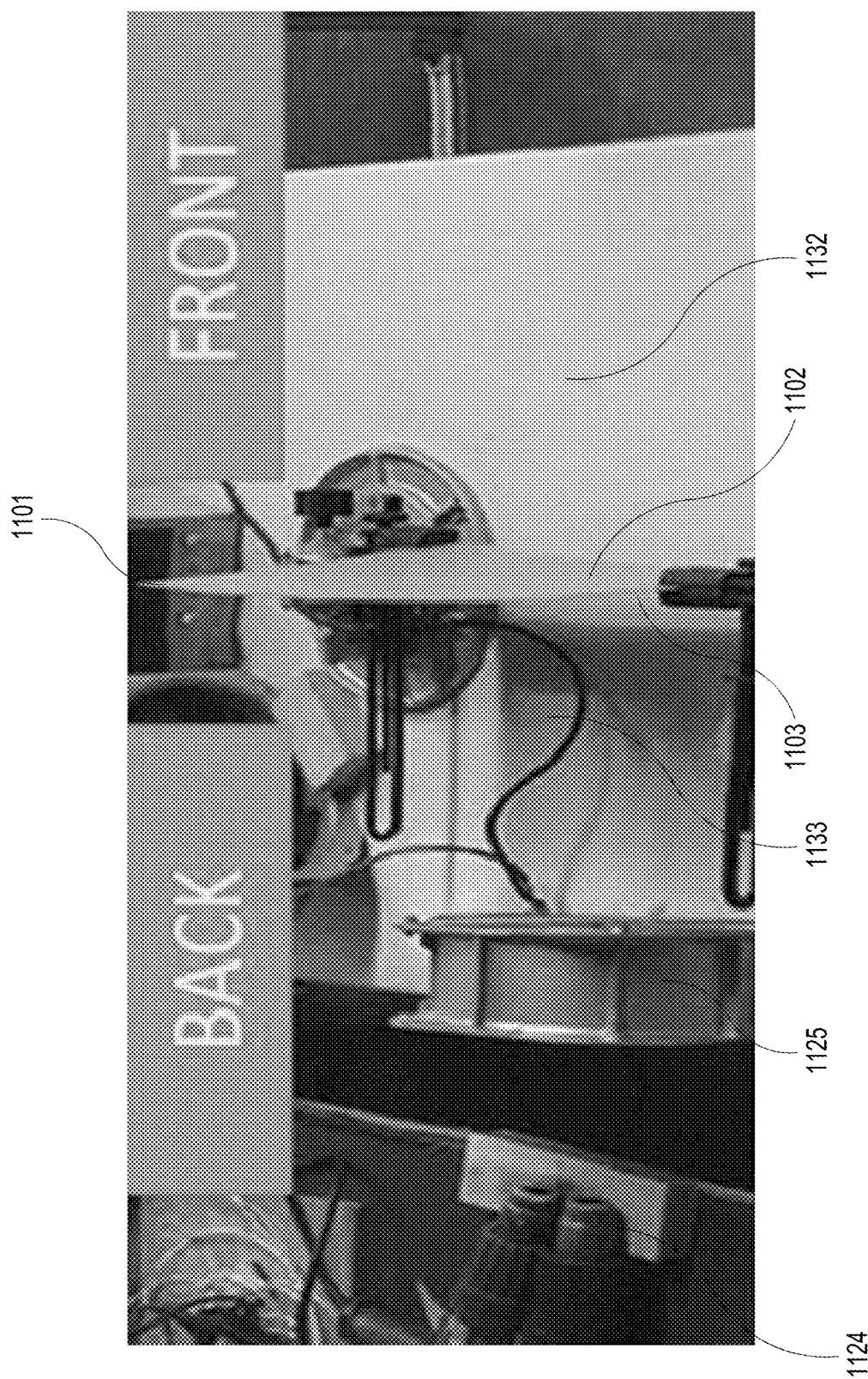
FIG. 11 is a photograph of another embodiment of a system for imaging a test specimen.
Figure 12A:
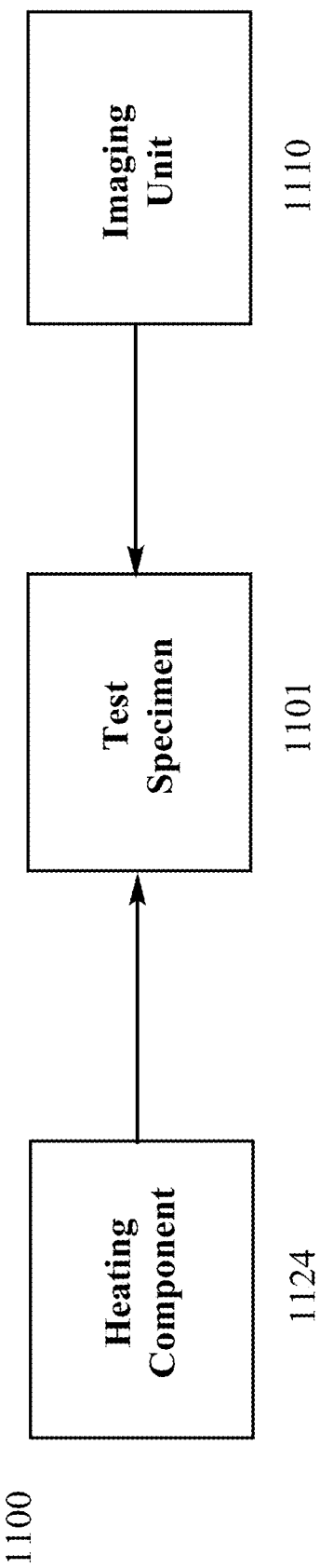
FIG. 12A schematically illustrates another embodiment of a system for imaging a test of FIG. 11 in a heated state.

The experimental set-up for this example is shown photographically in FIG. 11 and schematically in FIG. 12A. As shown in FIG. 12A, the testing set-up can comprise a heating component 1124, a test specimen 1101, and an imaging unit 1110. The imaging unit can be positioned on a side of the test specimen 1101 opposite the heating component 1124. In this case, a layered sheet comprising 8 layers of phenolic epoxy resin (e.g., fiberglass) was used as the test specimen 1101. During fabrication of the layered sheet, between two resin layers were added, ¼ inch diameter Teflon discs. These discs were meant to approximate disbonds in a layered assembly. After fabrication, a heat gun 1124 was aimed at the test specimen 1101 from the back 1133 of the sheet onto the backside 1103 of the sheet 1101 (as shown in FIG. 11). A fan 1125 was directed at the backside 1103 of the test specimen 1101 (as shown in FIG. 11). An imaging unit (not shown) having a resolution of about 240 pixels was aimed from the front 1132 onto the frontside 1102 of the test specimen 1101. The heat gun 1124 was activated to heat the backside 1103 of the test specimen 1101 and the fan 1125 was activated to generally evenly distribute the heat flow from the heat gun 1124.

Figure 12B:
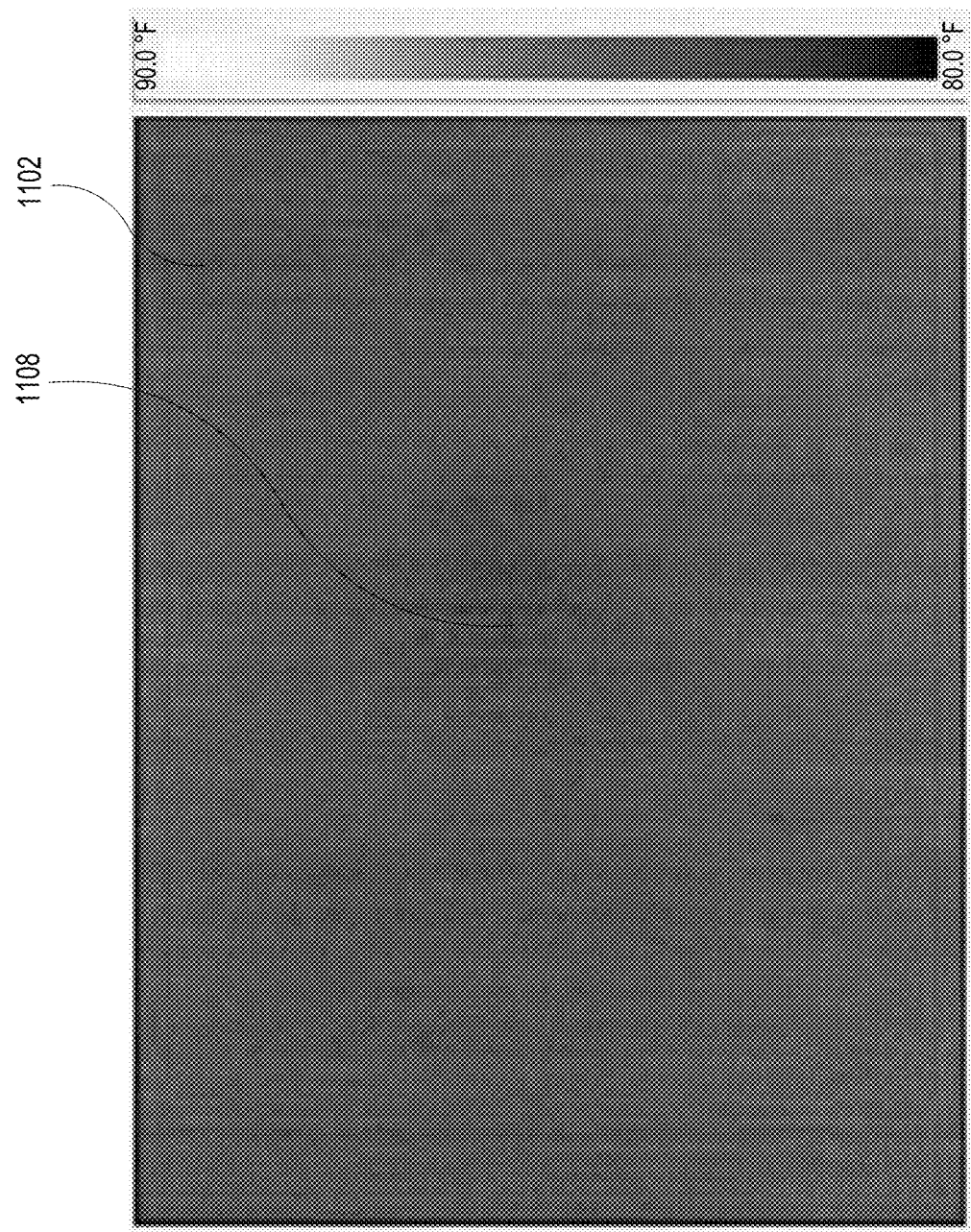
FIGS. 12B-12C are photographs of thermal images of the test specimen of FIG. 11 in another heated state.

After heating for a brief period of time, approximately 30 seconds, an image of the test specimen (having a height of about 1 in, a width of about 1.5 in and an area of about 1.5 in$^2$; FIG. 12B) was captured using the thermal imager. A disbond 1108 appeared as a region having a temperature of about 26.5° C. (or about 79.7° F.). The frontside 1102 of the sheet 1101 that was properly bonded appeared as a region having a temperature of about 27.4° C. (or about 81.3° F.). In some embodiments, a temperature differential (e.g., temperature delta) as low as about 0.9° C. (or about 1.6° F.) allowed disbonds to be visualized using the disclosed techniques.

Figure 12C:
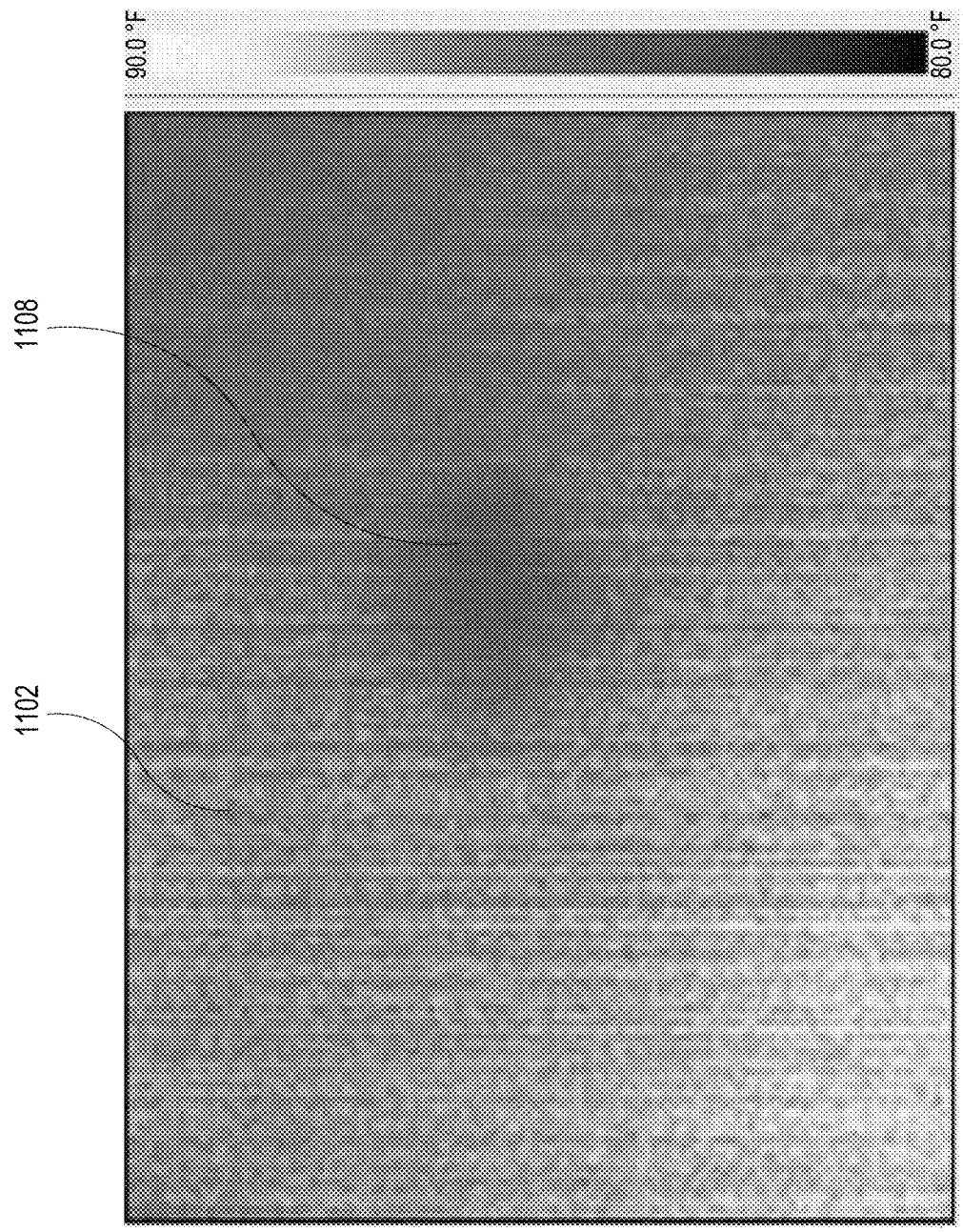

A second image of the test specimen 1101 was captured and is shown as FIG. 12C. This image was captured after heating for approximately 30 seconds. In some embodiments, rapid spot heating is inhibited or avoided as it can be misrepresented in the image. As shown, the disbond 1108 appeared as a region having a temperature of about 28.7° C. (or about 83.6° F.). The frontside 1102 of the sheet 1101 that was properly bonded appeared as a region having a temperature of about 30.2° C. (or about 86.3° F.). As shown, the disbond is readily apparent from the surrounding area. In certain implementations, a temperature differential as low as about 1.5° C. (or about 2.7° F.) can enable disbonds to be readily visualized using the disclosed techniques.

As shown in FIGS. 12B-12C, the ¼ inch Teflon disc 1108 began to become visible as a colder spot when viewed from the frontside 1132 of the test specimen 1101 and when capturing an image of the frontside 1102 of the specimen 1101. As can be seen in FIG. 12B-C, during heating, the properly bonded sheet area 1102 heated faster than the disbond area 1108. Thus, resolution of disbonds could be achieved with a temperature differential of as low as about 0.9° C. or about 1.5° C.

Example 5

The experimental set-up for this example is also shown as a photograph in FIG. 11. In this case, a different portion of the layered sheet 1101 (a sheet comprising 8 layers of phenolic epoxy resin) was used as the test specimen. As described in Example 4, ¼ inch diameter Teflon discs were added between the resin layers to approximate disbonds. These discs were meant to approximate disbonds in a layered assembly. After fabrication of the sheet 1101, a heat gun 1124 was aimed at the test specimen 1101 from the back 1133 of the sheet 1101 onto the backside of the sheet 1103 (as shown in FIG. 11). A fan 1125 was directed at the backside 1103 of the test specimen 1101.

Figure 13A:
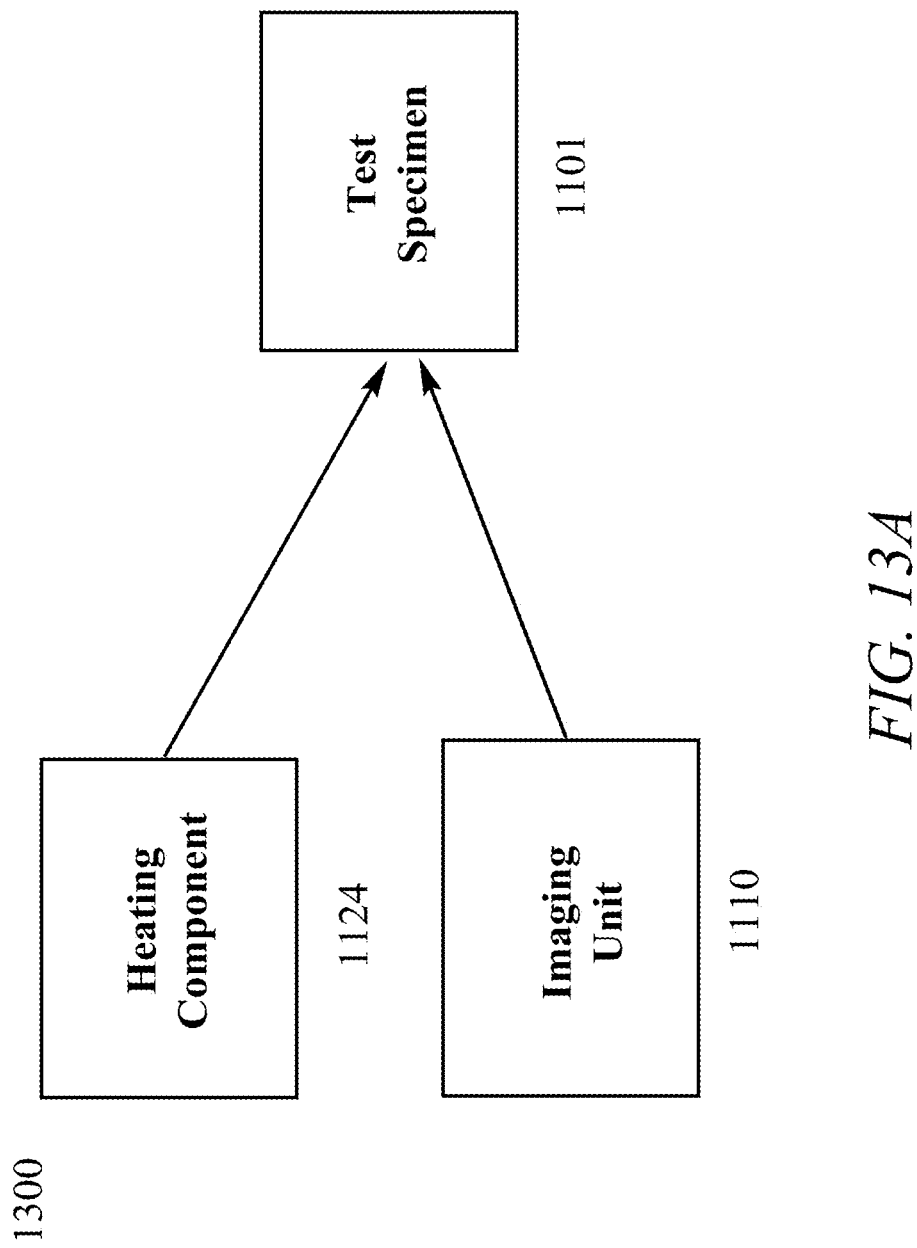
FIG. 13A schematically illustrates another embodiment of a system for imaging a test specimen.

An imaging unit (not shown) having a resolution of about 240 pixels was aimed from the front 1132 of the test specimen 1101 and directed toward the frontside 1102 of the sheet 1101. The heat gun 1124 was activated to heat the test specimen 1101 and the fan 1125 was activated to generally evenly distribute the heat flow from the heat gun 1124. After heating for a brief period of time (approximately 30 seconds prior to the first image) an image (having a height of about 1 in, a width of about 1.5 in and an area of about 1.5 in$^2$; FIG. 13A) of the test specimen 1101 was captured using the thermal imager. In other words, the schematic set-up represented in FIG. 12A was also used in this experiment. As shown in FIG. 13A, this portion of the test specimen 1101 comprised two disbonds 1109, 1110 which appeared as regions having a colder temperature than the frontside 1102 of the sheet 1101 that was properly bonded. After initial heating of the test specimen, that the heat rate can be maintained for long term observation.

Figure 13B:
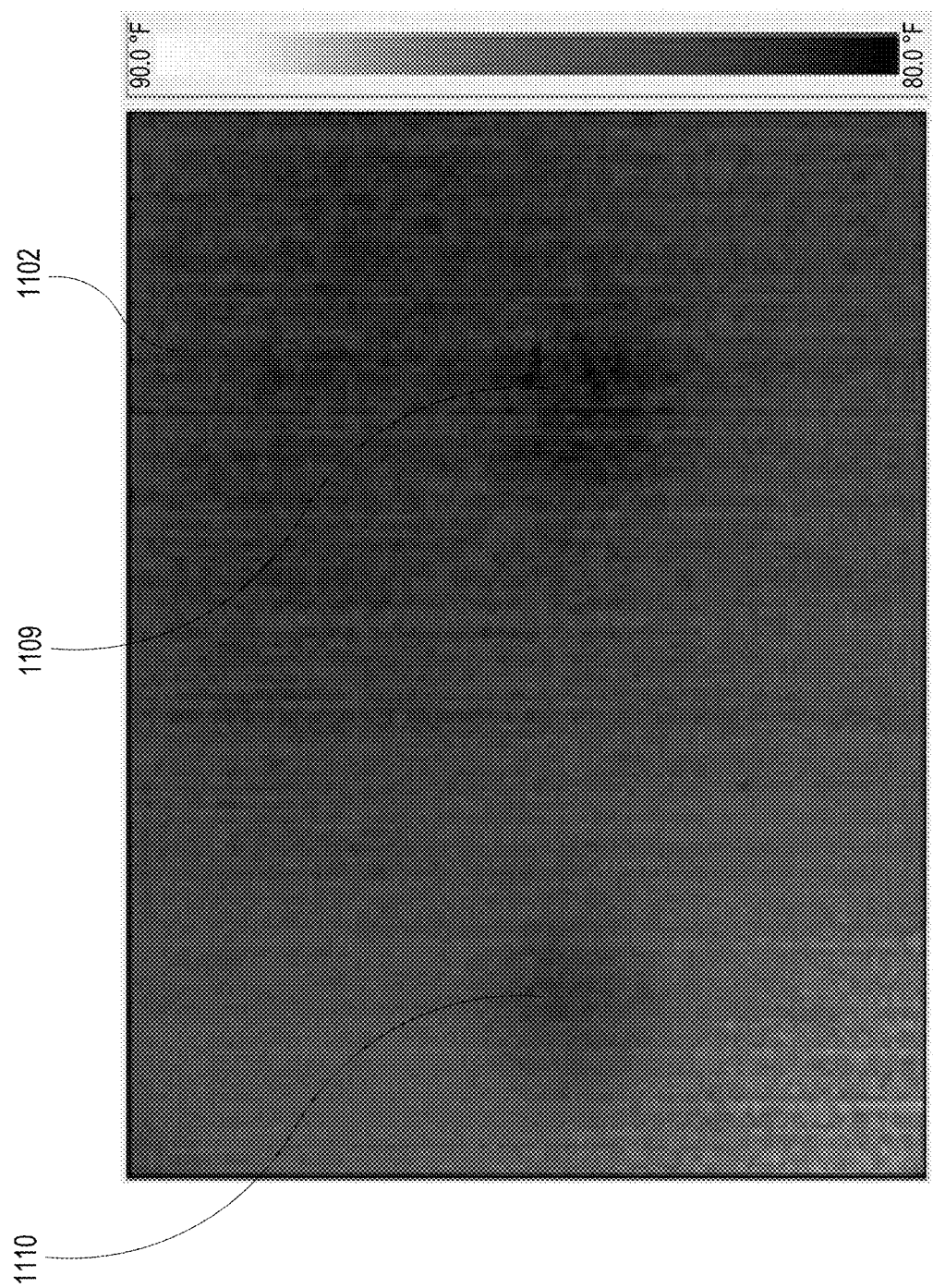
FIGS. 13B-13C are photographs of thermal images of the test specimen from hot and cold sides of the test specimen.

A second image of the test specimen 1101 was captured and is shown as FIG. 13B. In this case, the testing set-up is represented schematically in FIG. 13A and can comprise a heating component 1124, a test specimen 1101, and an imaging unit 1110 that is positioned on the same side of the test specimen 1101 as the heating component 1124. The experimental set-up for this example is also shown as a photograph in FIG. 11 (where the imaging unit 1110 is not pictured). During the experiment, an imaging unit having a resolution of about 240 pixels was aimed from the back 1133 of the test specimen 1101 and directed toward the backside 1103 of the sheet 1101. The heat gun 1124 was activated to heat the test specimen 1101 and the fan 1125 was activated to generally evenly distribute the heat flow from the heat gun 1124. After heating for a brief period of time (approximately 30 seconds) an image (about 1" by about 1.5"; 1.5 in$^2$) of the test specimen (FIG. 13B) was captured using the thermal imager. In this portion of the test specimen 1101, the two disbonds 1109, 1110 appeared as regions having a hotter temperature than the backside 1103 of the sheet 1102 that was properly bonded. This image was captured after heating for approximately 30 seconds. As shown, the disbond 1108 appeared as a region at about 28.7° C. (or about 83.6° F.) and the frontside of the sheet 1101 that is properly bonded.

Figure 13C:
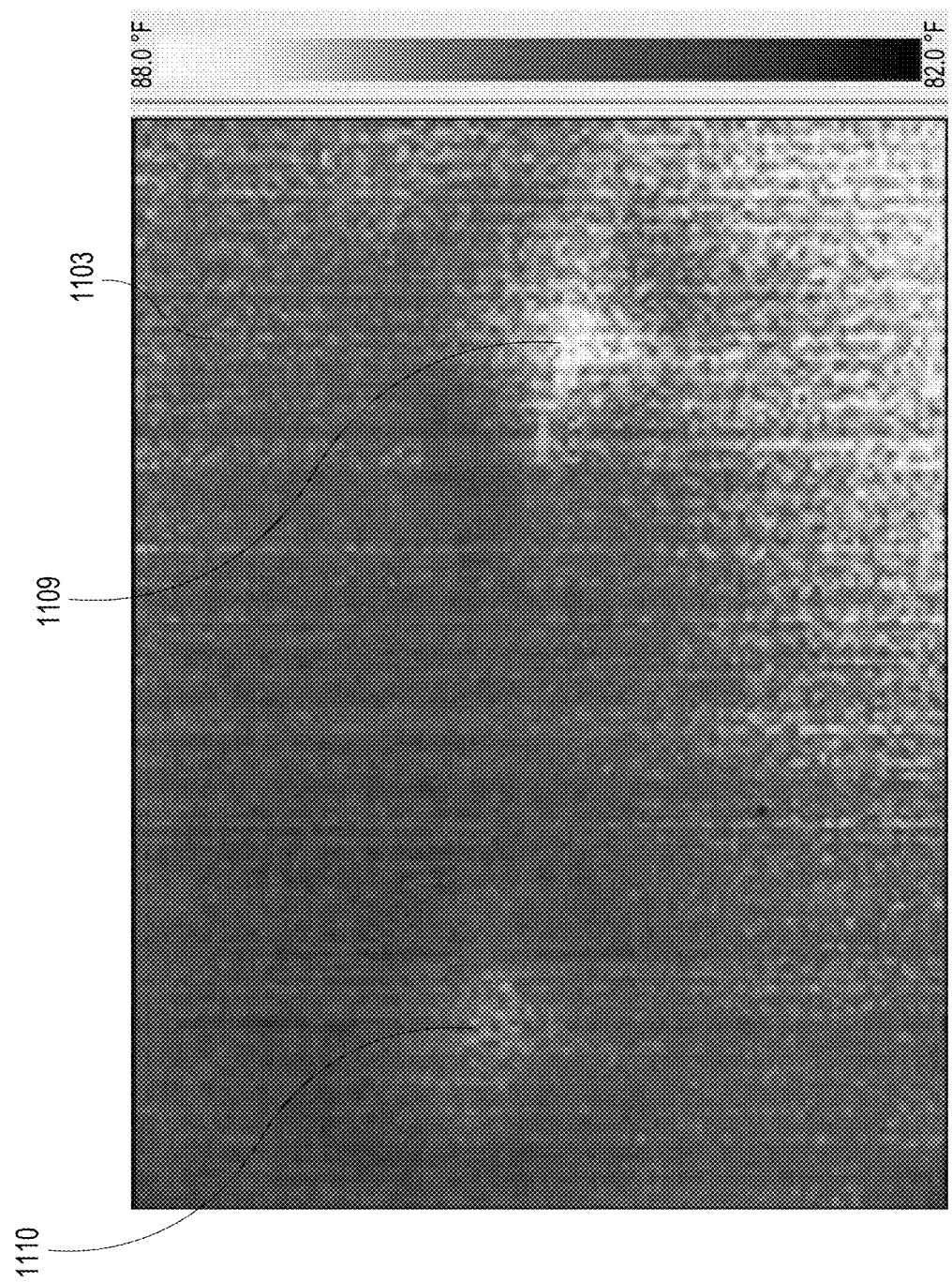

As shown in FIGS. 13B-C, imaging from the heated or non-heated side can be used to detect disbonds in a material. In various embodiments, the disbonds and/or defects can be imaged as colder portions (relative to properly bonded areas) or hotter portions (relative to properly bonded areas) of the device or material in which they reside.

Example 6

Figure 14:
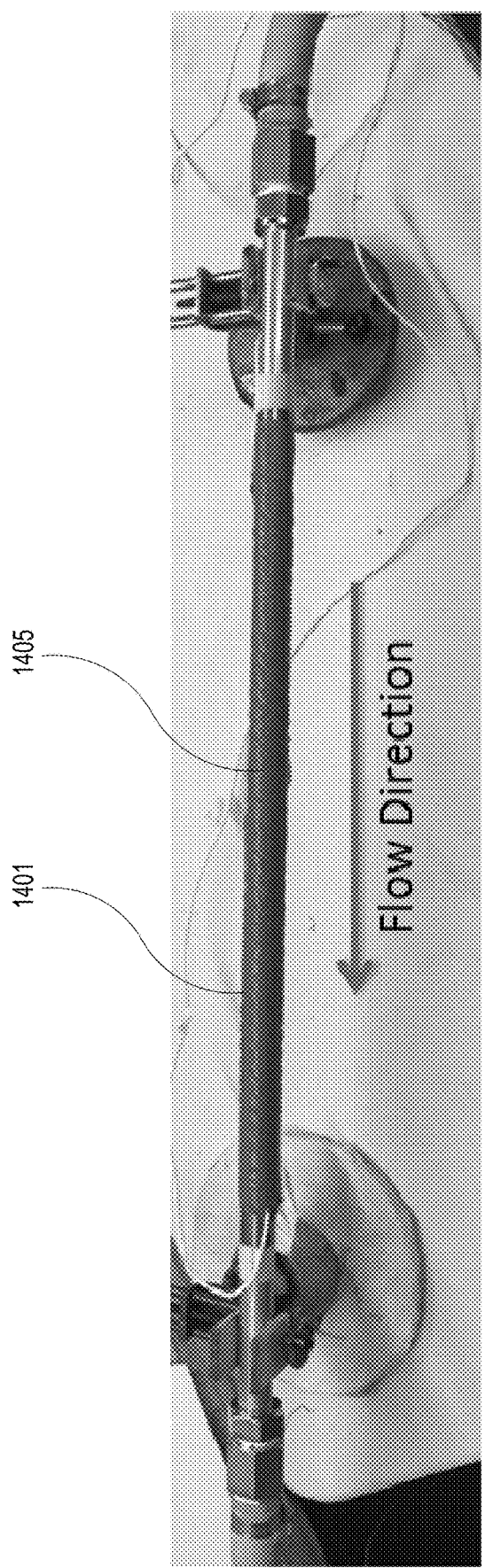
FIG. 14 is a photograph of an example of a resistively heated fluid tube.

For this experimental example, tubes with heaters bonded to the exterior (similar to what is used in commercial aircraft for potable water distribution) were used. An example of the tube heater is shown in FIG. 14. Similar to the heater used in Example 2 (and illustrated in FIGS. 1 and 2), the test specimen 1401 was a tube heater having an internal heating unit (e.g., a layered heater). The exterior surface 1405 of the tube heater is shown in FIG. 14. The test specimens in this example were layered elastomeric heaters.

Prior to testing, both ends of the tube heaters were connected to a water pump and/or reservoir and water was circulated at a rate of 23 gallons per minute. The water was at about 26.6° C. Other rates (e.g., equal to or greater than about: 1 gallon per minute, 5 gallons per minute, 10 gallons per minute, 30 gallons per minute) and temperatures (e.g., equal to or less than about: 0° C., 5° C., 10° C., 20° C., 30° C., 40° C.) could be used in some embodiments. The circulating water acted as a thermal load for cooling the tube heater. Between the heating layers and the tubed were added teflon or polyurethane discs having diameters of either about 0.25 inches, about 0.125 inches, or about 0.063 inches and thicknesses of about 0.001 inches for the Teflon and 0.03 for the polyurethane. The polyurethane disbonds were prepared using a polyurethane foam on an PS adhesive layer of the heater tube. For instance, as an example, the polyurethane disbonds were made by slicing a cured (e.g., semi-rigid, firm, etc.) foam into rectangular wafers. The wafers were placed between sequential layers during fabrication, starting at the tube/base dielectric interface, then between the base dielectric/circuit base layer, stepping up one layer for each iteration.

The disbond discs were arranged in three clocked locations: at 11, 12, and 1 o'clock (where 12 o'clock was closest to and directly facing the thermal imager). These discs were inserted into the tubes to imitate disbond portions of layered heaters.

Prior to testing, both ends of the test heater tubes were connected to a water pump/reservoir and water was circulated at a rate sufficient to generate a minimum of 2X cubic capacity of the hose per minute. Water, as described above, was pumped through the tube heater.

Figure 15A:
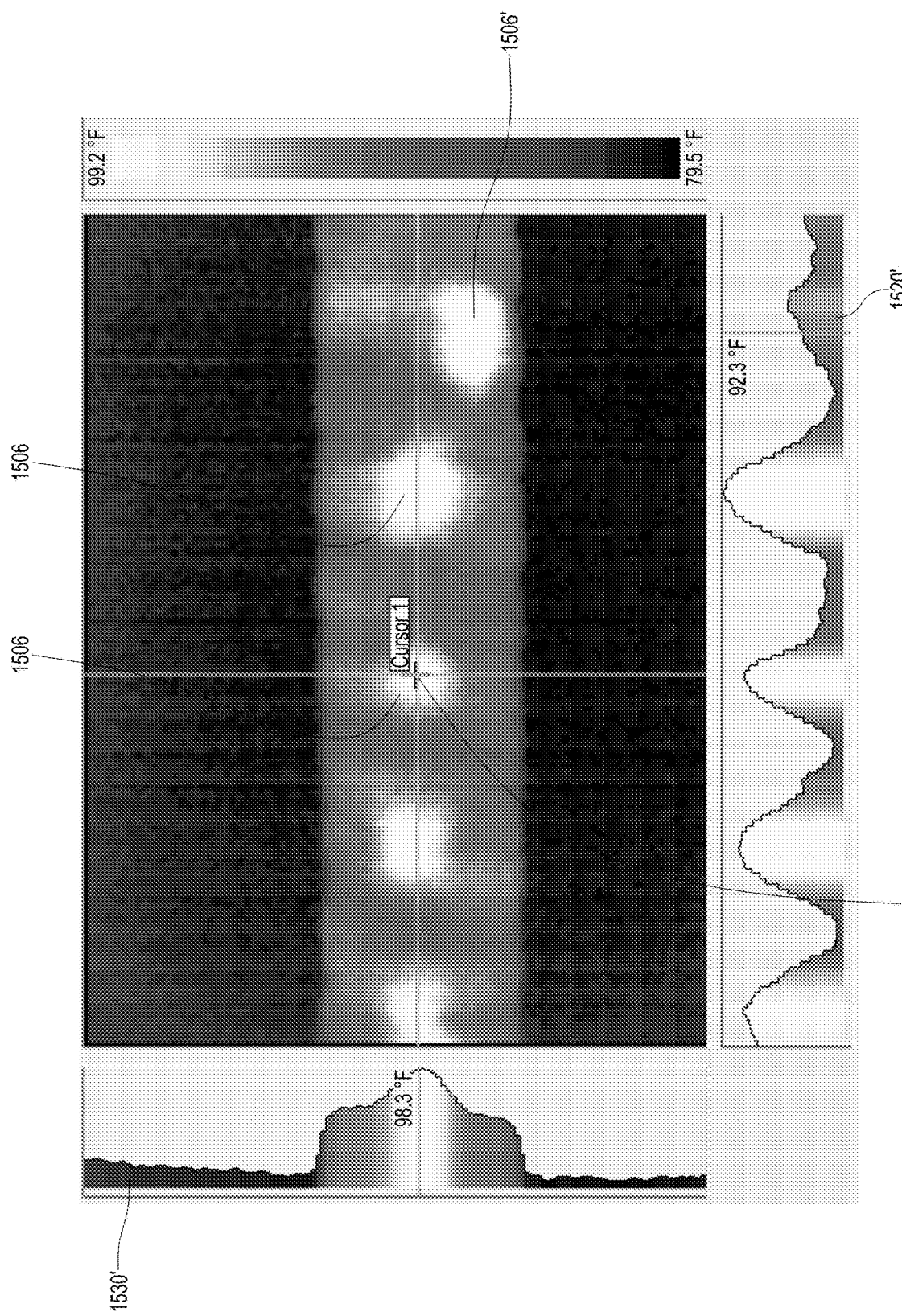
FIGS. 15A-15F are thermal images of a resistively heated fluid tube heated at about 15 Watts/in$^2$.
Figure 15B:
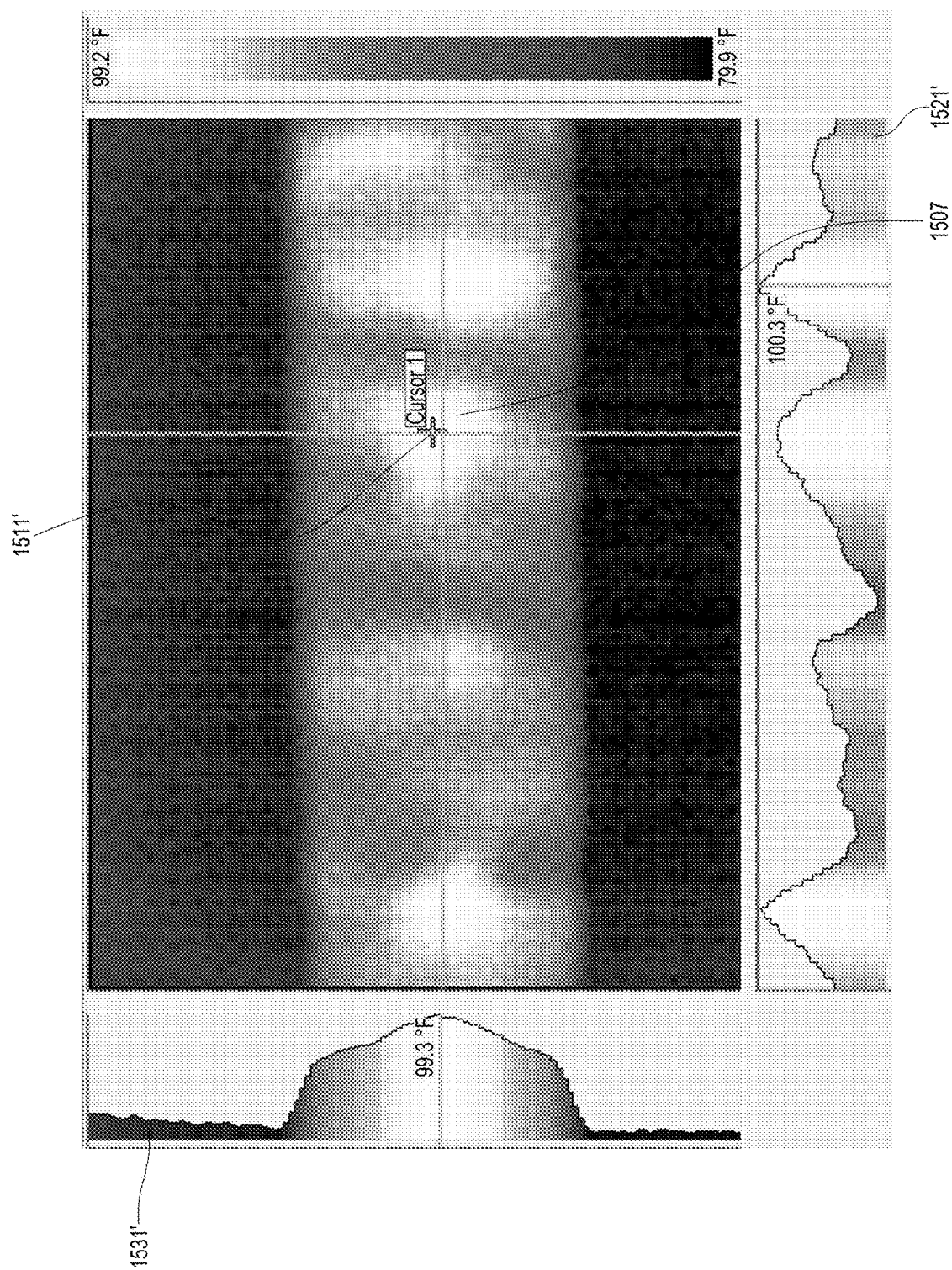
Figure 15C:
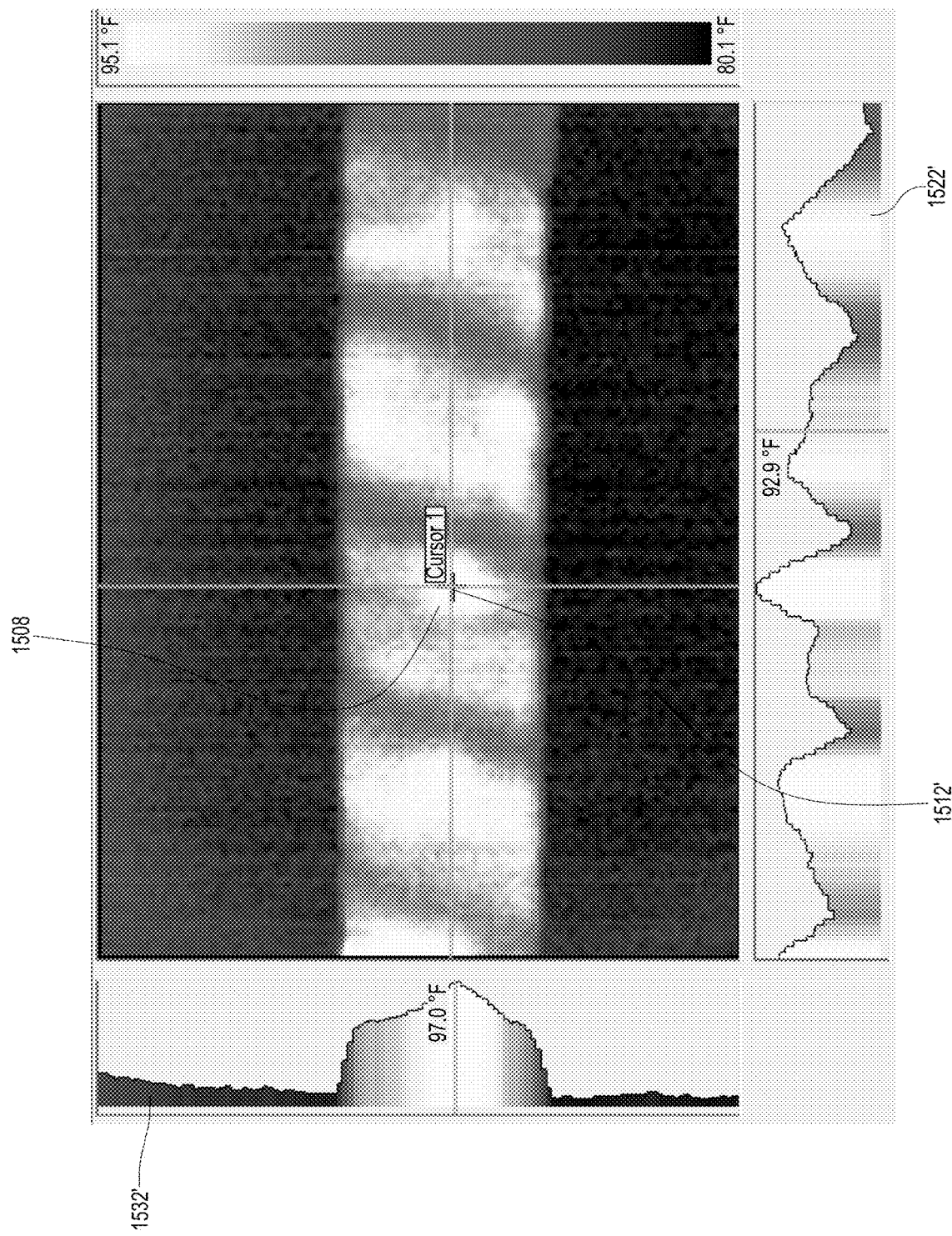
Figure 15D:
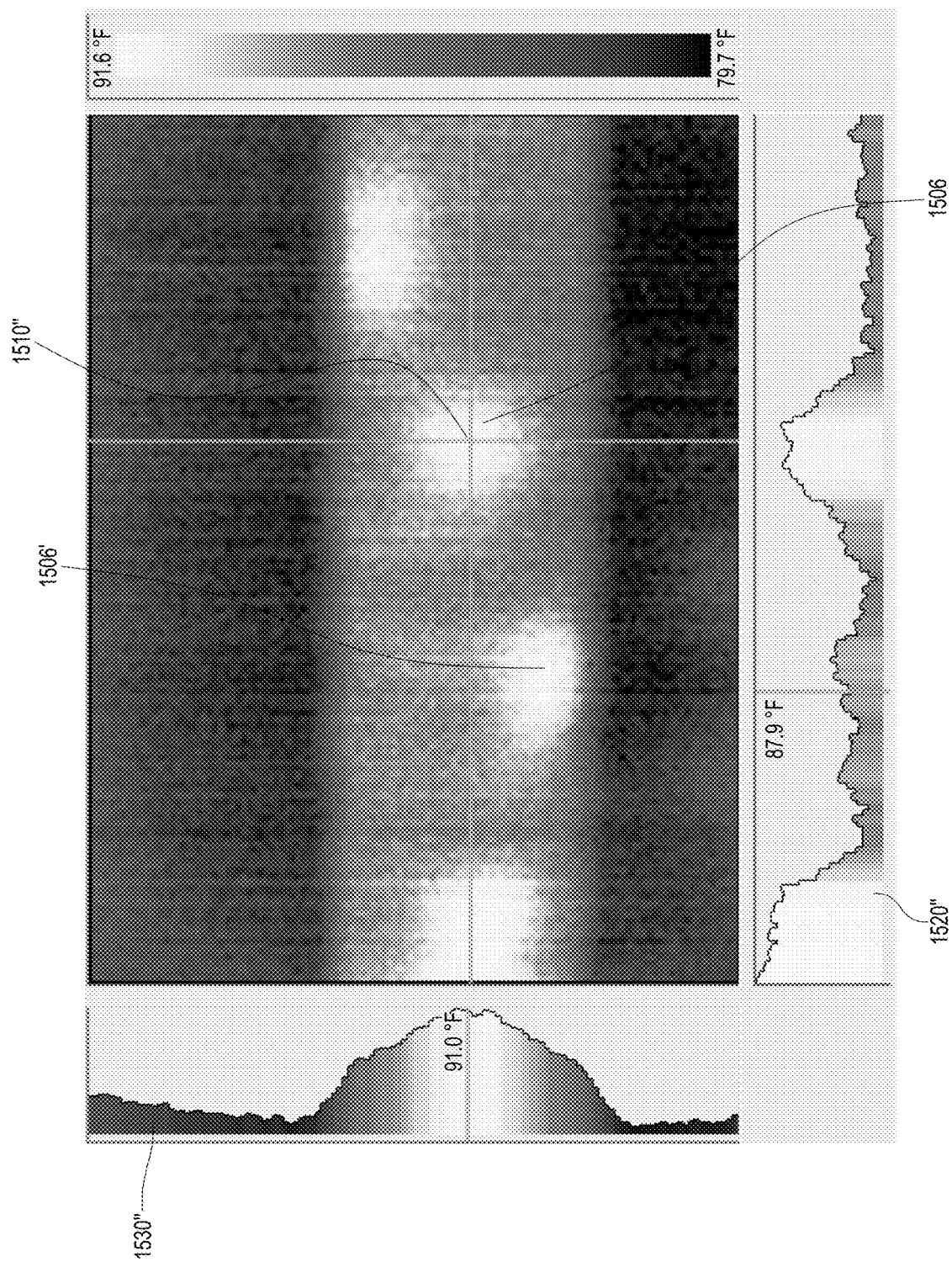
Figure 15E:
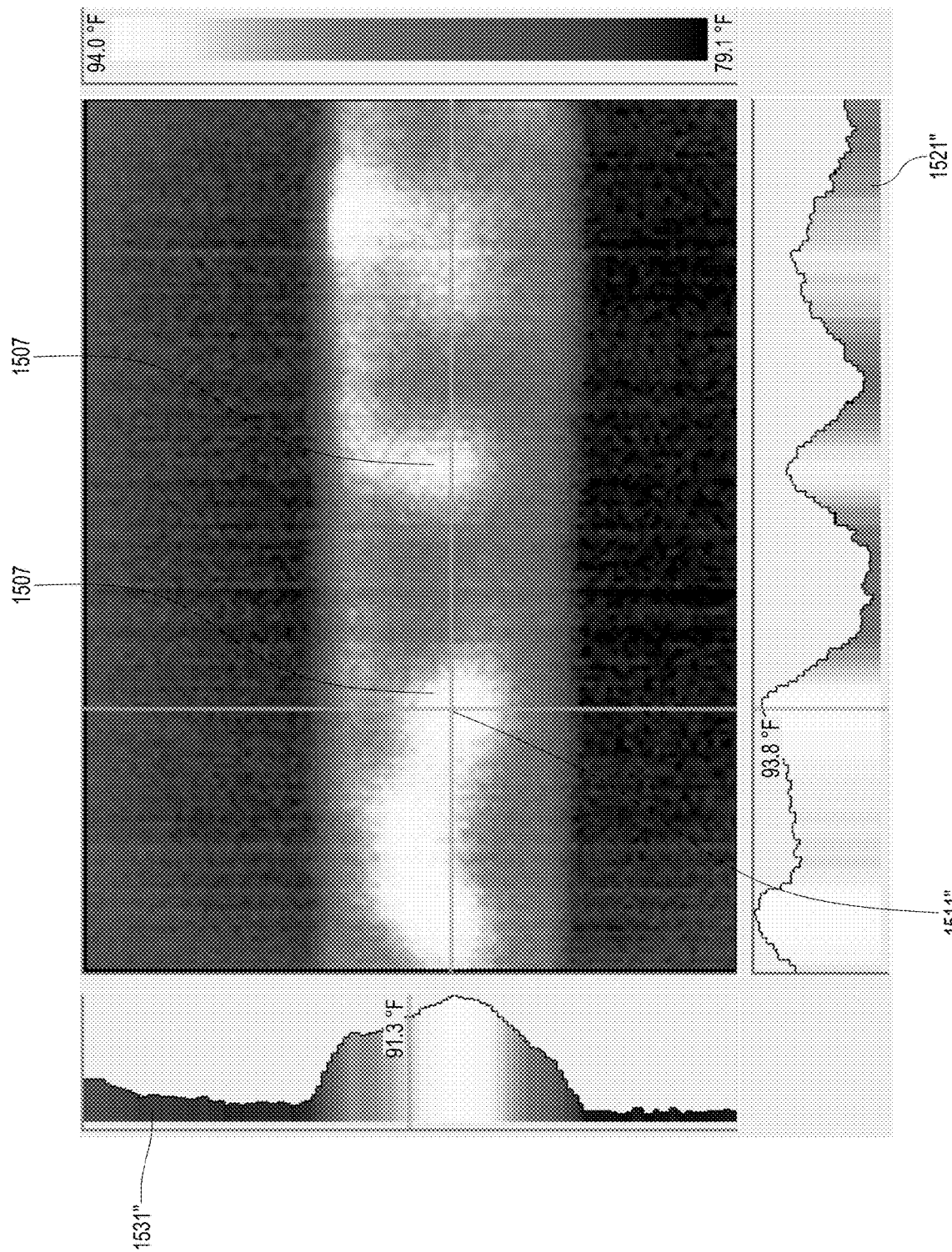
Figure 15F:
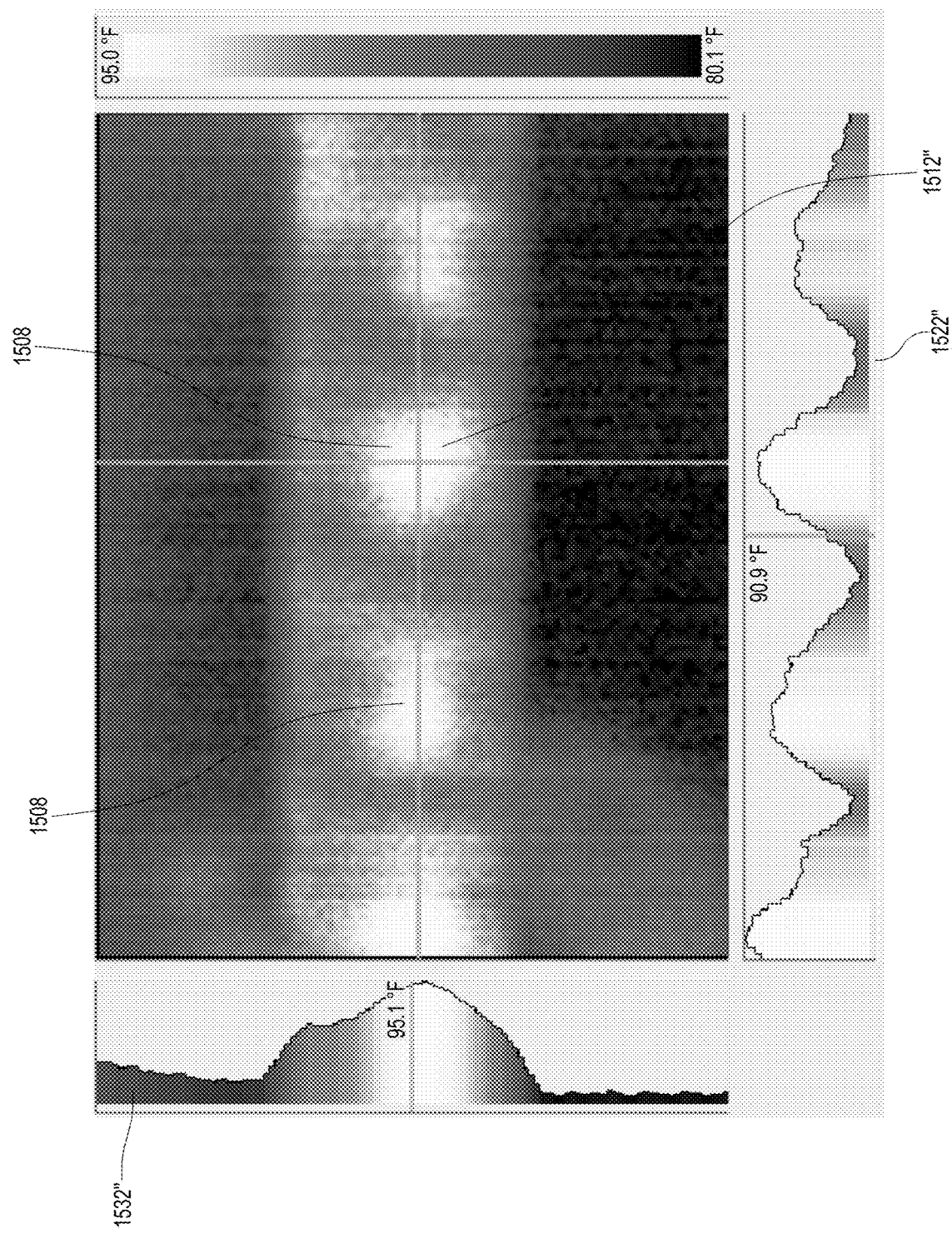
Figure 16A:
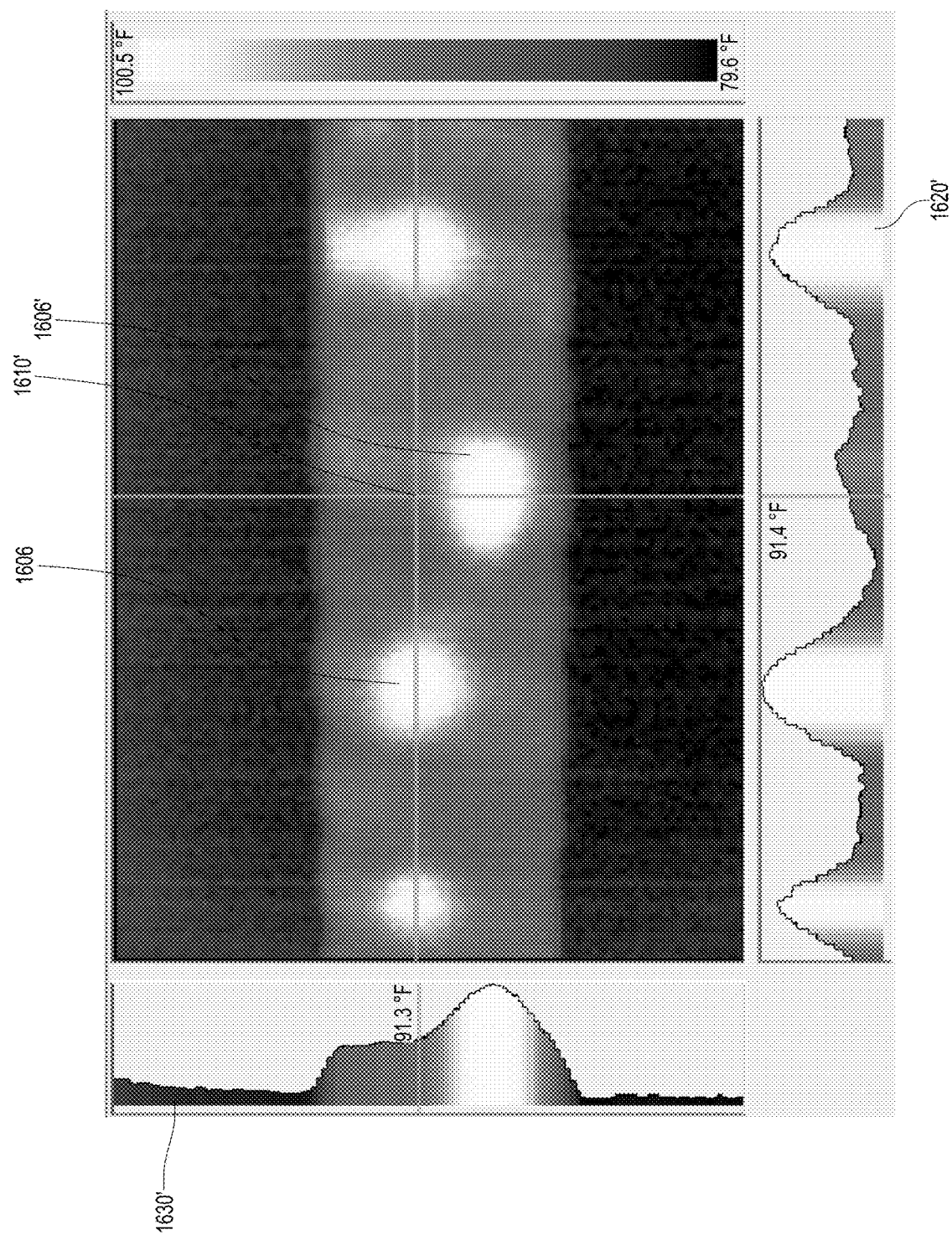
FIGS. 16A-16F are thermal images of a resistively heated fluid tube heated at about 25 Watts/in$^2$.
Figure 16B:
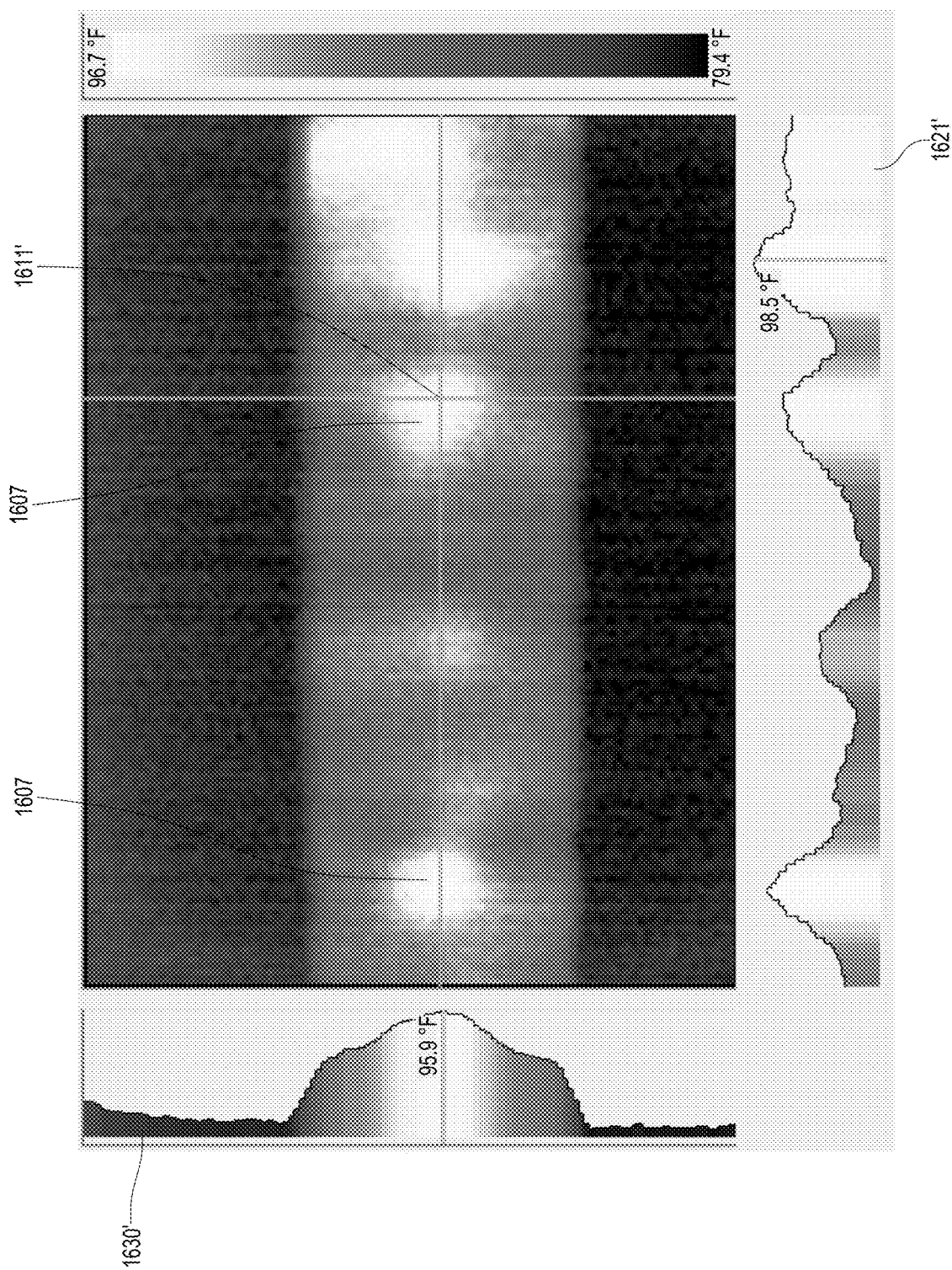
Figure 16C:
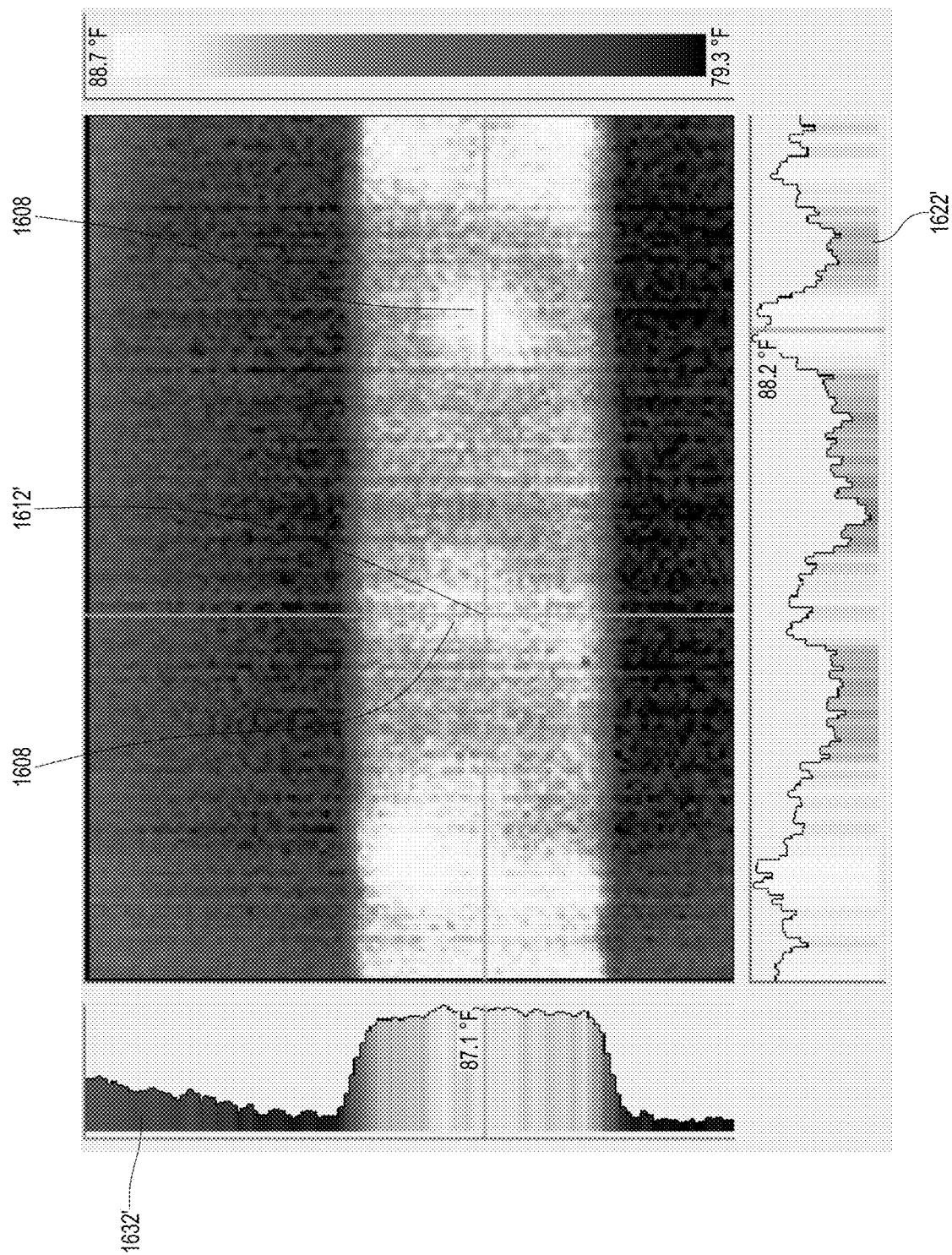
Figure 16D:
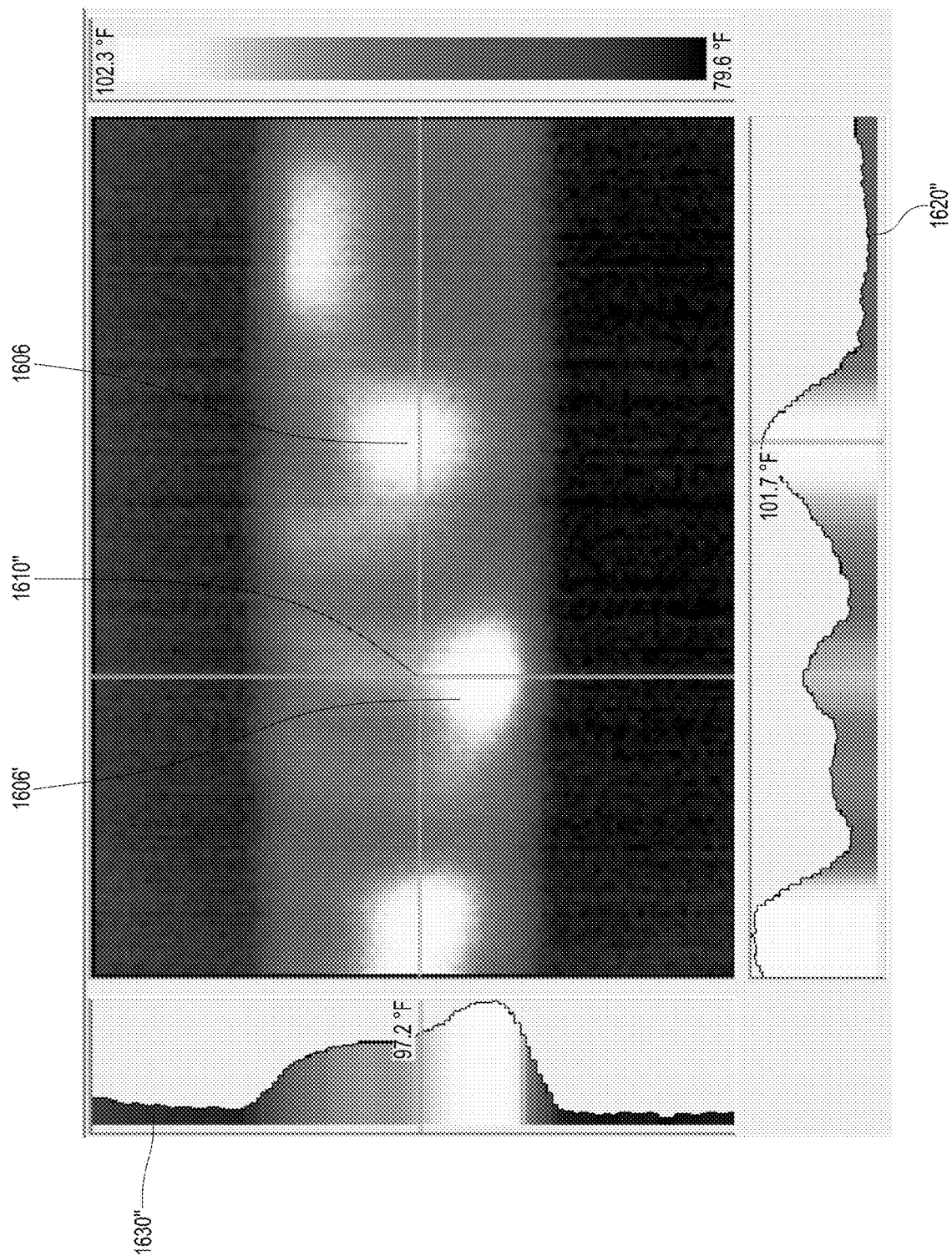
Figure 16E:
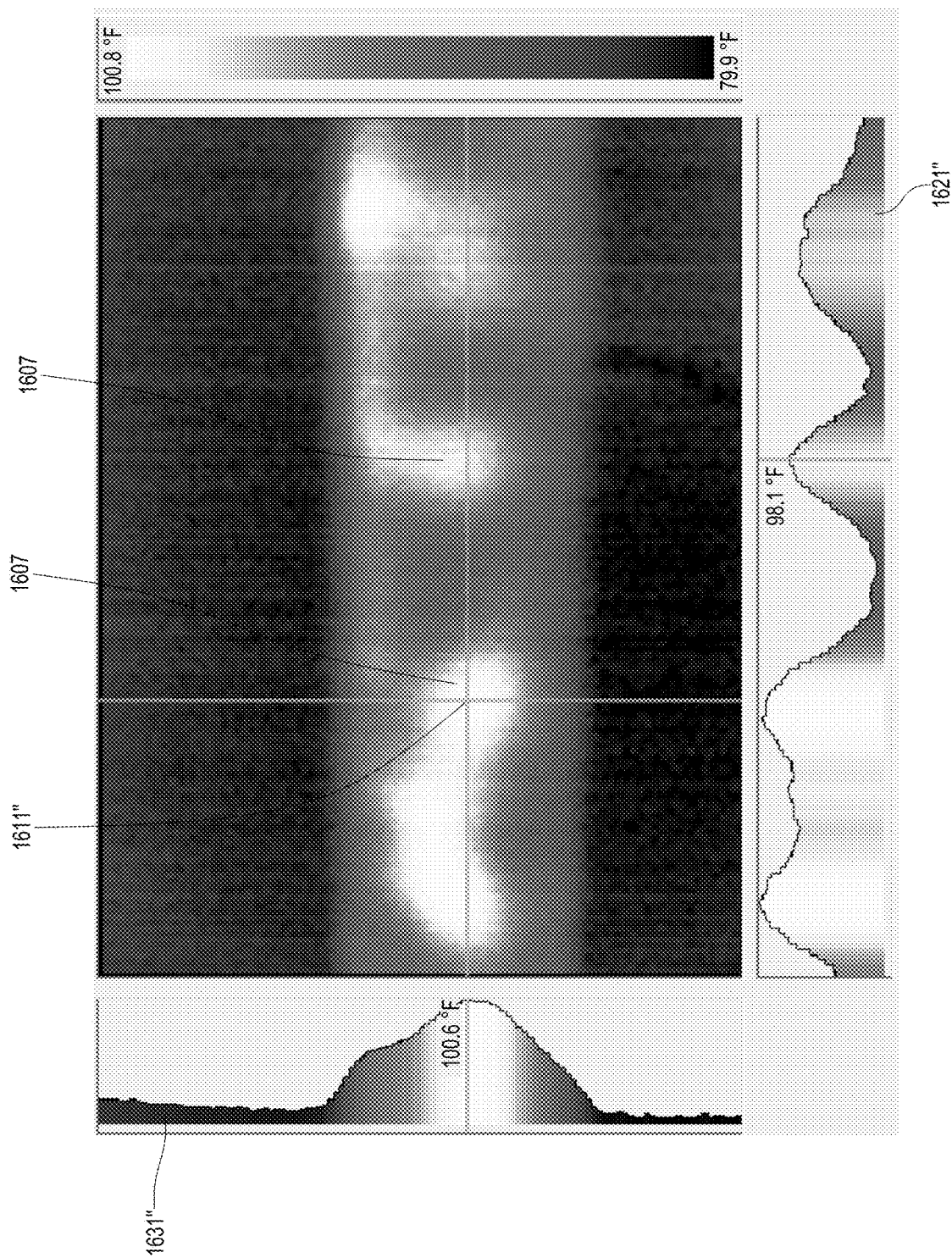
Figure 16F:
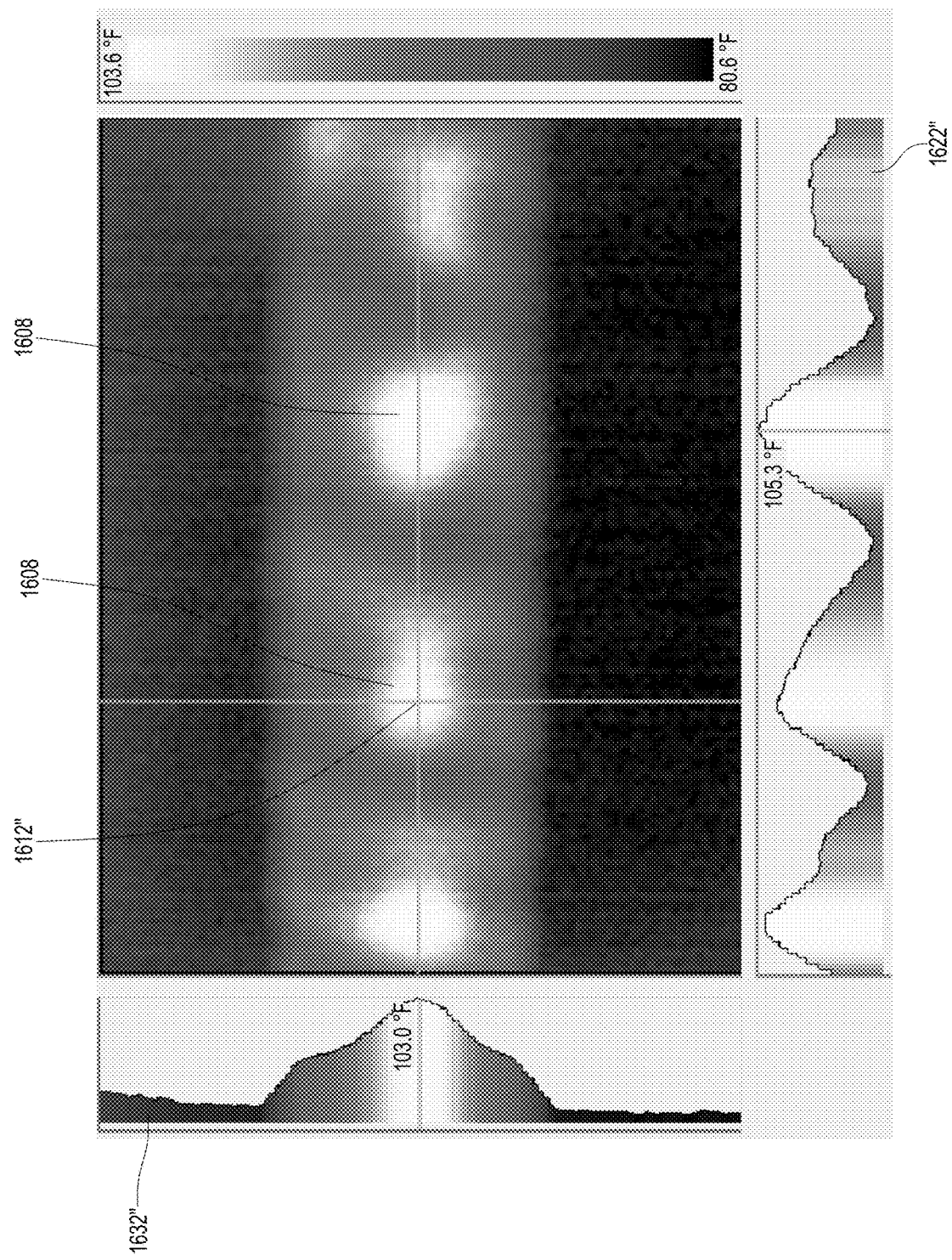
Figure 17A:
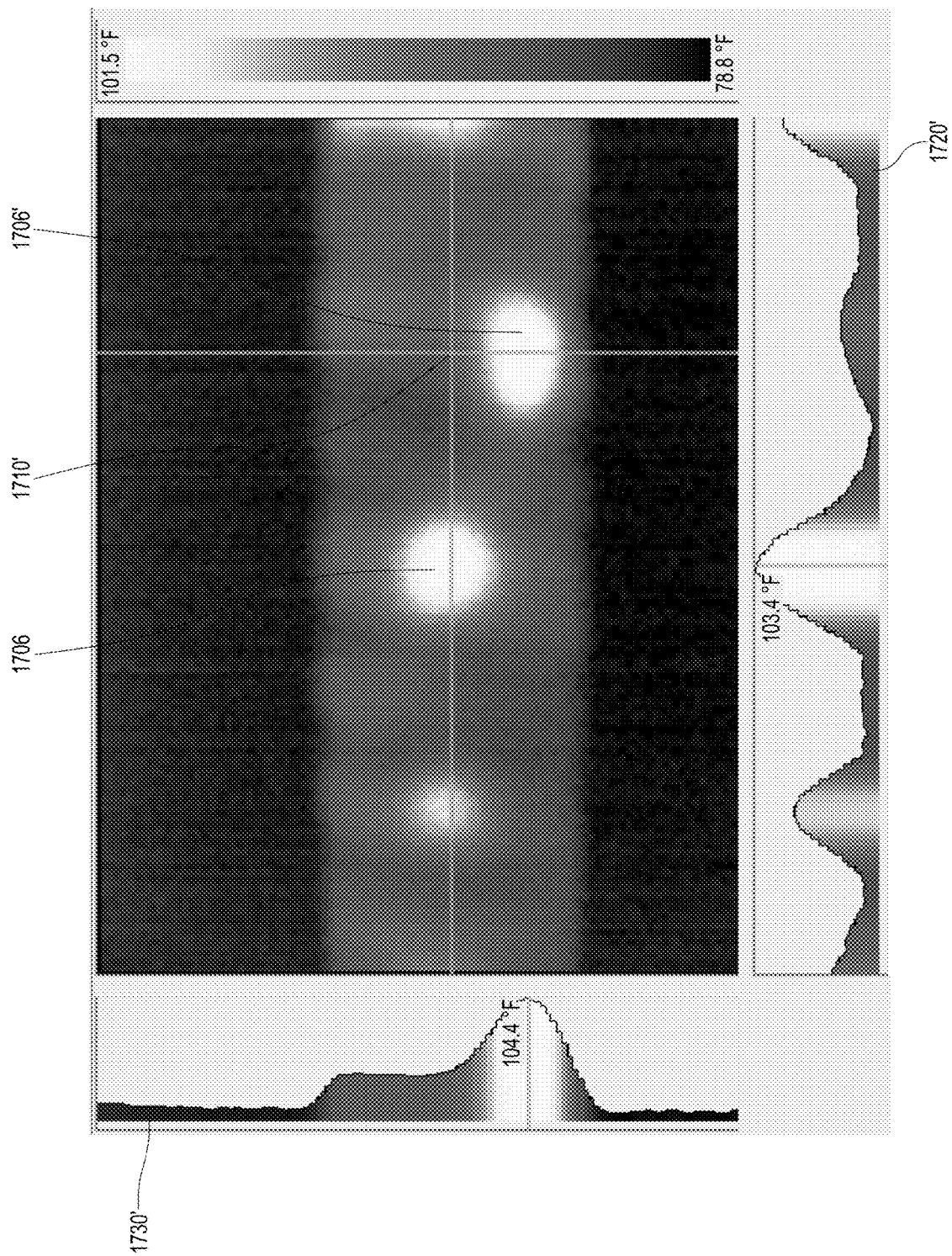
FIGS. 17A-17F are thermal images of a resistively heated fluid tube heated at about 46 Watts/in$^2$.
Figure 17B:
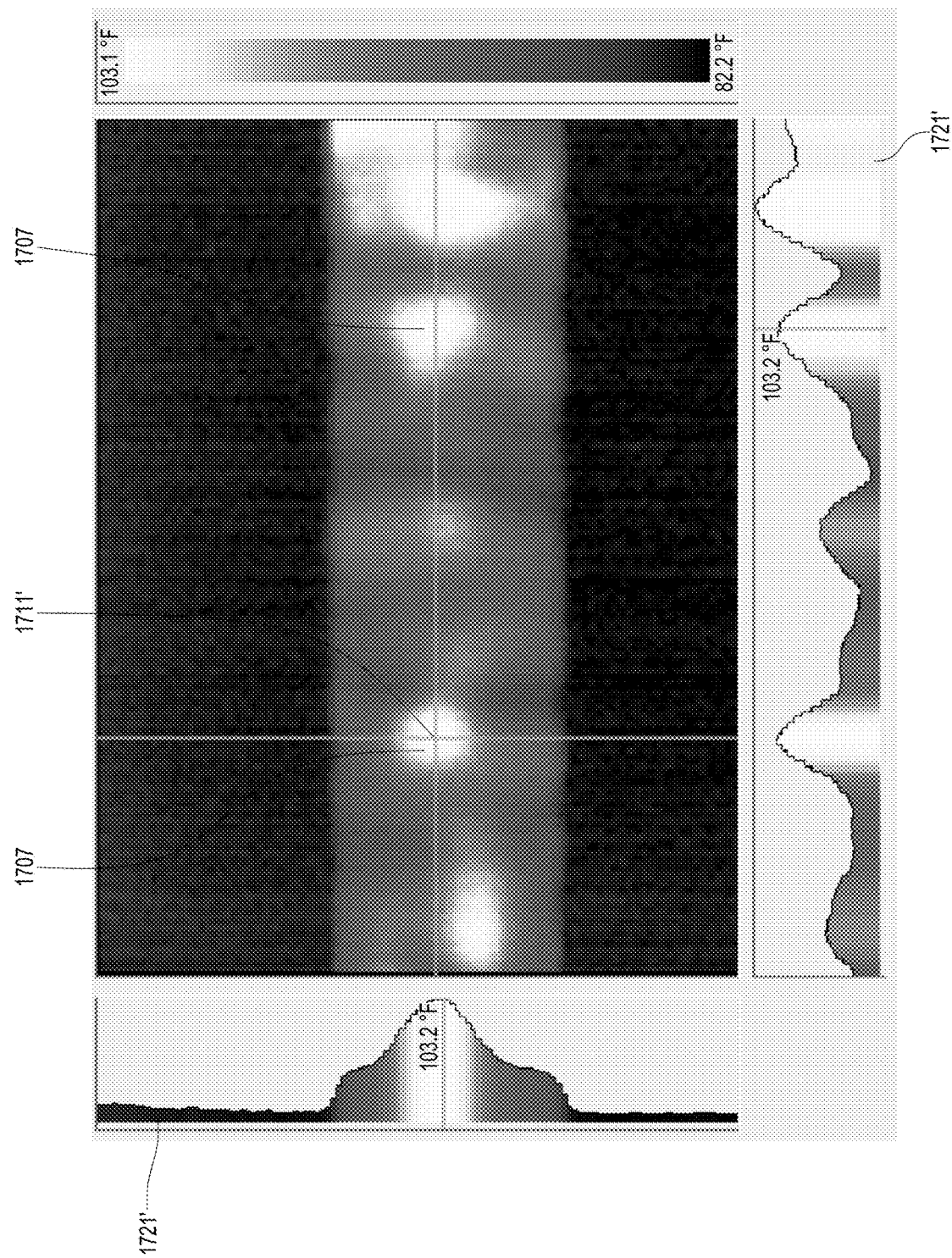
Figure 17C:
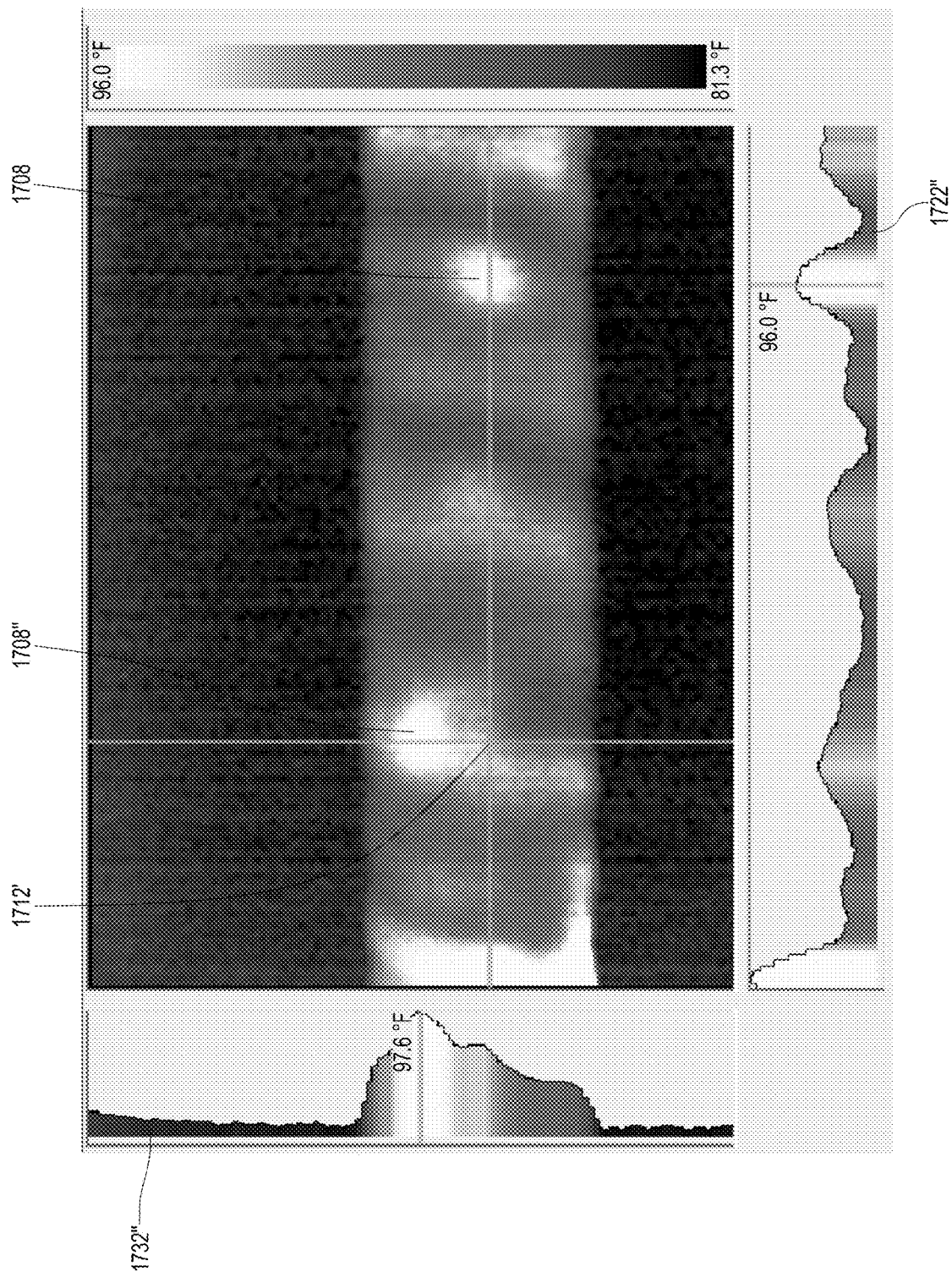
Figure 17D:
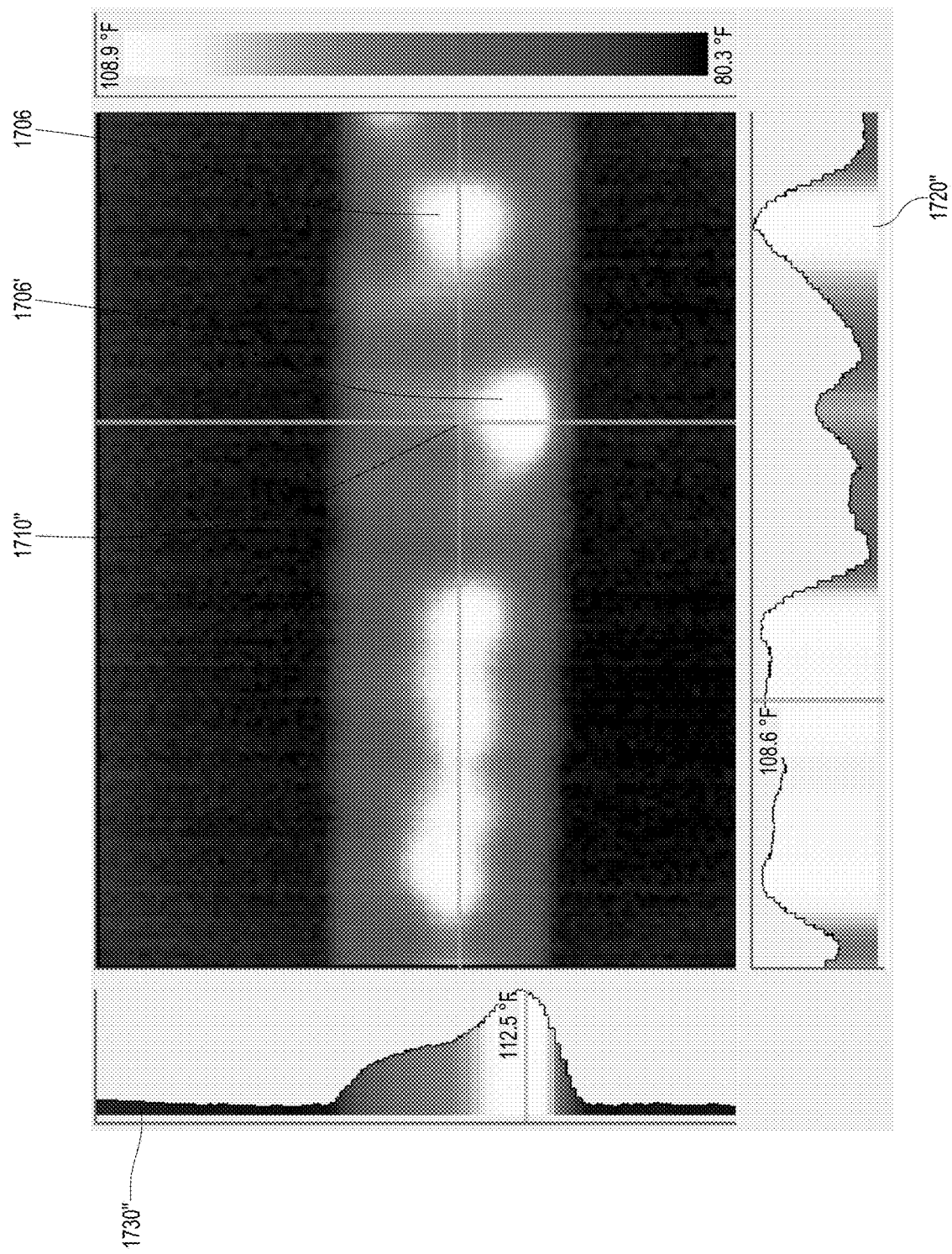
Figure 17E:
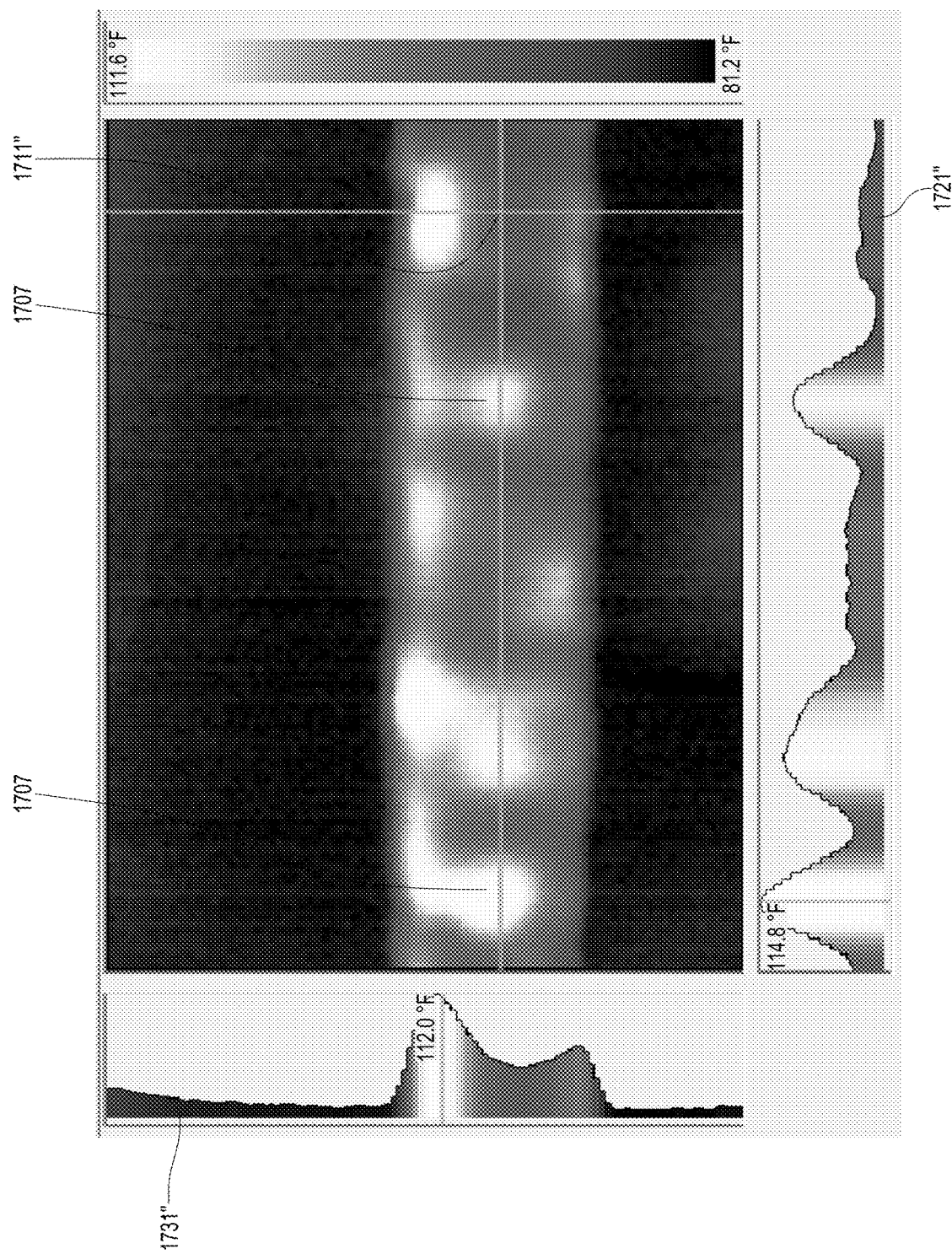
Figure 17F:
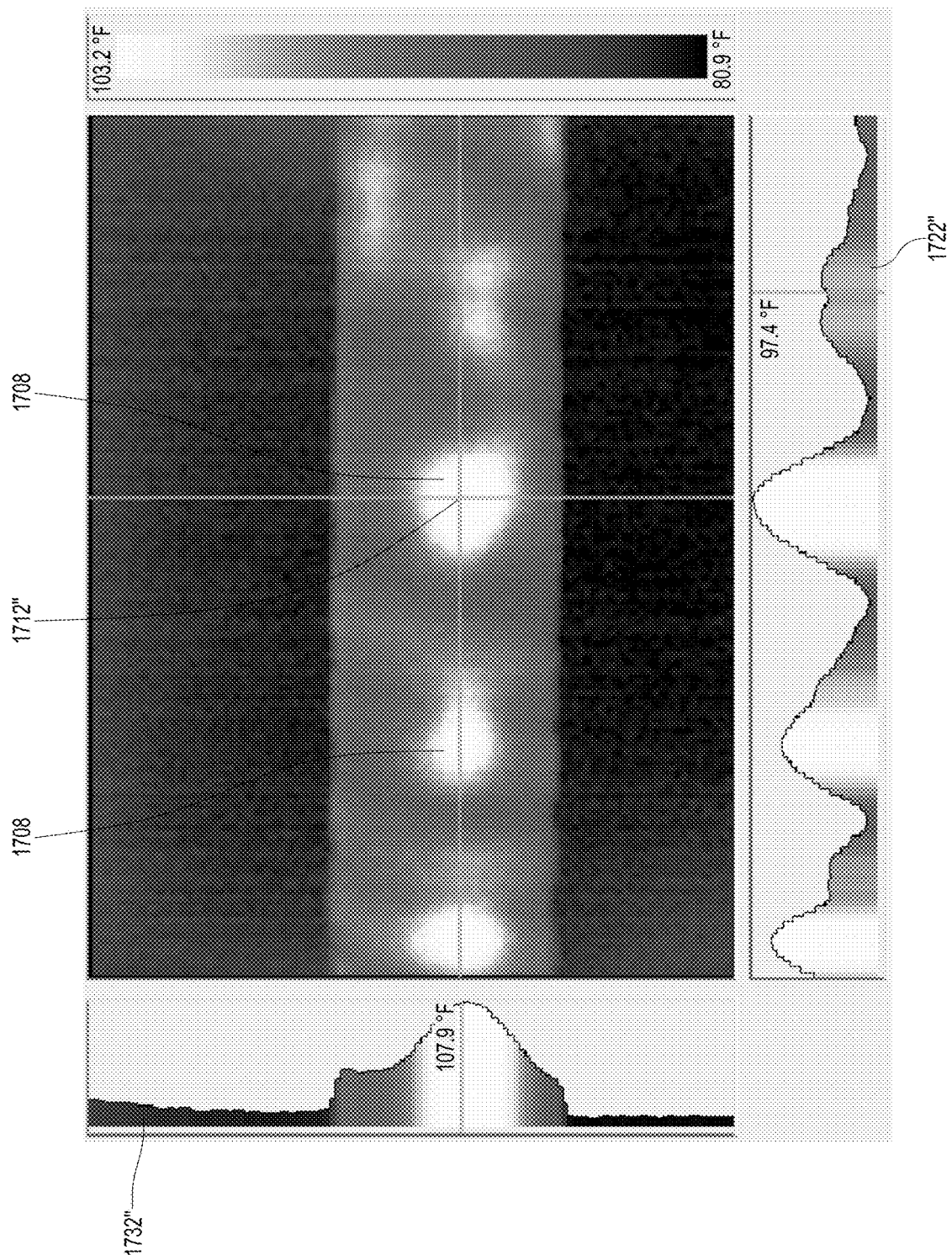

The test specimens imaged in each of FIGS. 15A, 16A, and 16B had 0.25 inches Teflon discs bonded between layers of the heating tube. The test specimen imaged in each of FIGS. 15B, 16B, and 17B had 0.125 inches Teflon discs bonded between layers of the heating tube. The test specimen imaged in each of FIGS. 15C, 16C, and 17C had 0.063 inches Teflon discs bonded between layers of the heating tube. The test specimen imaged in each of FIGS. 15D, 16D, and 17D had 0.25 inches polyethylene discs bonded between layers of the heating tube. The test specimens imaged in each of FIGS. 15E, 16E, and 17E had 0.125 inches polyethylene discs bonded between layers of the heating tube. The test specimen imaged in each of FIGS. 15F, 16F, and 17F had 0.063 inches polyethylene discs bonded between layers of the heating tube.

During the test set-up, the thermal imager was initialized and aimed and/or focused on the test specimen. For testing recording, a support structure (e.g., a tripod, clamp and stand, etc.) was used to position the imager. The support structure (and the imager attached thereto) was maintained at a distance of between about 18 inches and about 24 inches (depending on the focal length of the images and the level of detail desired) away from the test specimen and the thermal imager was maintained generally parallel to the test specimen (so the length of the test specimen was along the width of the image being captured by the imager). The imager was moved along the length of the heating tube as different images were taken along the test specimen.

The heater was connected to a switchable power source. For high powered heaters, either a transformer (DC power) or a Variac (AC power) could be used to reduce the watt density of the heater assembly. The heater was operated only to energize it for a period of time long enough to produce a suitable temperature delta for imaging of the conductive differentiation. The heater was not left on as it would be in normal use (e.g., for a prolonged period). The temperature delta was achieved by powering the heater for approximately 1 second. In FIGS. 15A-F, the tube was heated at a watt density of 15 Watt/in². In FIGS. 16A-F, the tube was heated at a watt density of 25 Watt/in². In FIGS. 17A-F, the tube was heated at a watt density of 46 Watt/in². The power cycles used to capture these images were on the order of about 1 second. It was noted that there was good persistence to the heat effect and image (as much as a minute) so substantial tube lengths (and/or area) could be imaged in a single process cycle (e.g., after a single heating). As shown in FIGS. 15A-17F, the lower the watt density used during heat the better the resolution seemed to be. It was observed that, in some circumstances, when the entire field of view was hot, the delaminations were not visible until the "background" was cold and the disbonds had not lost their heat. The time varied based on the watt density and the thermal load on the test specimen.

About thirty seconds after the heating was terminated, the thermal imager was used to capture images of the test specimens (FIGS. 15A-17F). Depending on the thermal load being applied, the image time may be as long as 1 minute or more to resolve. As shown in the Figures, the test disbonds and/or defects 1506, 1606, 1706, 1507, 1607, 1707, 1508, 1608, 1708 in the 12 o'clock position clearly appeared as a contrasting area (e.g., warmer in the thermal image). FIGS. 15A, 15D, 16A, 16D, and 17D show examples of disbonds in the 11 o'clock position (indicated by a ' symbol on the disbond numeral—e.g. 1506' in FIG. 15A). FIG. 17C shows a disbond in the 1 o'clock position (indicated by a "symbol on the disbond numeral—e.g. 1708"). As shown in FIGS. 15A, 15D, 16A, 16D, 17C, and 17D, disbonds in the 11 and 1 o'clock positions were visible.

Also shown in each of FIGS. 15A-17F, a cursor 1510', 1510", 1511', 1511", 1512', 1512", 1610', 1610", 1611', 1611", 1612', 1612", 1710', 1710", 1711', 1711", 1712', 1712" was used to define cross-sections of the heating tube in both lengthwise and widthwise directions. Each cross-sectional line provided a topographical heat map along the line of cross-section. For example, cross-section line along the length of the tube was used to generate two dimensional topographical maps 1520', 1520", 1521', 1521", 1522', 1522", 1620', 1620", 1621', 1621", 1622', 1622", 1720', 1720", 1721', 1721", 1722', 1720" shown below the image and displaying the temperature along the line of cross-section. The cross-section line along the width of the tube was used to generate two dimensional topographical maps 1530', 1530", 1531', 1531", 1532', 1532", 1630', 1630", 1631', 1631", 1632', 1632", 1730', 1730", 1731', 1731", 1732', 1730" shown to the left of the image and displaying the temperature along the line of cross-section. The heat maps where used to determine the precise location of the disbonds and to demonstrate that temperature differences of as low as 3 or 4 degrees F. (about 1 to 2 degrees C.) could be imaged. As shown, the higher temperatures on the heat maps are represented by a higher point on the topographical line.

The following is claimed:

1. A method for detecting a latent internal defect in a layered device that is not discernable from visual inspection, the method comprising:
   applying, with a heat source to a portion of a device, the heat source in a position relative to the device;
   heating the portion of the device to a substantially uniform temperature;
   removing the application of heat, from the heat source, to the portion of the device;
   allowing some of the portion of the device to cool;
   acquiring a thermal image of the portion of the device or the heat source with the heat source in the position relative to the device; and
   identifying, with the thermal image, a localized region of the portion of the device or the heat source that is hotter than the adjacent regions, thereby detecting the latent internal defect.

2. The method of claim 1, wherein a cooling source is applied to the portion of the device at a time before heating the portion of the device.

3. The method of claim 1, wherein a cooling source is applied to the portion of the device at a time while heating the portion of the device.

4. The method of claim 1, wherein a cooling source is applied to the portion of the device at a time after heating the portion of the device.

5. The method of claim 1, wherein a cooling source is applied to the portion of the device, wherein the cooling source is provided by a thermal load having a temperature below the substantially uniform temperature.

6. The method of claim 1, wherein the device comprises a tube and the heat source comprises a resistive heater on an outside of the tube.

7. The method of claim 1, wherein the device comprises a composite sheet.

8. The method of claim 1, wherein the heat source comprises a heat sink layer, a first dielectric layer disposed over the heat sink layer, a heating element layer disposed over the first dielectric layer, and a second dielectric layer disposed over the heating element layer.

9. The method of claim 8, wherein the defect comprises a disbond between one or more layers of the device.

10. The method of claim 1, wherein allowing some of the portion of the device to cool comprises allowing at least some portions of the device that do not include the latent internal defect to cool.

11. The method of claim 1, wherein the defect is selected from the group consisting of a disbond, a crack, a fracture, a pit, a bubble, a density variation in a material, a porous region in a material, and combinations of the foregoing.

12. A method of detecting a disbond in a layered heating device, the method comprising:
providing a substantially continuous negative thermal load on the heating device;
activating a heating element of the heating device;
heating, with a heating element of the heating device, at least a portion of the heating device;
deactivating the heating element;
inhibiting, with the disbond, heat transfer from a portion of the heating device that does include the disbond;
conveying away, with the substantially continuous negative thermal load, heat from a portion of the heating device that does not include the disbond;
acquiring a thermal image of a portion of the heating device; and
identifying a temperature differential between the portion of the heating device that does include the disbond and the portion of the heating device that does not include the disbond.

13. The method of claim 12, wherein providing a continuous negative thermal load on the layered heating device comprises flowing a liquid over the heatsink of the layered heating device.

14. The method of claim 12, wherein the thermal image is acquired at a time after the heating element of the layered heating device is deactivated.

15. The method of claim 12, wherein the thermal image is acquired while the heating element of the layered heating device is heating the heating device.

16. The method of claim 12, wherein the liquid is flowed over the heatsink at a time prior to activating the heating element of the layered heating device.

17. A method for detecting a defect of a layered material, the method comprising:
activating a heater to produce heat;
heating a first side of a portion of the material to be analyzed using the heat;
activating a cooler to produce cooling;
cooling the first side of the portion of the material to be analyzed;
acquiring, using a thermal imager, a thermal image of the portion of the material to be analyzed; and
analyzing the thermal image to determine if defects are present in the portion of the material to be analyzed.

18. The method of claim 17, wherein:
acquiring the thermal image of the portion of the material to be analyzed comprises acquiring the thermal image of a second side of the portion of the material to be analyzed.

19. The method of claim 18, wherein the heater comprises a heat gun.

20. The method of claim 18, wherein the cooler comprises a swamp cooler.

21. A system for detecting defects in a tested portion of a composite test specimen, the system comprising:
a heater positioned on a first side of the tested portion of the test specimen, the heater configured to apply a sufficient amount of heat to the tested portion of the test specimen such that the temperature of the tested portion is substantially uniform, the heater further configured to be deactivated after the temperature of the tested portion is substantially uniform;
a cooler configured to apply a cooling load to the tested portion; and
a thermal imaging camera positioned on a second side of the tested portion of the test specimen while in operation, the second side opposite to the first side, the thermal imaging camera configured to produce an image of the second side of the tested portion that visually indicates temperature variations between areas with a defect and areas without a defect.

22. The system of claim 21, wherein the cooler is positioned on the first side of the tested portion of the test specimen.

23. The system of claim 21, wherein the cooler comprises a fan.

24. The system of claim 21, wherein the test specimen comprises a sheet of composite material.

* * * * *